(12) United States Patent
Igahara et al.

(10) Patent No.: US 10,824,353 B2
(45) Date of Patent: Nov. 3, 2020

(54) MEMORY SYSTEM

(71) Applicant: Toshiba Memory Corporation, Minato-ku (JP)

(72) Inventors: Shunichi Igahara, Kamakura (JP); Toshikatsu Hida, Yokohama (JP); Riki Suzuki, Yokohama (JP); Takehiko Amaki, Yokohama (JP); Suguru Nishikawa, Osaka (JP); Yoshihisa Kojima, Kawasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 13 days.

(21) Appl. No.: 16/117,262

(22) Filed: Aug. 30, 2018

(65) Prior Publication Data

US 2019/0095116 A1 Mar. 28, 2019

(30) Foreign Application Priority Data

Sep. 22, 2017 (JP) ................................. 2017-182025

(51) Int. Cl.
*G06F 3/06* (2006.01)
*G06F 12/02* (2006.01)
*G06F 12/10* (2016.01)

(52) U.S. Cl.
CPC ............ *G06F 3/0634* (2013.01); *G06F 3/061* (2013.01); *G06F 3/0604* (2013.01);
(Continued)

(58) Field of Classification Search
CPC .... G06F 12/10; G06F 3/0659; G06F 12/0253; G06F 3/0619; G06F 3/0634;
(Continued)

(56) References Cited

U.S. PATENT DOCUMENTS

| 7,953,920 B2 | 5/2011 | Yano et al. |
| 8,990,458 B2 | 3/2015 | Yano et al. |

(Continued)

FOREIGN PATENT DOCUMENTS

| JP | 2010-182420 | 8/2010 |
| JP | 4533968 | 9/2010 |

(Continued)

OTHER PUBLICATIONS

S. Liang et al., "An Empirical Study of Quad-Level Cell (QLC) NAND Flash SSDs for Big Data Applications," 2019 IEEE International Conference on Big Data (Big Data), Los Angeles, CA, USA, 2019, pp. 3676-3685.*

(Continued)

*Primary Examiner* — Pierre Michel Bataille
(74) *Attorney, Agent, or Firm* — Oblon, McClelland, Maier & Neustadt, L.L.P.

(57) ABSTRACT

According to one embodiment, a memory system includes a nonvolatile memory and a controller electrically connected to the nonvolatile memory. The controller selects a write mode from a first mode in which data having N bits is written per one memory cell and a second mode in which data having M bits is written per one memory cell. N is equal to or larger than one. M is larger than N. The controller writes data into the nonvolatile memory in the selected write mode. The controller selects either the first mode or the second mode at least based on a total number of logical addresses mapped in a physical address space of the nonvolatile memory.

13 Claims, 37 Drawing Sheets

(52) U.S. Cl.
CPC .......... *G06F 3/0619* (2013.01); *G06F 3/0659* (2013.01); *G06F 3/0679* (2013.01); *G06F 12/0253* (2013.01); *G06F 12/10* (2013.01); *G06F 2212/1044* (2013.01); *G06F 2212/657* (2013.01)

(58) Field of Classification Search
CPC .... G06F 12/0246; G06F 3/061; G06F 3/0604; G06F 3/0679; G06F 12/02; G06F 3/06
USPC ........................................................ 711/103
See application file for complete search history.

(56) References Cited

U.S. PATENT DOCUMENTS

| | | | |
|---|---|---|---|
| 9,176,862 B2 | 11/2015 | Chen et al. | |
| 9,251,060 B2 | 2/2016 | Khan et al. | |
| 9,280,466 B2 | 3/2016 | Kunimatsu et al. | |
| 9,424,927 B2 | 8/2016 | Chen et al. | |
| 9,495,101 B2 | 11/2016 | Lieber | |
| 9,697,134 B2 | 7/2017 | Hale et al. | |
| 10,359,933 B2 * | 7/2019 | Muchherla | G06F 3/064 |
| 2008/0250220 A1 * | 10/2008 | Ito | G06F 12/0246 711/173 |
| 2010/0037009 A1 | 2/2010 | Yano et al. | |
| 2010/0037010 A1 | 2/2010 | Yano et al. | |
| 2010/0037011 A1 | 2/2010 | Yano et al. | |
| 2010/0161885 A1 | 6/2010 | Kanno et al. | |
| 2012/0005415 A1 * | 1/2012 | Jung | G06F 12/0246 711/103 |
| 2012/0191900 A1 | 7/2012 | Kunimatsu et al. | |
| 2012/0268994 A1 | 10/2012 | Nagashima | |
| 2014/0219020 A1 * | 8/2014 | Kwak | G11C 16/10 365/185.03 |
| 2014/0244903 A1 | 8/2014 | Yano et al. | |
| 2014/0250257 A1 | 9/2014 | Khan et al. | |
| 2015/0293713 A1 | 10/2015 | Seo et al. | |
| 2017/0047124 A1 * | 2/2017 | Ellis | G06F 3/0688 |
| 2017/0147499 A1 | 5/2017 | Mohan et al. | |
| 2017/0235681 A1 | 8/2017 | Kaburaki et al. | |
| 2017/0242595 A1 * | 8/2017 | Niu | G06F 3/0613 |
| 2017/0262175 A1 | 9/2017 | Kanno | |
| 2018/0211708 A1 * | 7/2018 | Igahara | G11C 11/5628 |
| 2018/0276114 A1 * | 9/2018 | Kodama | G06F 12/0246 |

FOREIGN PATENT DOCUMENTS

| | | |
|---|---|---|
| JP | 2011-100519 | 5/2011 |
| JP | 2011-186555 | 9/2011 |
| JP | 5100789 | 12/2012 |
| JP | 2014-203467 | 10/2014 |
| JP | 2015-503798 | 2/2015 |
| JP | 2015-204118 | 11/2015 |
| JP | 2017-162065 | 9/2017 |
| WO | WO 2017/091280 A1 | 6/2017 |

OTHER PUBLICATIONS

Seiichi Aritome, "Advanced Operation for Multilevel Cell," in NAND Flash Memory Technologies , IEEE, 2015, pp. 93-127.*
C. Matsui, C. Sun and K. Takeuchi, "Design of Hybrid SSDs With Storage Class Memory and NAND Flash Memory," in Proceedings of the IEEE, vol. 105, No. 9, pp. 1812-1821, Sep. 2017.*
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.*

* cited by examiner

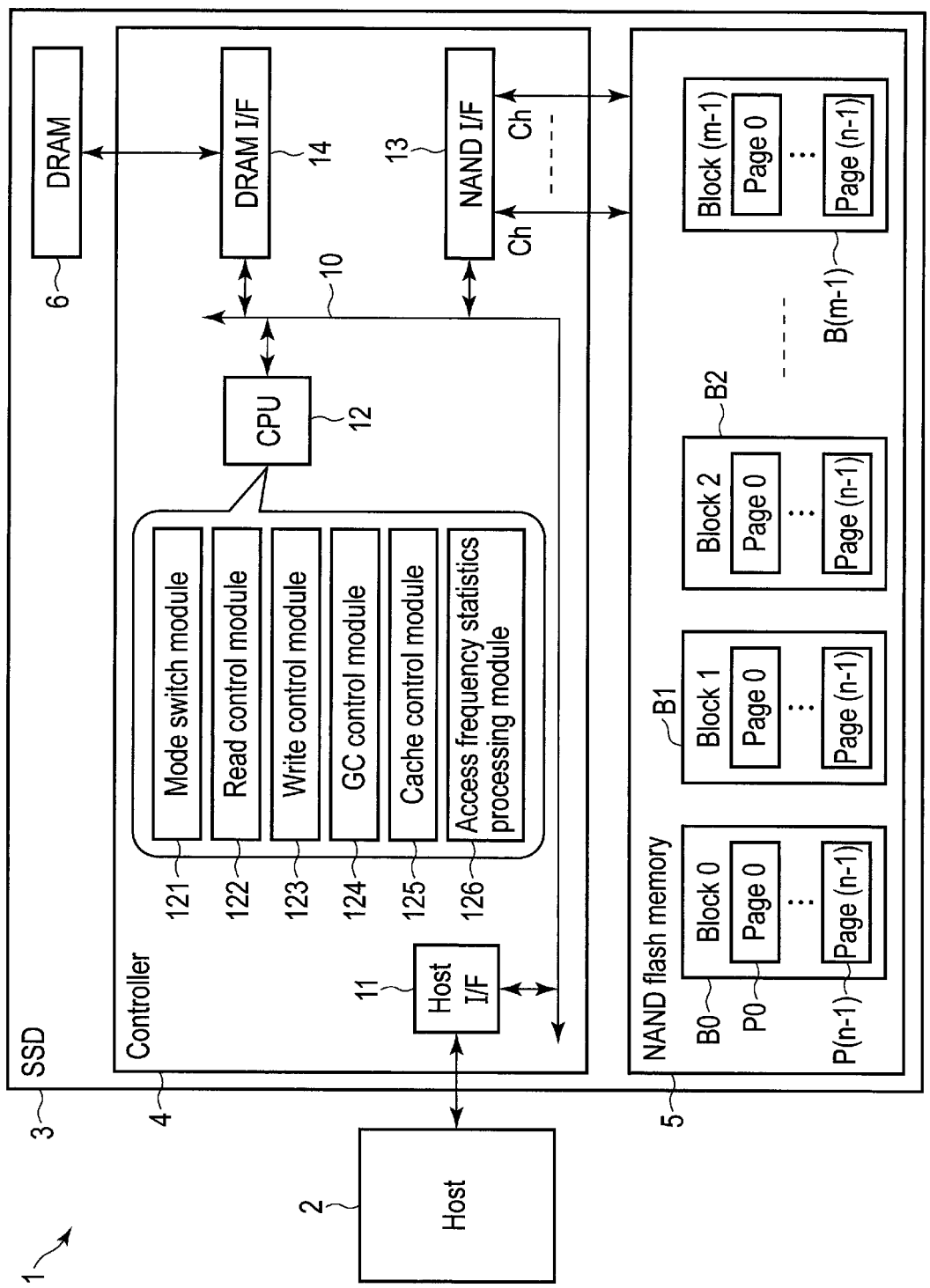
F I G. 1

Block – number of P/E cycles table ⟵ 352

| Block ID | Number of P/E cycles |
|---|---|
| 1 | 50 |
| 2 | 40 |
| ⋮ | ⋮ |

F I G. 4

LBA range - access frequency table ⟵ 361

| LBA range | Access frequency |
|---|---|
| Start LBA, End LBA | 10 |
| Start LBA, End LBA | 20 |
| ⋮ | ⋮ |

F I G. 5

Block - valid data amount table ⟵ 362

| Block ID | Valid data amount |
|---|---|
| 1 | 40 |
| 2 | 50 |
| 3 | 120 |
| ⋮ | ⋮ |

F I G. 6

Block - cold data ratio table

| Block ID | Amount of valid data with high access frequency | Amount of valid data with low access frequency | Cold data ratio (%) |
|---|---|---|---|
| 1 | 50 | 50 | 50 |
| 2 | 60 | 40 | 40 |
| 3 | 20 | 80 | 80 |
| ⋮ | ⋮ | ⋮ | ⋮ |

363

F I G. 7

LBA range - write mode table

| LBA range | Write mode |
|---|---|
| Start LBA, End LBA | SLC |
| Start LBA, End LBA | TLC |
| Start LBA, End LBA | QLC |
| ⋮ | ⋮ |

371

F I G. 8

Name space ID - write mode table

| Name space ID | Write mode |
|---|---|
| 1 | SLC |
| 2 | TLC |
| 5 | QLC |
| ⋮ | ⋮ |

372

F I G. 9

Stream ID - write mode table
| Stream ID | Write mode |
|---|---|
| 1 | SLC |
| 2 | TLC |
| 3 | QLC |
| ⋮ | ⋮ |
373
F I G. 10
|  | Data density | R/W speed | Endurance (P/E cycles) |
|---|---|---|---|
| QLC | 16 values (4 pages) | Slow ↑ | Short (several k cycles) ↑ |
| TLC | 8 values (3 pages) |  |  |
| MLC | 4 values (2 pages) | ↓ | ↓ |
| SLC | 2 values (1 page) | Fast | Long (several tens k cycles) |
F I G. 11
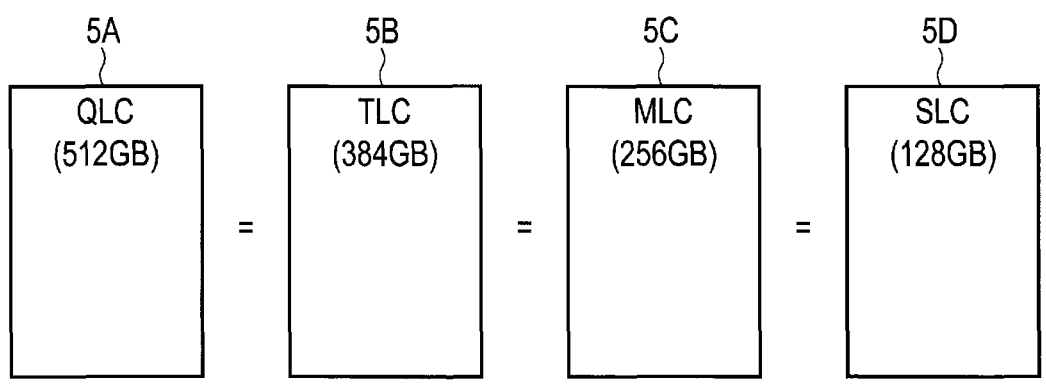
F I G. 12

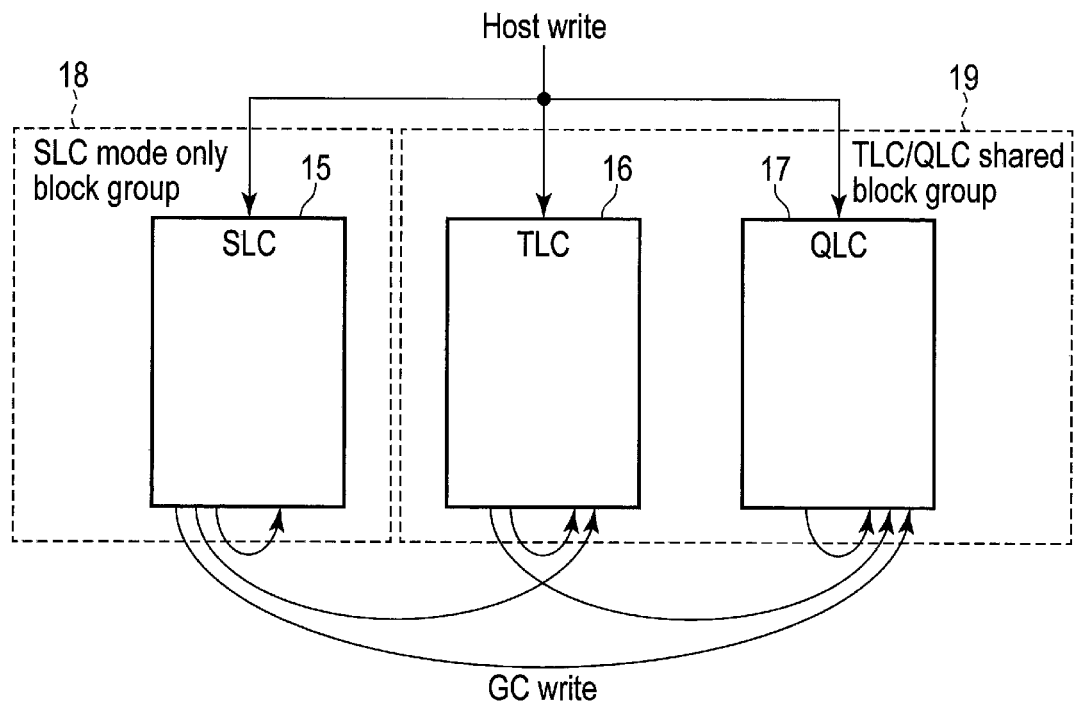
F I G. 15
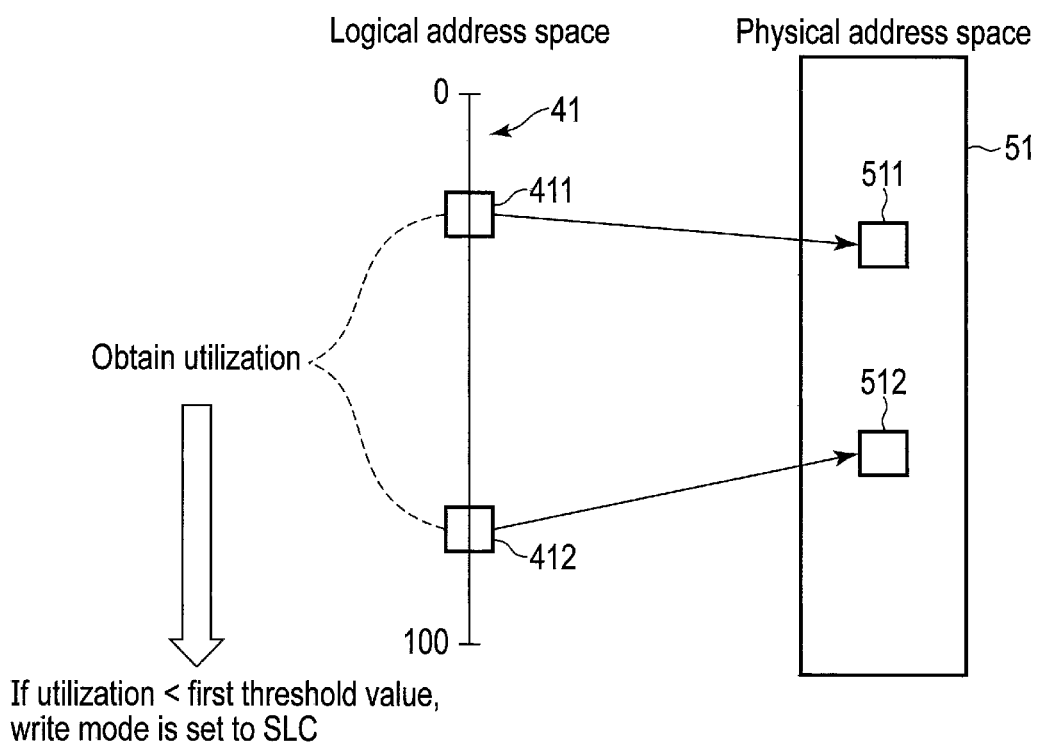
F I G. 16

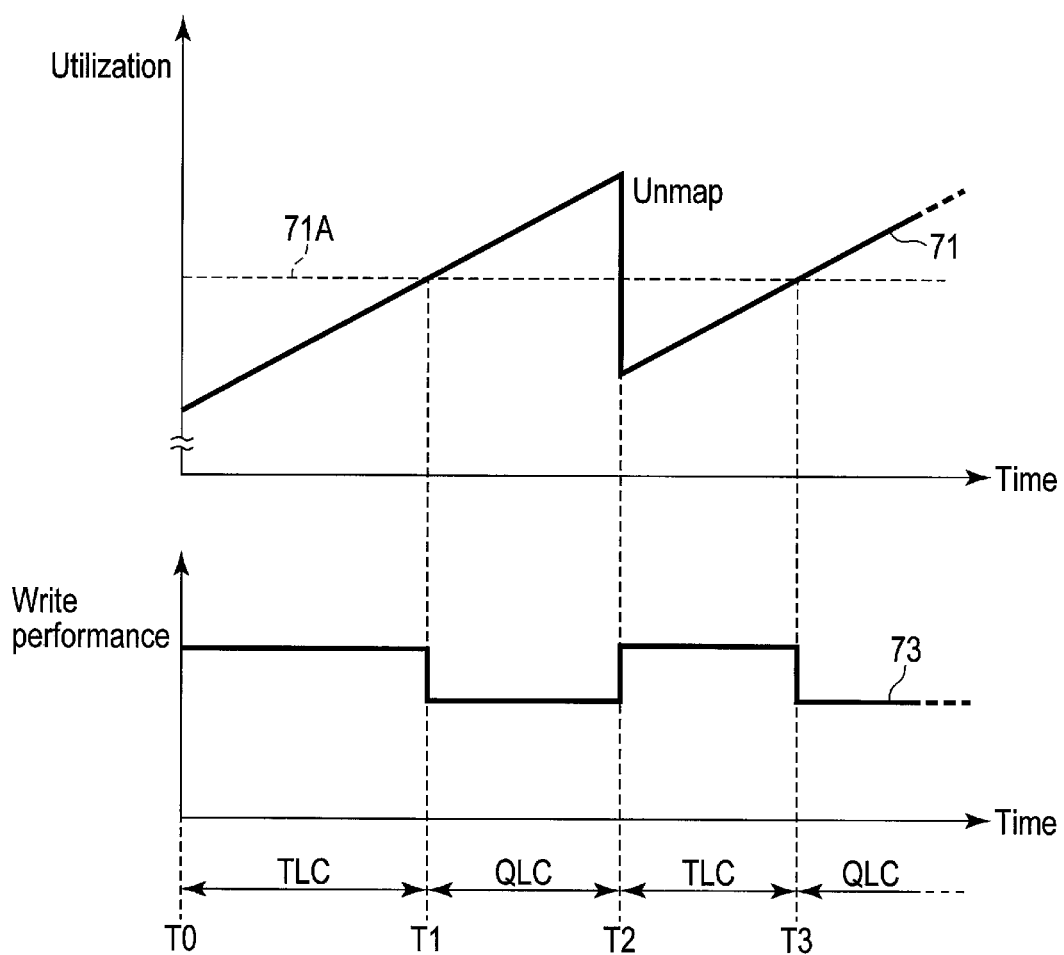
F I G. 21

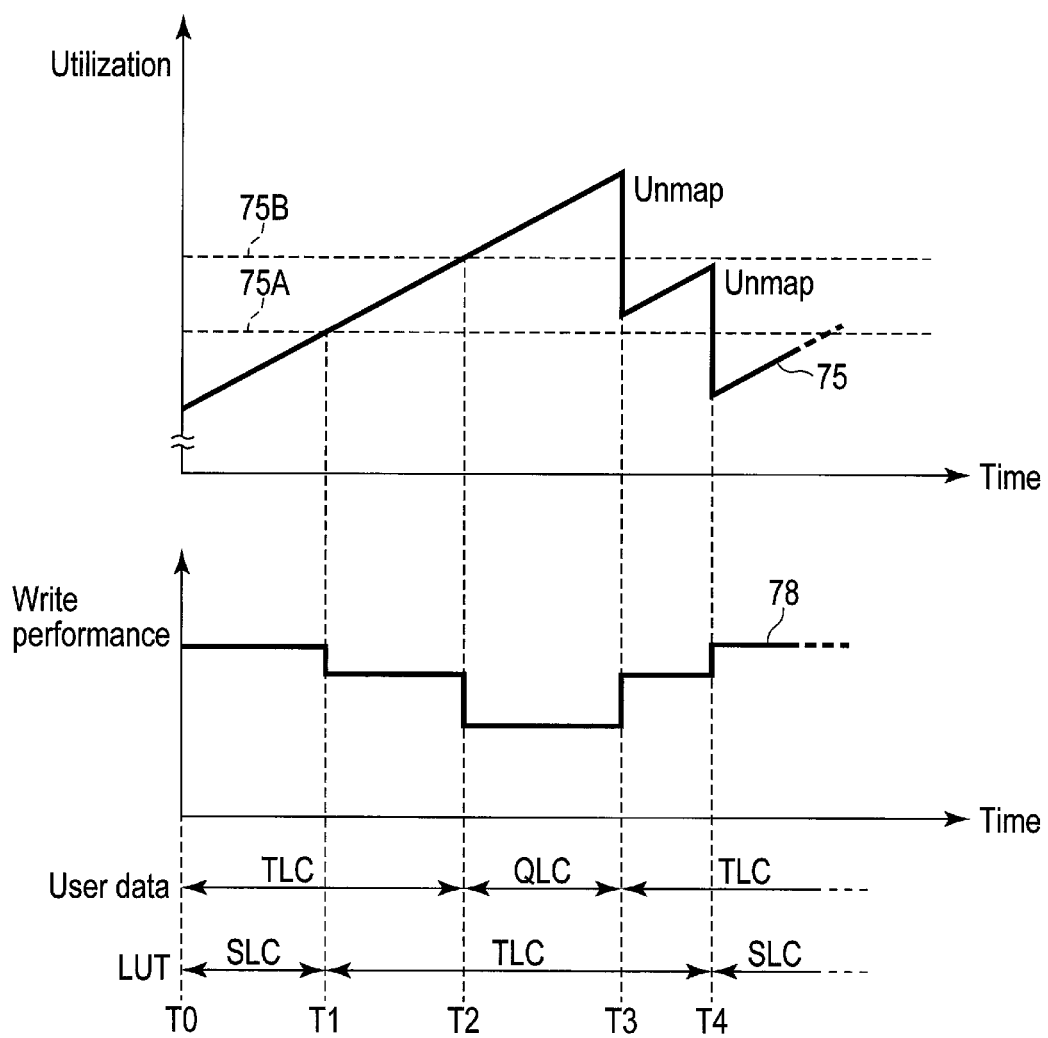
F I G. 23

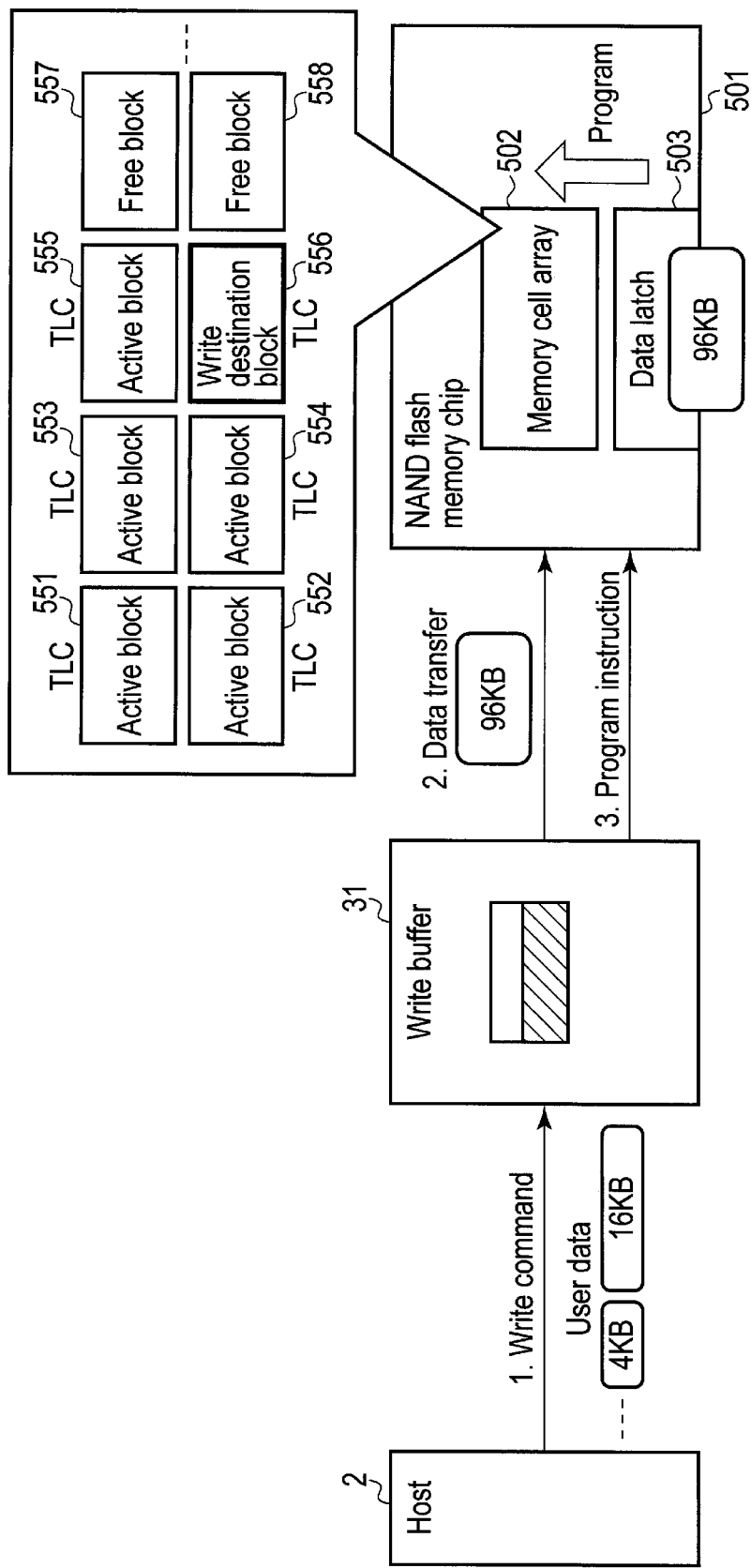
F I G. 24

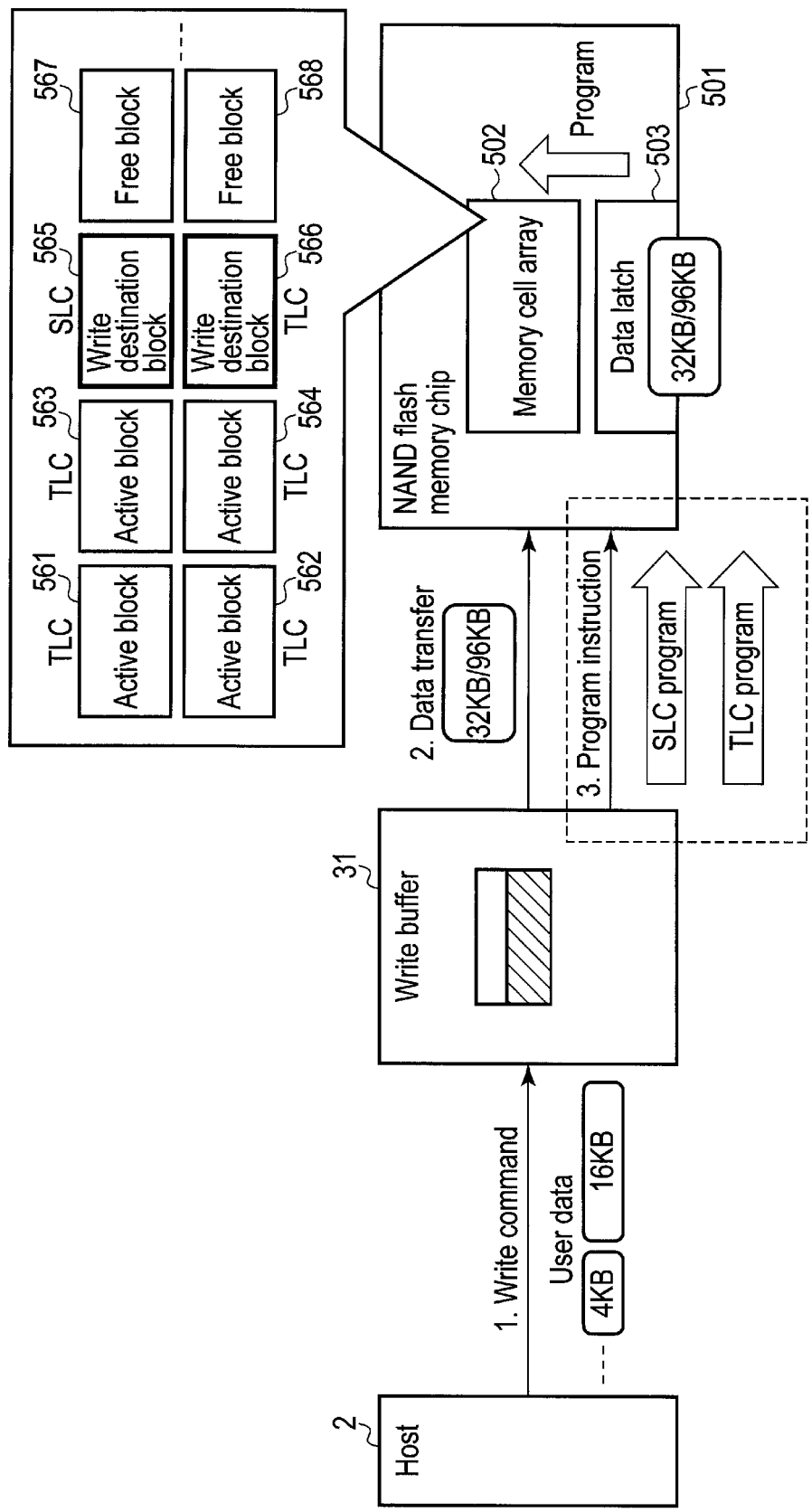
F I G. 25

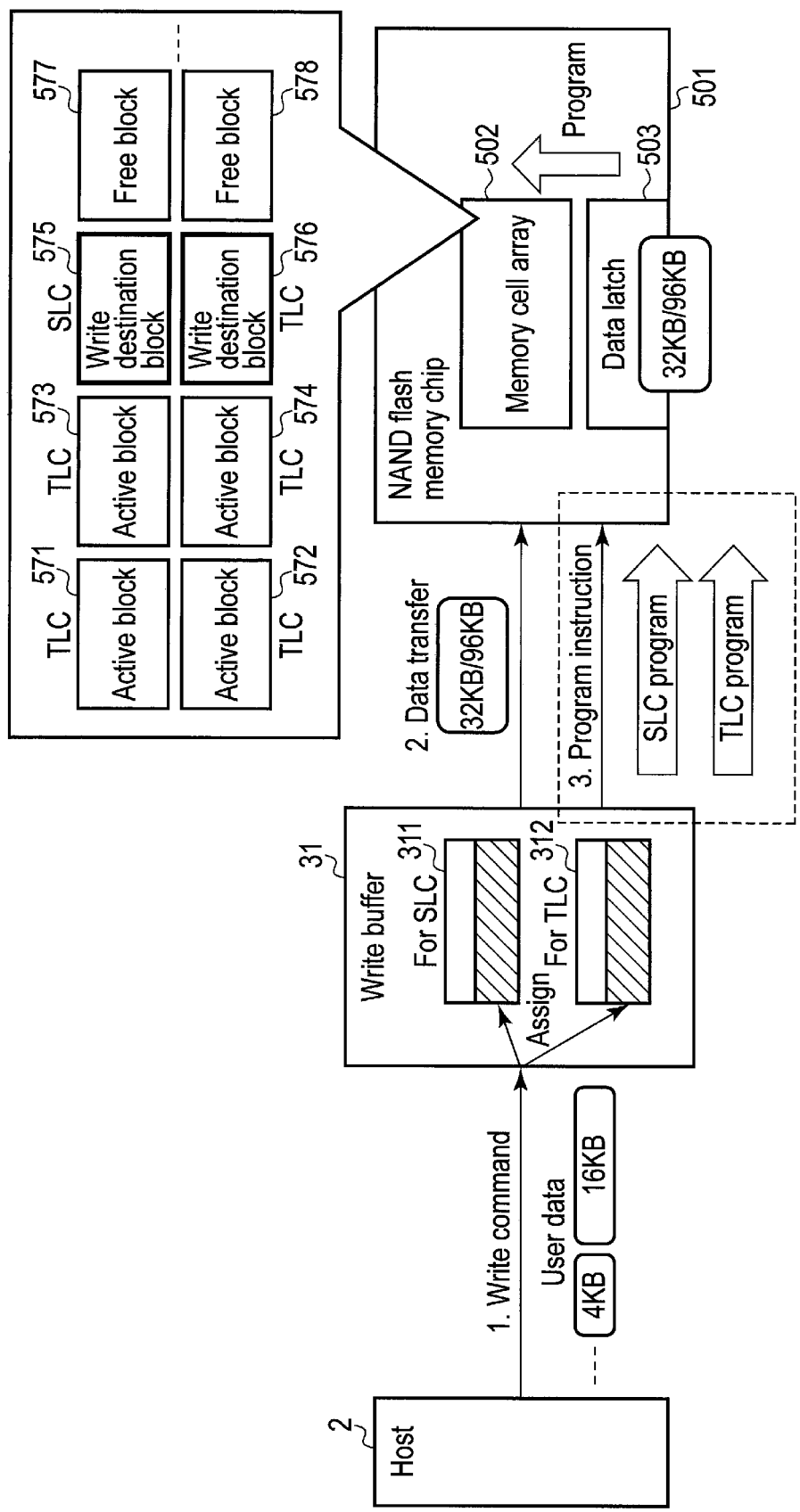
F I G. 26

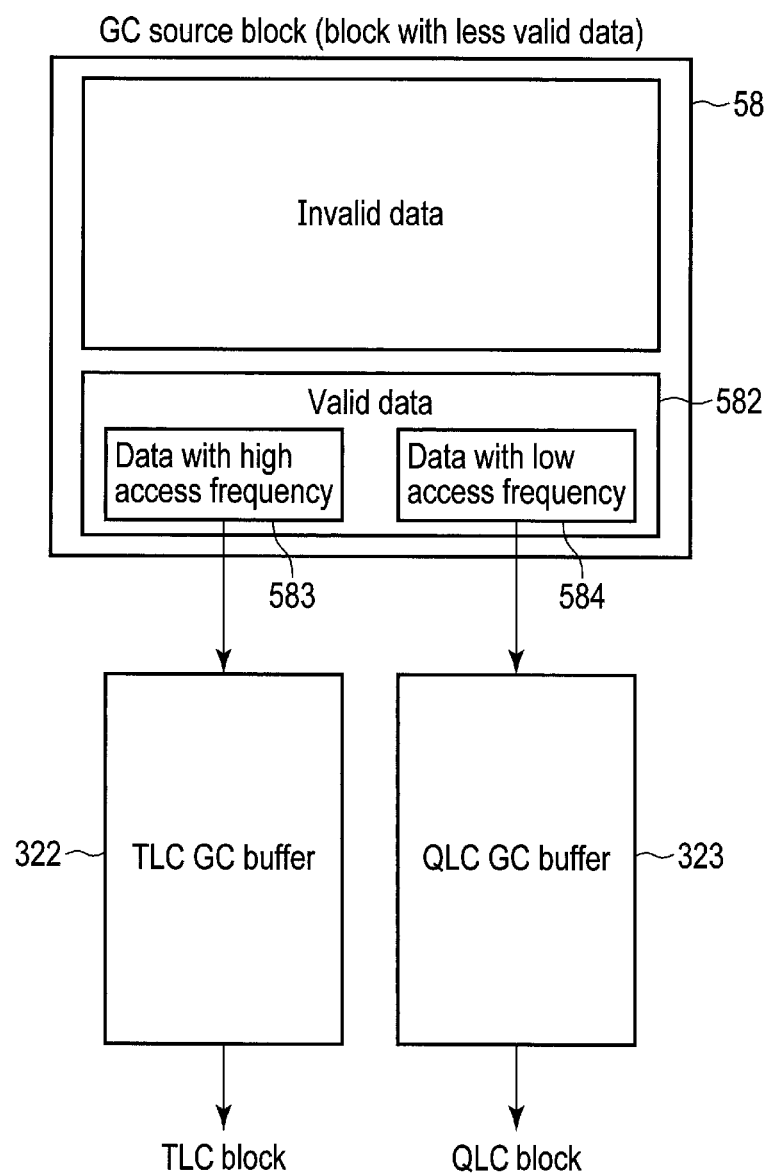
F I G. 27

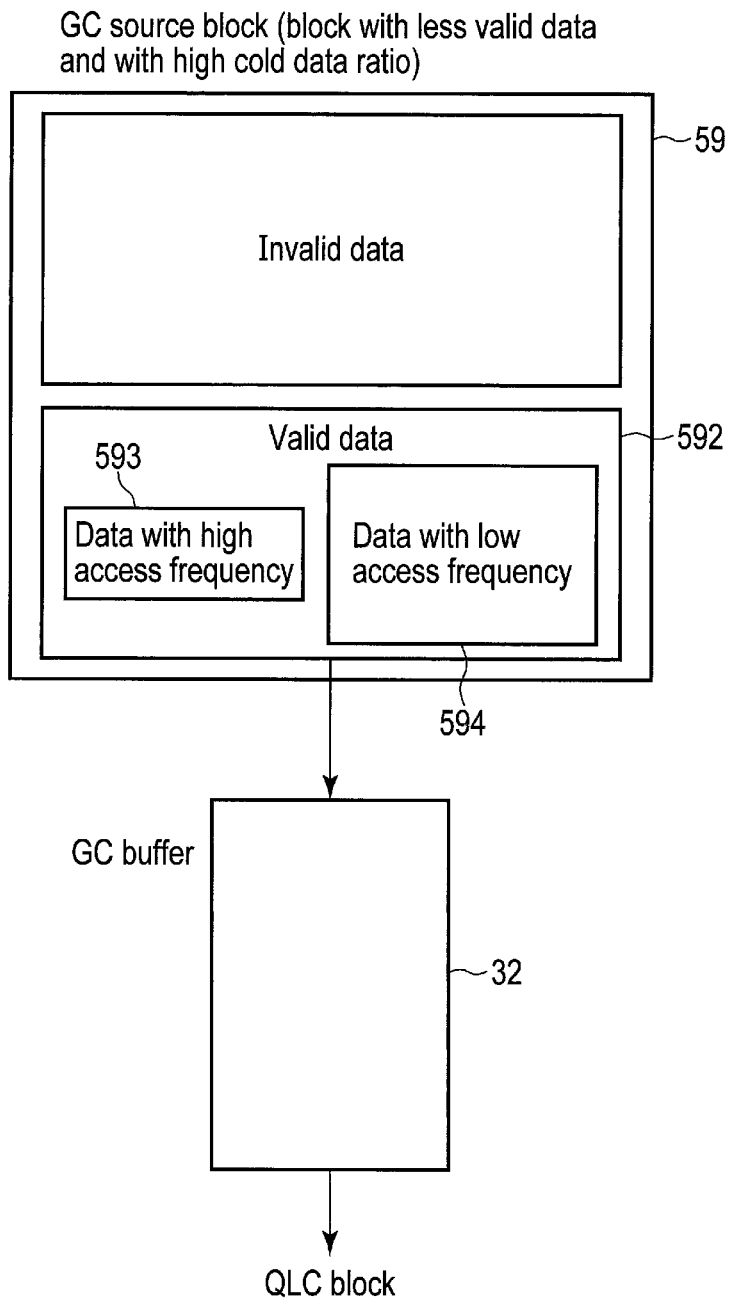
F I G. 28

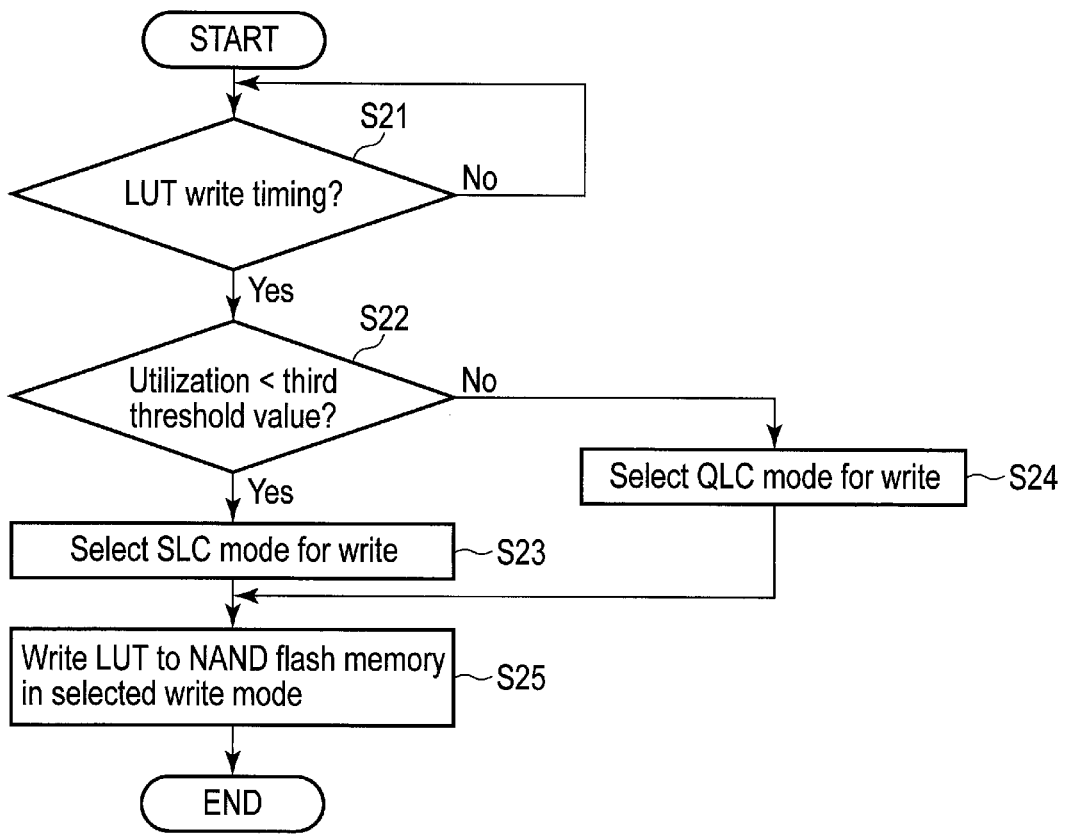
F I G. 30

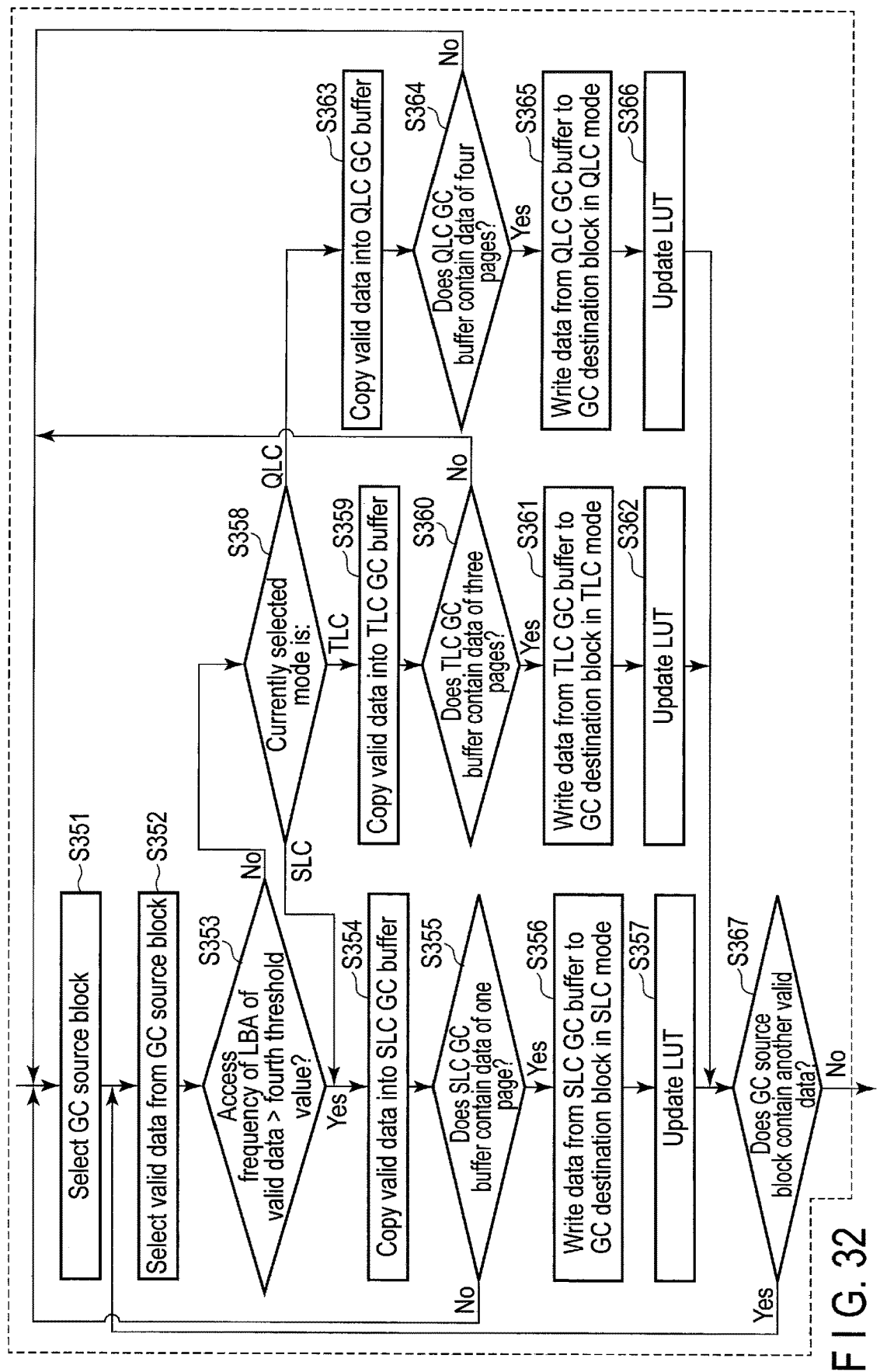
F I G. 32

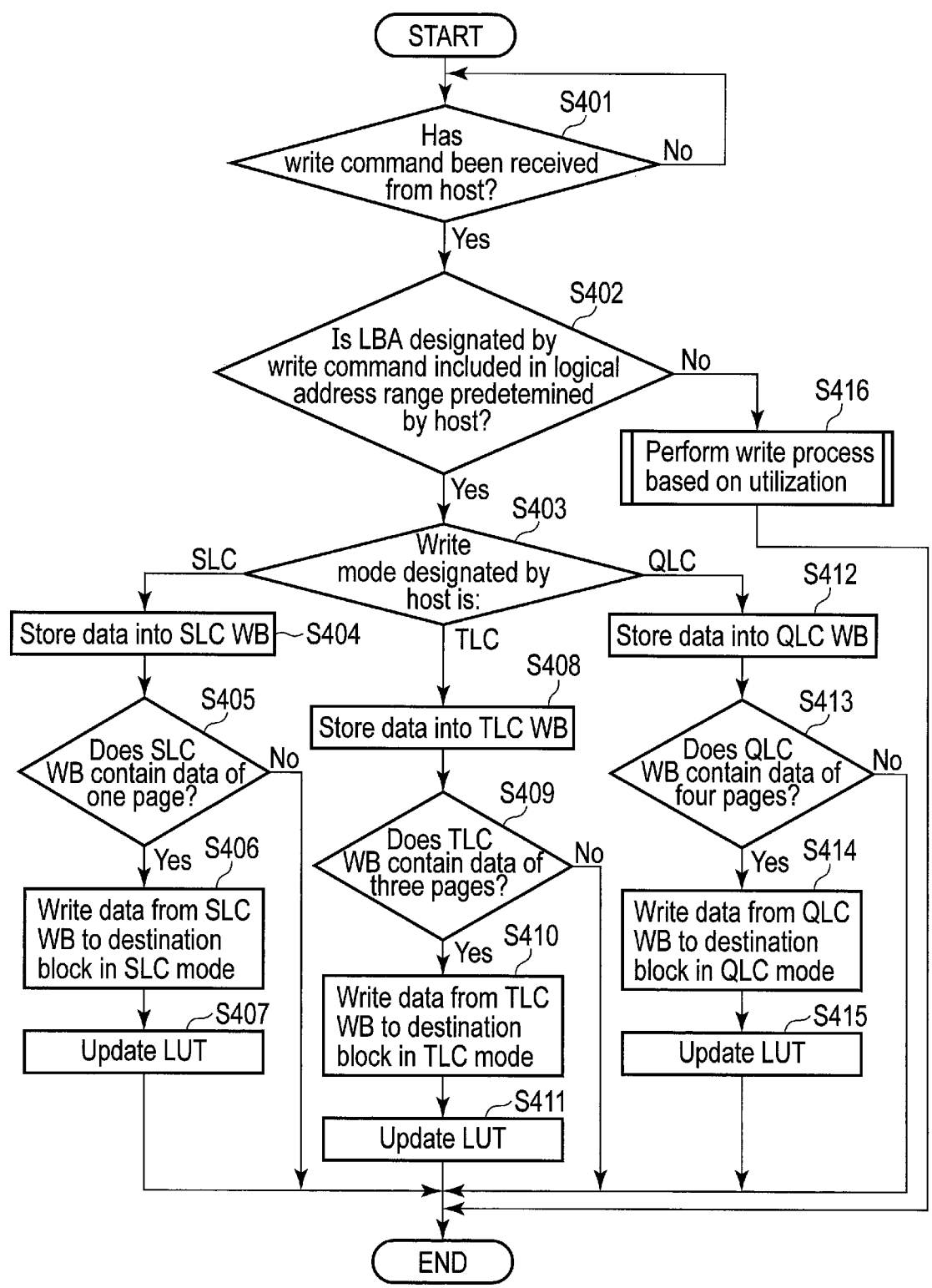
F I G. 33

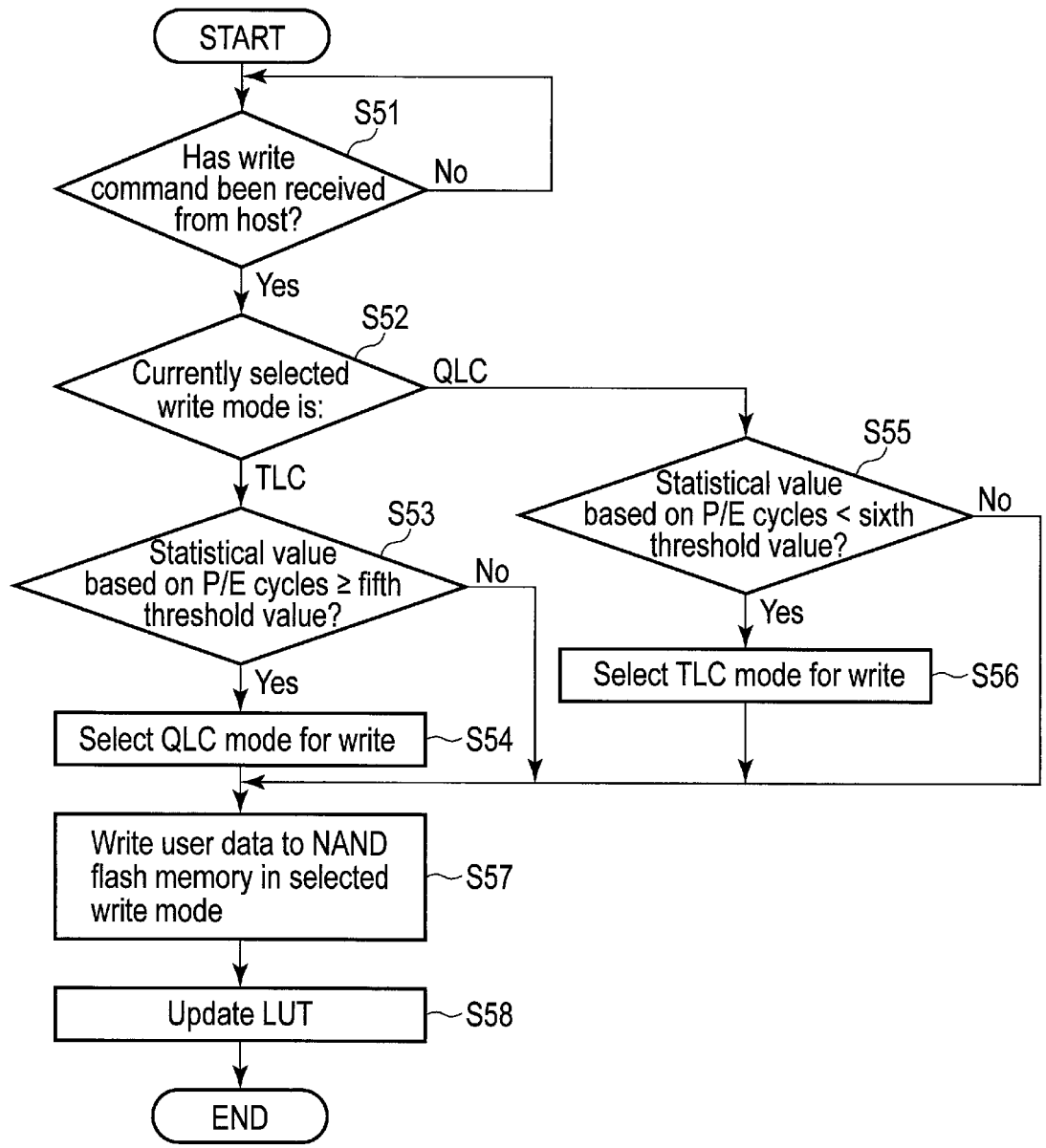
F I G. 36

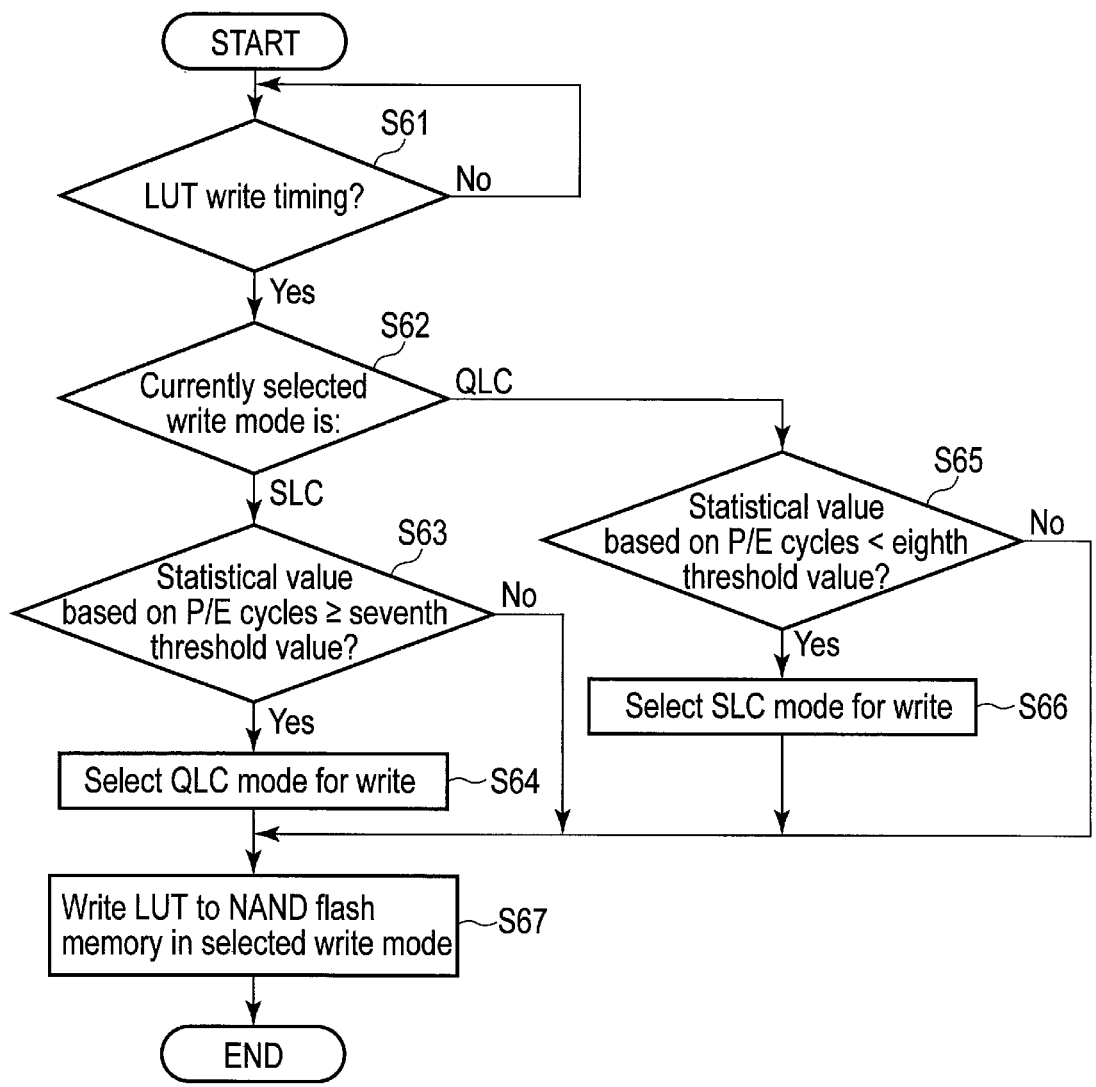
F I G. 37

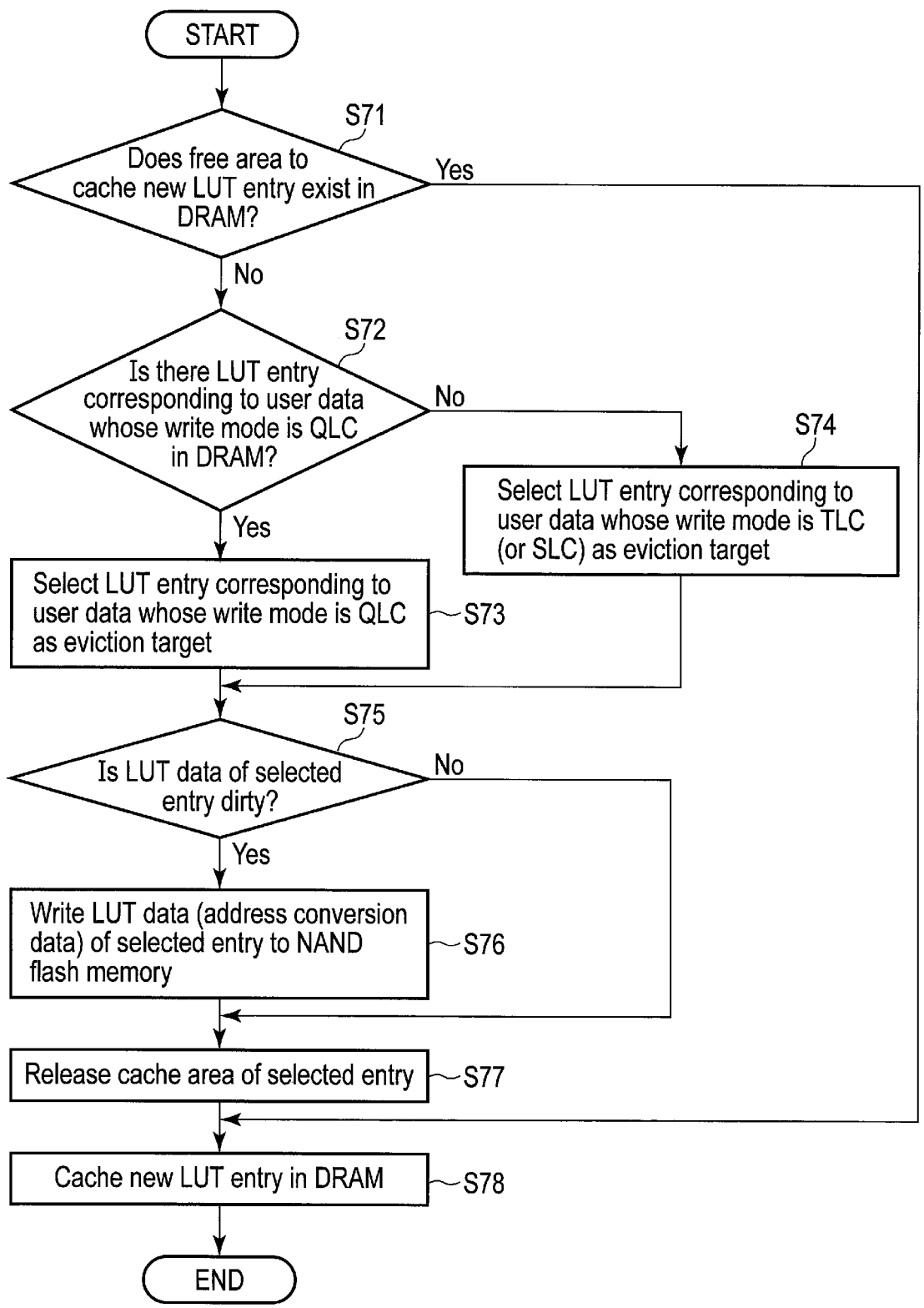
F I G. 40

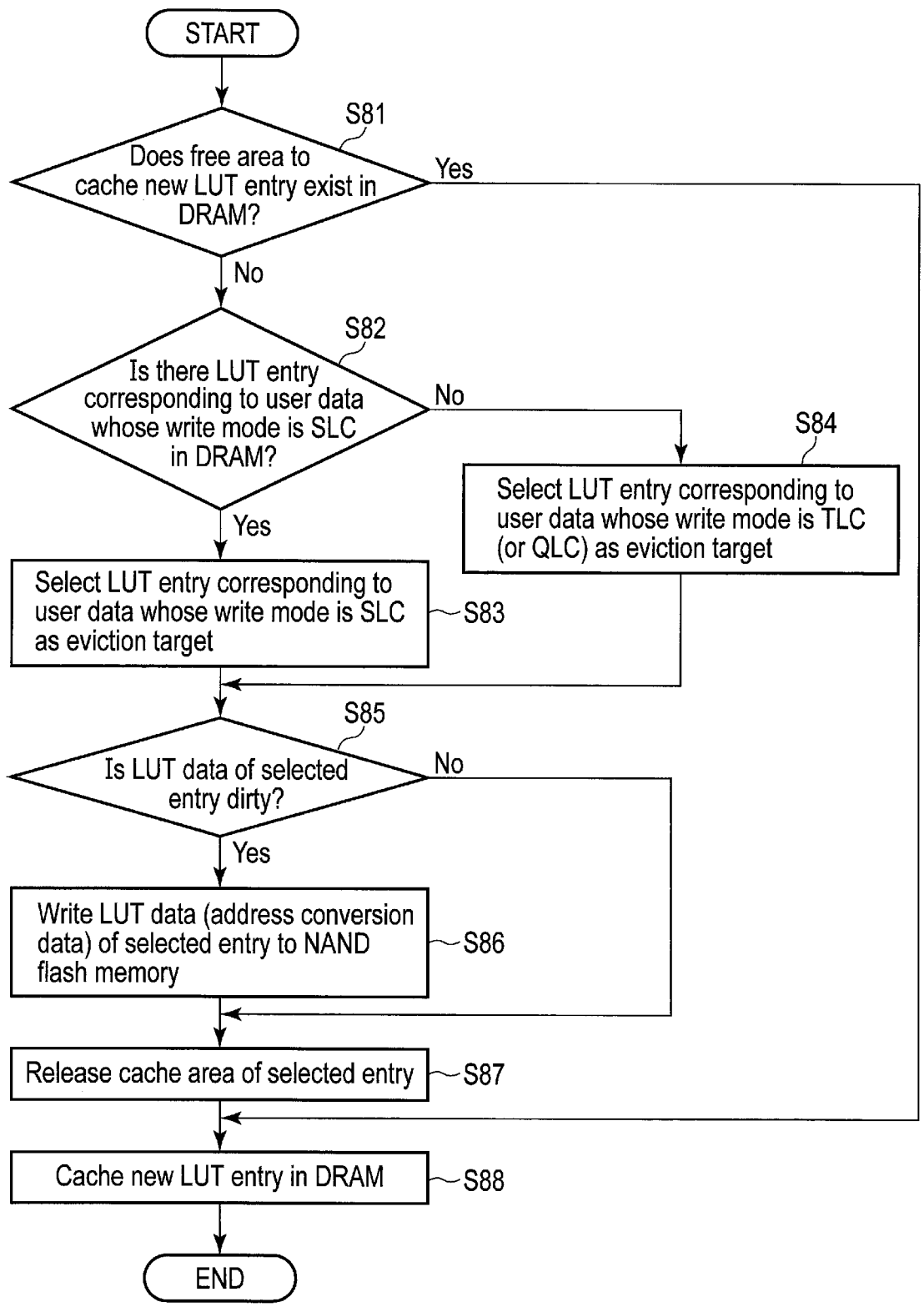
F I G. 43

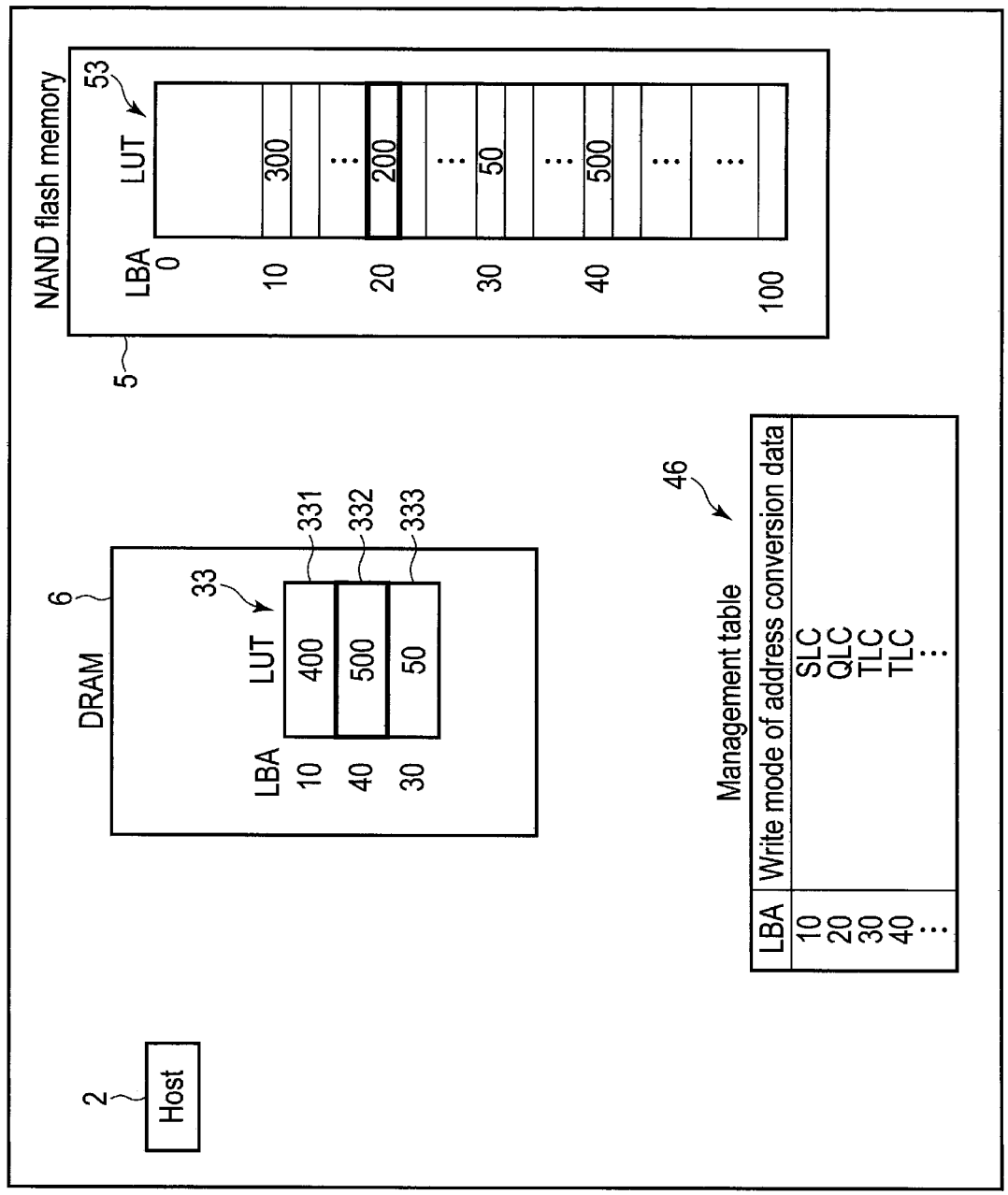
F I G. 45

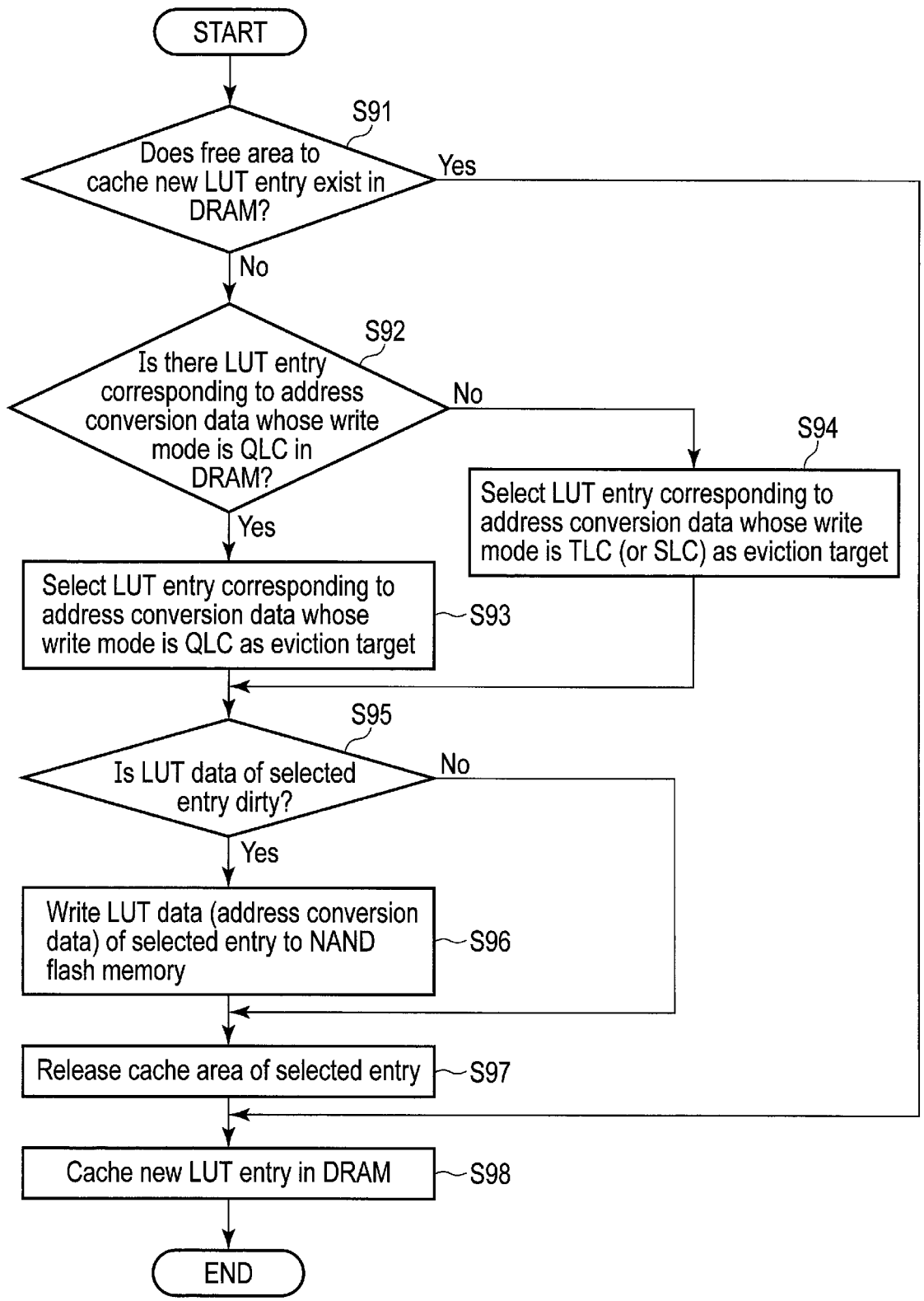
F I G. 46

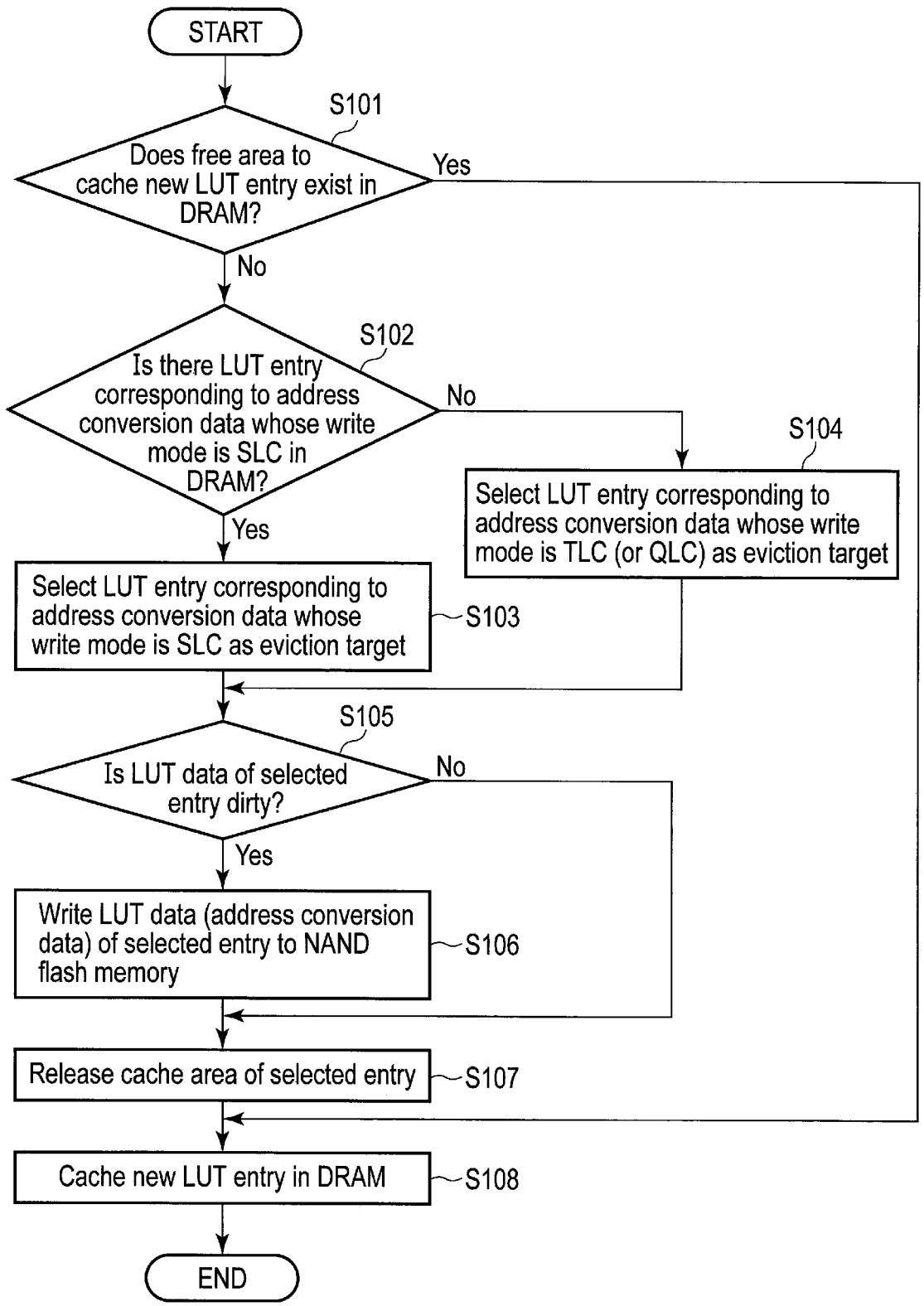
F I G. 49

US 10,824,353 B2

MEMORY SYSTEM

CROSS-REFERENCE TO RELATED APPLICATIONS

This application is based upon and claims the benefit of priority from Japanese Patent Application No. 2017-182025, filed Sep. 22, 2017, the entire contents of which are incorporated herein by reference.

FIELD

Embodiments described herein relate generally to a memory system including a nonvolatile memory.

BACKGROUND

In recent years, memory systems including a nonvolatile memory are widely used.

As a type of the memory systems, a solid state drive (SSD) including a NAND flash memory is known. SSDs are used as a main storage of various computing devices.

Since the tolerable maximum number of program/erase (P/E) cycles for a nonvolatile memory such as a NAND flash memory is limited, the nonvolatile memory may fail when the P/E cycles exceeding the limited number are executed.

Furthermore, in a nonvolatile memory, when the number of bits stored in each memory cell increases, a storage capacity (specifically, memory density) increases, and a time required to write data in the nonvolatile memory and a time required to read data from the nonvolatile memory both become longer.

Recently, memory systems configured to write data in a nonvolatile memory by selectively using a single level cell (SLC) mode to store one bit data in one memory cell and a multi level cell (MLC) mode to store two or more bit data in one memory cell have been developed.

BRIEF DESCRIPTION OF THE DRAWINGS

FIG. 1 is a block diagram showing an example of the structure of a memory system according to a first embodiment.

FIG. 4 shows an example of the structure of a block—number of P/E cycles table used in the memory system of the first embodiment.

FIG. 5 shows an example of the structure of an LBA range—access frequency table used in the memory system of the first embodiment.

FIG. 6 shows an example of the structure of a block—valid data amount table used in the memory system of the first embodiment.

FIG. 7 shows an example of the structure of a block—cold data ratio table used in the memory system of the first embodiment.

FIG. 8 shows an example of the structure of an LBA range—write mode table used in the memory system of the first embodiment.

FIG. 9 shows an example of the structure of a name space ID—write mode table used in the memory system of the first embodiment.

FIG. 10 shows an example of the structure of a stream ID—write mode table used in the memory system of the first embodiment.

FIG. 11 shows characteristics of write modes used in the memory system of the first embodiment.

FIG. 12 shows an example of storage capacities of a NAND flash memory corresponding to write modes of FIG. 11.

FIG. 15 shows an example of the NAND flash memory of the memory system of the first embodiment including an SLC mode only block group and a TLC/QLC shared block group.

FIG. 16 shows an example in which SLC mode is selected when user data is written in the memory system of the first embodiment.

FIG. 21 shows an example of transition of write performance corresponding to switching of write modes of user data by the memory system of the first embodiment.

FIG. 23 shows transition of write performance corresponding to switching of write modes of user data and switching of write modes of LUT by the memory system of the first embodiment.

FIG. 24 shows an example of a user data write operation by the memory system of the first embodiment.

FIG. 25 shows another example of a user data write operation by the memory system of the first embodiment.

FIG. 26 shows still another example of a user data write operation by the memory system of the first embodiment.

FIG. 27 shows an example of a garbage collection operation by the memory system of the first embodiment.

FIG. 28 shows another example of a garbage collection operation by the memory system of the first embodiment.

FIG. 30 is a flowchart of an example of the procedure of an LUT write process executed by the memory system of the first embodiment.

FIG. 32 is a flowchart showing another example of the procedure of a garbage collection process executed by the memory system of the first embodiment.

FIG. 33 is a flowchart showing another example of the procedure of a user data write process executed by the memory system of the first embodiment.

FIG. 36 is a flowchart of the procedure of a user data write process executed by the memory system of the second embodiment.

FIG. 37 is a flowchart of the procedure of an LUT write process executed by the memory system of the second embodiment.

FIG. 40 is a flowchart of the first example of the procedure of a cache control process executed by the memory system of the third embodiment.

FIG. 43 is a flowchart of the second example of the procedure of a cache control process executed by the memory system of the third embodiment.

FIG. 45 shows LUT on DRAM and LUT on NAND flash memory after the operation of FIG. 44.

FIG. 46 is a flowchart of the third example of the procedure of a cache control process executed by the memory system of the third embodiment.

FIG. 49 a flowchart of the fourth example of the procedure of a cache control process executed by the memory system of the third embodiment.

DETAILED DESCRIPTION

In general, according to one embodiment, a memory system includes a nonvolatile memory and a controller electrically connected to the nonvolatile memory. The controller selects a write mode from a first mode in which data having N bits is written per one memory cell and a second mode in which data having M bits is written per one memory cell. N is equal to or larger than one. M is larger than N. The controller writes data into the nonvolatile memory in the selected mode. The controller selects either the first mode or the second mode at least based on a total number of logical addresses mapped in a physical address space of the nonvolatile memory.

Various embodiments will be described hereinafter with reference to the accompanying drawings.

First Embodiment

Figure 2:
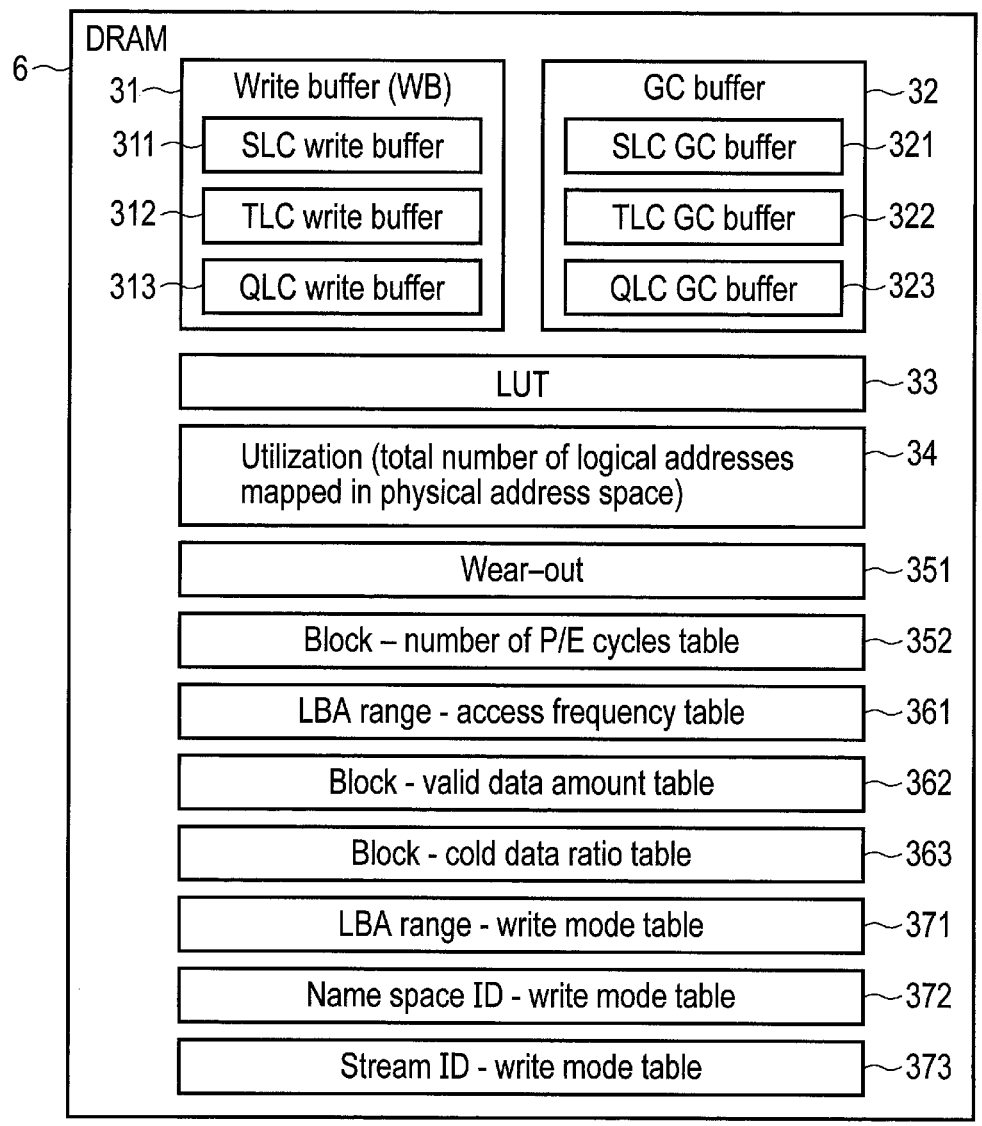
FIG. 2 is a block diagram showing an example of the structure of management data stored in DRAM provided with the memory system of the first embodiment.

With reference to FIGS. 1 and 2, an information processing system 1 including a memory system of the present embodiment will be explained.

The memory system is a semiconductor storage device configured to write data in a nonvolatile memory and read data from the nonvolatile memory. The memory system is realized as a solid state drive (SSD) 3 including a NAND flash memory, for example.

The information processing system 1 includes a host (specifically, host device) 2 and the SSD 3. The host 2 is an information processing apparatus (specifically, computing device) which accesses the SSD 3. The host 2 may be a server (specifically, storage server) which stores huge and various data in the SSD 3, or may be a personal computer.

The SSD 3 may be used as a main storage of the information processing apparatus functioning as the host 2. The SSD 3 may be contained in the information processing apparatus or may be connected to the information processing apparatus via a cable or a network.

As an interface for the mutual connection between the host 2 and the SSD 3, SCSI, serial attached SCSI (SAS), ATA, serial ATA (SATA), PCI Express (PCIe) (registered trademark), Ethernet (registered trademark), Fibre channel, or NVM Express (NVMe) (registered trademark) may be used.

The SSD 3 includes a controller 4 and a nonvolatile memory (e.g., NAND flash memory) 5. The controller 4 may be realized with a circuit such as system-on-a-chip (SoC). The SSD 3 may include a random access memory such as DRAM 6 as a volatile memory. Alternatively, a random access memory such as SRAM may be included in the controller 4. As shown in FIG. 2, the random access memory such as DRAM 6 includes, for example, a write buffer (WB) 31 and a GC buffer 32 that are buffer areas to temporarily store data to be written into or stored in the NAND flash memory 5, and a cache area of a lookup table (LUT) 33 functioning as an address conversion table (logical/physical address conversion table). Furthermore, the random access memory such as DRAM 6 may include storage areas for various information used for processing (for example, a utilization 34, a degree of wear-out 351, etc.) and various tables (for example, a block—number of P/E cycles table 352, an LBA range—access frequency table 361, a block—valid data amount table 362, a block—cold data ratio table 363, an LBA range—write mode table 371, a name space ID—write mode table 372, and a stream ID—write mode table 373). Note that DRAM 6 may be provided outside the controller 4.

Figure 3:
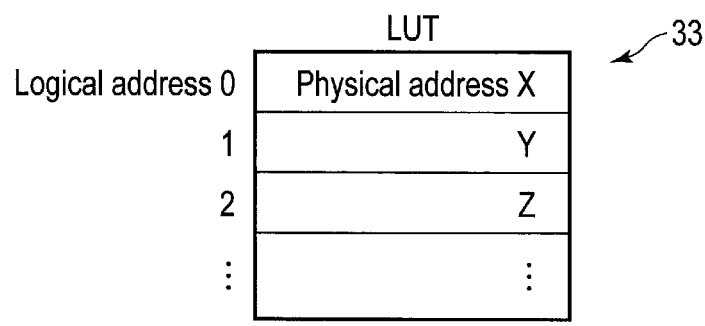
FIG. 3 shows an example of the structure of a lookup table (LUT) used in the memory system of the first embodiment.

As shown in FIG. 3, LUT 33 manages mapping between each logical address and each physical address of the NAND flash memory 5.

The degree of wear-out 351 is a value (e.g., statistical value) indicative of a degree of wear-out of the NAND flash memory 5. The degree of wear-out 351 may be derived using the block—number of P/E cycles table 352. The block—number of P/E cycles table 352 manages the number of P/E cycles for each block (specifically, the number of P/E cycles for each block to which a block ID is assigned) included in the NAND flash memory 5. In that case, the degree of wear-out 351 is derived from a statistics process of the number of P/E cycles of each block in the NAND flash memory 5. Note that, as describe later, the block—number of P/E cycles table 352 may manage the degree of wear-out of each block instead of or in addition to the number of P/E cycles.

The LBA range—access frequency table 361 manages, as shown in FIG. 5, access frequency in each LBA range. Each LBA range may be defined by a start LBA and an end LBA, or may be defined by a start LBA and a size.

The block—valid data amount table 362 manages, as shown in FIG. 6, a valid data amount of each block which is identified with a block ID. The valid data amount of each block may be represented by the number of valid clusters, or by percentage, or by a unit such as byte. The block—valid data amount table 362 is updated when the valid data amount of each block is varied corresponding to an operation based on commands received from the host 2 and a garbage collection operation.

The block—cold data ratio table 363 tracks a ratio of an amount of cold data in a block to the block size (hereinafter, referred to as a cold data ratio), where the block is identified with a block ID. Cold data in this specification means valid data with low access frequency. An access may mean an access via a read command and a write command (including a trim command). Alternatively, an access command may mean a write command (including a trim command) only. As shown in FIG. 7, the block—cold data ratio table 363 includes, for example, a block ID, an amount of valid data with high access frequency, an amount of valid data with low access frequency, and cold data ratio. The amount of valid data with high access frequency and the amount of valid data with low access frequency increase or decrease in accordance with a change of the access frequency of each LBA included in the LBA range based on updates of LUT 33 and LBA range—access frequency table 361. The cold data ratio is derived using the amount of valid data with high access frequency and the amount of valid data with low access frequency, and may be represented by percentage or the like.

The LBA range—write mode table 371 manages, as shown in FIG. 8, a relationship between an LBA range and a write mode corresponding to the LBA range. Each LBA range may be defined by a start LBA and an end LBA, or may be defined by a start LBA and a size.

The name space ID—write mode table 372 manages, as shown in FIG. 9, a relationship between a name space ID and a write mode corresponding to the name space ID.

The stream ID—write mode table 373 manages, as shown in FIG. 10, a relationship between a stream ID and a write mode corresponding to the stream ID.

Referring back to FIG. 1, the NAND flash memory 5 may include NAND flash memory chips (NAND flash memory dice). Each chip may be realized as a flash memory configured to store multiple bits per memory cell.

As a flash memory configured to store multiple bits per memory cell, a multi level cell (MLC or 4LC) flash memory configured to store 2-bit data per memory cell, a triple level cell (TLC or 8LC) flash memory configured to store 3-bit data per memory cell, and a quad level cell (QLC or 16LC) flash memory configured to store 4-bit data per memory cell may be used, for example.

The NAND flash memory 5 includes a memory cell array including memory cells arranged in an array. The NAND flash memory 5 may be a two-dimensional structure NAND flash memory or a three-dimensional NAND flash memory.

The memory cell array of NAND flash memory 5 includes blocks B0 to B(m-1). Each of the blocks B0 to B(m-1) includes pages (here, pages P0 to P(n-1)). The blocks B0 to B(m-1) each function as a minimum erase unit. A block may be referred to as an erase block or a physical block. Each of the pages P0 to P(n-1) includes memory cells connected to a single word line. The pages P0 to P(n-1) each function as a unit of data write operation and data read operation. Note that a word line may be used as a unit of data write operation and data read operation.

The tolerable maximum number of P/E cycles for each of the blocks B0 to B(m-1) is limited. One P/E cycle of a particular block includes an erase operation to erase data stored in all memory cells in the block and a write operation (program operation) to write data in each page of the block.

The NAND flash memory 5 may execute a write operation in an SLC mode in which one bit is written per memory cell, an MLC mode in which two bits are written per memory cell, a TLC mode in which three bits are written per memory cell, or a QLC mode in which four bits are written per memory cell.

For example, the NAND flash memory 5 may be realized as an MLC flash memory configured to store two bits per memory cell (4LC flash memory).

In that case, generally, two page data (lower page data and upper page data) is written in memory cells connected to a single word line. Thus, two bits can be written per memory cell. Any area in the MLC flash memory (for example, any one or more blocks) may be used as an area configured to store only one bit per memory cell (SLC area).

In a write operation to write data in an SLC area, only data for one page (one page data) is written in memory cells connected to a single word line. Thus, in each block used as an SLC area, only one bit may be written per memory cell as in each block within the SLC flash memory (SLC block). As a result, each block used as an SLC area function as an SLC block.

Alternatively, the NAND flash memory 5 may be a TLC flash memory configured to store three bits per memory cell (8LC flash memory).

In that case, generally, three page data (lower page data, middle page data, and upper page data) is written in memory cells connected to a single word line. Thus, three bits may be written per memory cell. Any area in the TLC flash memory (for example, any one or more blocks) may be used as the above-described SLC area, or an MLC area configured to store two bits per memory cell. Note that the SLC area and MLC area may be set by a unit smaller than a block (for example, unit of word line, unit of word lines in a block). In the MLC area, only data of two pages is written in memory cells connected to a single word line. Thus, in the MLC area, only two bits may be written per memory cell.

Alternatively, the NAND flash memory 5 may be a QLC flash memory configured to store four bits per memory cell (16LC flash memory).

In that case, generally, four page data is written in memory cells connected to a single word line. Thus, four bits may be written per memory cell. Any area (for example, any one or more blocks) in the QLC flash memory may be used as the above-described SLC area, or may be used as the above-described MLC area, or may be used as a TLC area configured to store three bits per memory cell. Note that each of the SLC area, MLC area, and TLC area may be set by a unit smaller than a block (for example, unit of word line, unit of word lines in a block). In the TLC area, only data of three pages is written in memory cells connected to a single word line. Thus, in the TLC area, only three bits may be written per memory cell.

As shown in FIG. 11, data density per memory cell in each write mode is two values (one bit per cell, one page per word line) in the SLC mode, four values (two bits per cell, two pages per word line) in the MLC mode, eight values (three bits per cell, three pages per word line) in the TLC mode, and sixteen values (four bits per cell, four pages per word line) in the QLC mode. Here, data read speed and data write speed of the NAND flash memory 5 become slow when the data density is high and become fast when the data density is low. Thus, in these four modes, data read and write speed is slowest in the QLC mode and is fastest in the SLC mode.

Furthermore, an endurance of NAND flash memory 5 becomes lower when the data density thereof is higher and becomes higher when the data density thereof is lower. That is, referring to the distribution of threshold voltages of memory cells, margins in the threshold voltage distribution is wider when the data density is lower and margins in the threshold voltage distribution is narrower when the data density is higher. A wide margin can suppress, even when a threshold voltage of a memory cell is shifted by a stress applied to the memory cell, a possibility that the data of the memory cell are read as incorrect data. Thus, acceptable stress of individual memory cell in the SLC mode is greater than acceptable stress of individual memory cell in the QLC mode. As a result, when a write mode of low data density which can achieve wide margin in the threshold distribution is used, an endurance (tolerable maximum number of P/E cycles) of the NAND flash memory 5 is extended as compared to a case where a write mode of high data density which achieves narrow margin in the threshold voltage distribution. Thus, in these four modes, an endurance is lowest in the QLC mode and an endurance is highest in the SLC mode. For example, the tolerable maximum number of P/E cycles when data is written in the QLC mode is several k (thousand) cycles and the tolerable maximum number of P/E cycles when data is written in the SLC mode is several tens k cycles.

Note that the NAND flash memory 5 may be configured to store five or more bits per memory cell. In that case, any area in the NAND flash memory 5 may be used as an area in which data of four or less bits are written per memory cell.

FIG. 12 shows an example of storage capacities of the NAND flash memory 5 corresponding to the write modes. Here, in this example, NAND flash memory chips included in the NAND flash memory 5 are realized as QLC flash memories configured to store four bits per memory cell. Furthermore, it is assumed that the storage capacity of the SSD 3 is 512 GB when data is written in the NAND flash memory 5 in the QLC mode.

As shown in FIG. 12, in an ideal state where there is no bad block (i.e., defective block), the storage capacity of the SSD 3 is 384 GB when data is written in the NAND flash memory 5 in the TLC mode, is 256 GB when data is written in the NAND flash memory 5 in the MLC mode, and is 128 GB when data is written in the NAND flash memory 5 in the SLC mode.

As described above, the storage capacity of the NAND flash memory 5 varies depending on the write modes, and hence, the storage capacity of the SSD 3 varies.

Referring back to FIG. 1, the controller 4 is electrically connected to the NAND flash memory 5 as a nonvolatile memory through a NAND interface 13 such as a Toggle DDR or an open NAND flash interface (ONFI). The NAND interface 13 functions as a NAND control circuit configured to control the NAND flash memory 5. The NAND interface 13 may be connected to chips in the NAND flash memory 5 through channels.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, (2) process for encapsulating read/write operations of each page and erase operations of each block to provide read/write operations in a sector unit to the host 2, and the like. The logical address is an address used by the host 2 for addressing the SSD 3. As a logical address, for example, a logical block address (LBA) may be used.

The management of mapping between each logical block address (LBA) and each physical address is executed by using a lookup table (LUT) 33 functioning as an address conversion table (logical/physical address conversion table). The controller 4 manages mapping between each LBA and each physical address with a certain management size unit by using the lookup table (LUT) 33. A physical address corresponding to an LBA indicates a physical memory location in the NAND flash memory 5 to which data of the LBA is written. An address conversion table (LUT 33) may be loaded to the DRAM 6 from the NAND flash memory 5 when the SSD 3 is powered on.

Data write into one page is executable only once in a single P/E cycle. Thus, the controller 4 writes update data corresponding to an LBA not to an original physical memory location in which previous data corresponding to the LBA is stored but to a different physical memory location. Then, the controller 4 updates the lookup table (LUT) 33 to associate the LBA with the different physical memory location and to deactivate the previous data. Hereinafter, data referred by the LUT 33 (that is, data associated with a logical address) will be referred to as valid data. Furthermore, data not associated with any logical address will be referred to as invalid data. The valid data is data to possibly be read by the host 2 later. The invalid data is data not to be read by the host 2 anymore.

The block management includes, for example, management of bad block (i.e., defective block), wear leveling, and garbage collection.

The controller 4 may include a host interface 11, a CPU 12, a NAND interface 13, a DRAM interface 14, and the like. The host interface 11, the CPU 12, the NAND interface 13, and the DRAM interface 14 may be mutually connected through a bus 10.

The host interface 11 functions as a circuit that receives various commands such as I/O commands, various control commands and the like from the host 2. The I/O commands may include a write command, a read command, an unmap command (trim command), a format command, a flush command, and the like. The format command is a command for unmapping all the logical addresses in the SSD 3 entirely. The flush command is a command for writing dirty data (user data and related management data) that is cached (buffered) in the SSD 3, to the NAND flash memory 5 in order to set the SSD 3 in a clean state completely.

The DRAM interface 14 functions as a DRAM controller configured to control accesses of the DRAM 6. The memory area of the DRAM 6 is used to store the write buffer (WB) 31, the GC buffer 32, and the lookup table (LUT) 33, for example.

The CPU 12 is a processor configured to control the host interface 11, the NAND interface 13, and the DRAM interface 14. The CPU 12 performs various processes by executing control programs (e.g., firmware) stored in a ROM or the like which is not shown. The CPU 12 may perform, in addition to the above-described processes of FTL, command processes to process various commands from the host 2. The operation of the CPU 12 is controlled by the above-described firmware executed by the CPU 12. Note that part of or the entire FTL processes and the command processes may be executed by a dedicated hardware in the controller 4.

The CPU 12 may function as a mode switch module 121, a read control module 122, write control module 123, a garbage collection (GC) control module 124, a cache control module 125, and an access frequency statistics processing module 126.

The mode switch module 121 adaptively controls write modes to write data (write data) received from the host 2 in the NAND flash memory 5. The write data may include data written in the NAND flash memory 5 by a garbage collection operation. The mode switch module 121 is configured to dynamically switch the write mode between a first mode where data having N bits is written per one memory cell and a second mode where data having M bits is written per one memory cell. Here, N is equal to or larger than one and M is larger than N.

The first mode is a mode having its priority in performance (i.e., performance intensive) where the number of bits stored per memory cell is decreased to improve write and read performance. On the other hand, the second mode is a mode having its priority in capacity (i.e., storage capacity intensive) where the number of bits stored per memory cell is increased to guarantee to provide a full storage capacity expected by the host 2 (i.e., a user capacity).

When the first mode is selected as a write mode, write performance is higher than a case of the second mode. Furthermore, a time required to read data written in the first mode is shorter than a time required to read data written in the second mode, and thus, the read performance is high. On the other hand, when the second mode is selected as the write mode, the SSD 3 can guarantee to provide a full storage capacity expected by the host 2 while the read/write performance decreases as compared to a case of the first mode. Thus, by dynamically switching between the first mode and the second mode, providing a full storage capacity (i.e., a user capacity) is guaranteed, and, at the same time, a high performance can be provided when the storage capacity actually used is low.

Examples of combinations of the first and second modes are as follows.

Combination #1: SLC mode in which one bit is written per memory cell is used as the first mode and a mode in which multiple bits are written per memory cell is used as the second mode. A mode in which multiple bits are written per memory cell may be MLC mode in which two bits are written per memory cell, TLC mode in which three bits are written per memory cell, or QLC mode in which four bits are written per memory cell.

Combination #2: MLC mode is used as the first mode and TLC mode or QLC mode is used as the second mode.

Combination #3: TLC mode is used as the first mode and QLC mode is used as the second mode.

Alternatively, the mode switch module 121 may be configured to dynamically switch the write mode between first, second, and third modes having different numbers of bits to store per one memory cell. The third mode is a mode in which data having L bits is written per one memory cell, and L is larger than M.

Examples of combinations of the first, second, and third modes are as follows.

Combination #4: SLC mode is used as the first mode, MLC mode is used as the second mode, and TLC mode is used as the third mode.

Combination #5: SLC mode is used as the first mode, TLC mode is used as the second mode, and QLC mode is used as the third mode.

Combination #6: SLC mode is used as the first mode, MLC mode is used as the second mode, and QLC mode is used as the third mode.

Combination #7: MLC mode is used as the first mode, TLC mode is used as the second mode, and QLC mode is used as the third mode.

In a similar manner, the mode switch module 121 may be configured to dynamically switch the write mode between four or more modes having different numbers of bits to store per memory cell.

Hereinafter, referring to the combination #5 (of SLC mode in which one bit is written per memory cell, TLC mode in which three bits are written per memory cell, and QLC mode in which four bits are written per memory cell), a dynamically switching process of write modes will be explained.

Figure 13:
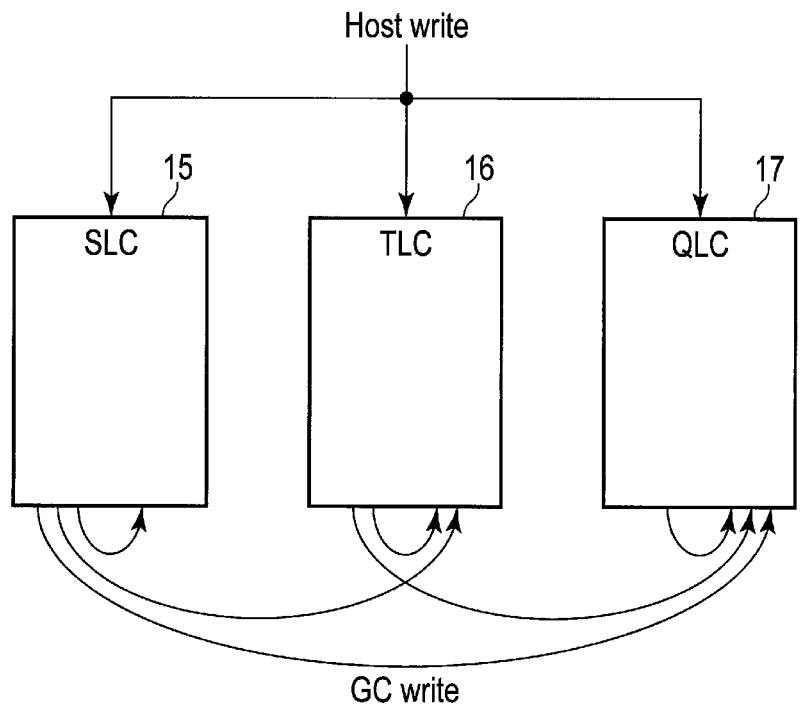
FIG. 13 shows switching a write mode to another write mode with larger number of bits per cell in the memory system of the first embodiment.

As shown in FIG. 13, the mode switch module 121 is configured to dynamically switch write modes to write the write data received from the host 2 to the NAND flash memory 5 between SLC mode 15, TLC mode 16, and QLC mode 17 based on any index or any factor. Hereinafter, writing the write data received from the host 2 to the NAND flash memory 5 may be referred to as host writing.

Furthermore, the mode switch module 121 is configured to switch, in a garbage collection operation, a write mode to write data to the NAND flash memory 5 to a mode in which more bits are stored per memory cell based on any index or any factor. Specifically, when valid data written in a GC source block in SLC mode 15 is to be written in a GC destination block, the mode switch module 121 may select the SLC mode 15 as it is or may switch to TLC mode 16 or QLC mode 17 in which more bits may be stored per memory cell. When valid data written in a GC source block in TLC mode 16 is to be written in a GC destination block, the mode switch module 121 may select the TLC mode 16 as it is or may switch to QLC mode 17 in which more bits may be stored per memory cell. Furthermore, when valid data written in a GC source block in QLC mode 17 is to be written in a GC destination block, the mode switch module 121 may select the QLC mode 17 as it is. Note that, hereinafter, writing data to the NAND flash memory 5 in a garbage collection operation will be referred to as GC writing.

Figure 14:
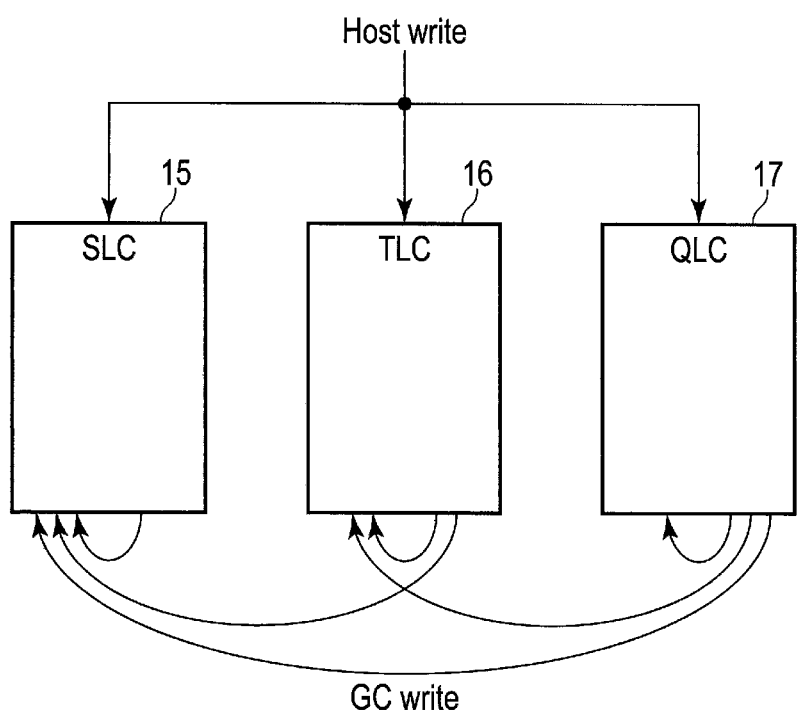
FIG. 14 shows switching a write mode to another write mode with smaller number of bits per cell in the memory system of the first embodiment.

Furthermore, as shown in FIG. 14, the mode switch module 121 may be configured to switch, in a garbage collection operation, a write mode to write data to the NAND flash memory 5 to a mode in which fewer bits are stored per memory cell based on any index or any factor. Specifically, when valid data written in a GC source block in QLC mode 17 is to be written in a GC destination block, the mode switch module 121 may select the QLC mode 17 as it is or may switch to TLC mode 16 or SLC mode 15 in which fewer bits are stored per memory cell. When valid data written in a GC source block in TLC mode 16 is to be written in a GC destination block, the mode switch module 121 may select the TLC mode 16 as it is or may switch to SLC mode 15 in which fewer bits are stored per memory cell. Furthermore, when valid data written in a GC source block in SLC mode 15 is to be written in a GC destination block, the mode switch module 121 may select the SLC mode 15 as it is.

Furthermore, blocks included in the NAND flash memory 5 may be used as blocks of either SLC mode only block group 18 or TLC/QLC shared block group 19 as shown in FIG. 15. To blocks of SLC mode only block group 18, data is written in SLC mode 15. To blocks of TLC/QLC shared block group 19, data is written in TLC mode 16 or QLC mode 17.

As an index or a factor for switching the write mode, the mode switch module 121 may use, for example, the total number of logical addresses mapped in a physical address space (hereinafter, referred to as utilization). The utilization may be a value between zero and the maximum number of logical addresses (which corresponds to the storage capacity of the SSD 3) that may be allocated at any point in time within the total size of the logical address space. Alternatively, in the present embodiment, the utilization may be represented as a ratio between 0% that is the minimum number and 100% that is the maximum number. The maximum number of logical addresses allocated at any point in time is smaller than the total size of logical address space in a case where a thin provisioned storage device is used, or is equal to the total size of the logical address space otherwise.

Figure 17:
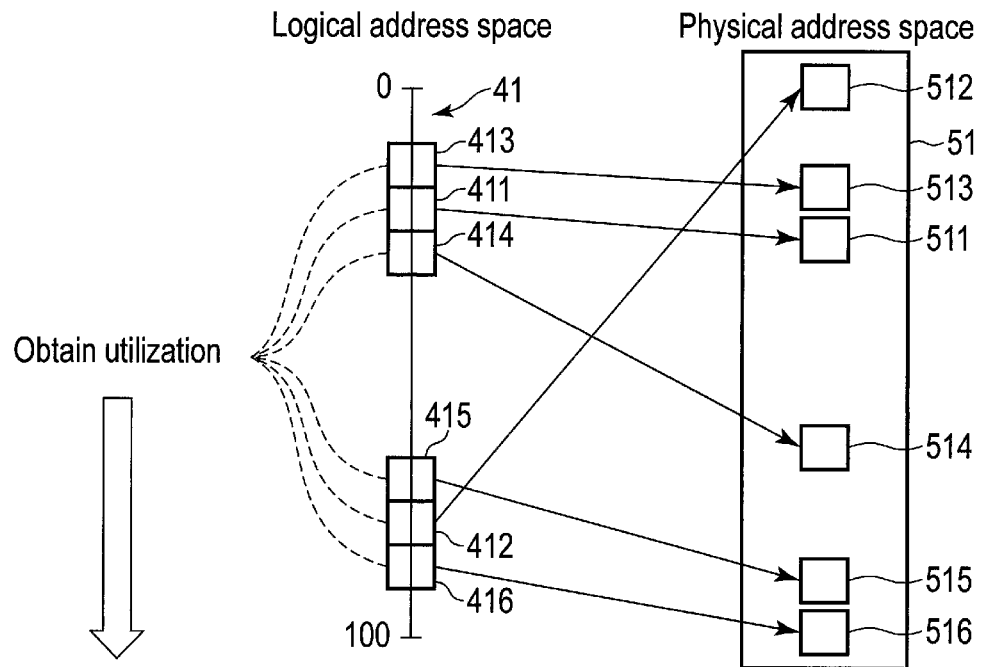
FIG. 17 shows an example in which TLC mode is selected when user data is written in the memory system of the first embodiment.
Figure 18:
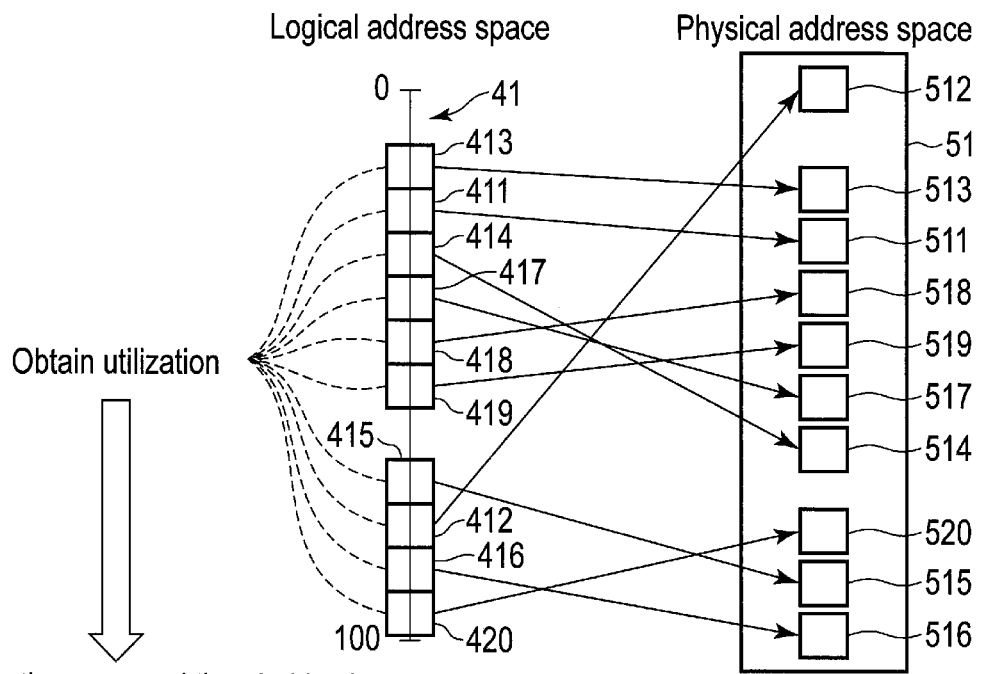
FIG. 18 shows an example in which QLC mode is selected where user data is written in the memory system of the first embodiment.

With reference to FIGS. 16 to 18, specific examples of switching write modes will be explained. In the logical address space 41, a logical address mapped in a physical address space 51 and a logical address unmapped in a physical address space 51 may be included. Each logical address may be mapped in a physical address indicative of an area to which data of a minimum access (I/O) unit (for example, a cluster unit of 4 KB) is written in the physical address space 51.

In the example of FIG. 16, a logical address 411 is mapped to a physical address 511, and a logical address 412 is mapped to a physical address 512. Logical addresses other than the logical addresses 411 and 412 are not mapped to any physical address. Thus, the mode switch module 121 obtains two as the utilization. Then, the mode switch module 121 sets, if the utilization of two is lower than the first threshold value, SLC mode 15 as the write mode.

Furthermore, in the example of FIG. 17, logical addresses 411, 412, 413, 414, 415, and 416 are mapped to physical addresses 511, 512, 513, 514, 515, and 516, respectively. Logical addresses other than the logical addresses 411, 412, 413, 414, 415, and 416 are not mapped to any physical address. Thus, the mode switch module 121 obtains six as the utilization. Then, the mode switch module 121 sets, if the utilization of six is equal to or higher than the first threshold value and is lower than the second threshold value, TLC mode 16 as the write mode. Note that the second threshold value is larger than the first threshold value.

Furthermore, in the example of FIG. 18, logical addresses 411, 412, 413, 414, 415, 416, 417, 418, 419, and 420 are mapped to physical addresses 511, 512, 513, 514, 515, 516, 517, 518, 519, and 520, respectively. Logical addresses other than the logical addresses 411, 412, 413, 414, 415, 416, 417, 418, 419, and 420 are not mapped to any physical address. Thus, the mode switch module 121 obtains 10 as the utilization. Then, the mode switch module 121 sets, if the utilization of 10 is equal to or higher than the second threshold value, QLC mode 17 as the write mode.

The total number of logical addresses mapped in the physical address space (utilization) will be explained with reference to FIGS. 19 and 20.

Figure 19:
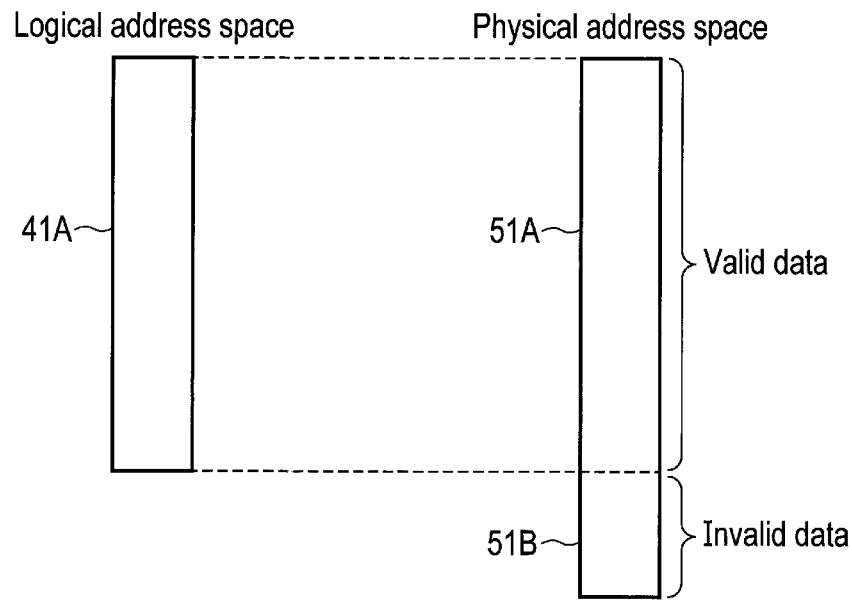
FIG. 19 shows physical addresses mapped in a logical address space in the memory system of the first embodiment.
Figure 20:
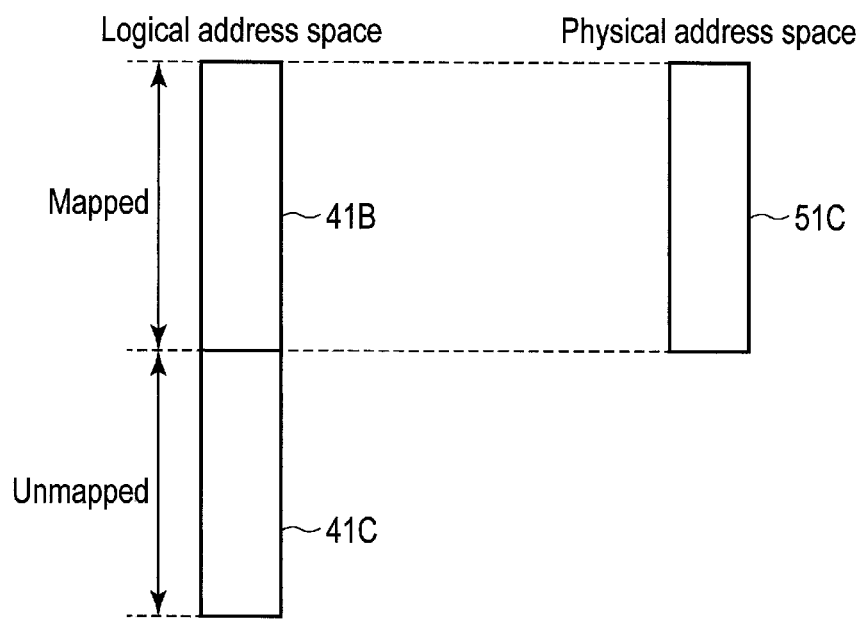
FIG. 20 shows logical addresses mapped in a physical address space in the memory system of the first embodiment.

FIG. 19 shows physical addresses 51A mapped in a logical address space 41A (i.e. physical addresses each stores valid data) and physical addresses 51B unmapped in a logical address space 41A (i.e. physical addresses each stores invalid data). In contrast, FIG. 20 shows logical addresses 41B mapped in a physical address space 51C and logical addresses 41C unmapped in a physical address space 51C.

In the present embodiment, write modes of data to the NAND flash memory 5 are switched based on the total number of logical addresses 41B mapped in the physical address space 51C (utilization).

Note that, when a write command is received from the host 2, a state of the logical address designated by the write command and the utilization will change as follows.

(1-1) When a write command designating a logical address in an unmapped state is received, the designated logical address changes to a mapped state and the utilization increases.

(1-2) When a write command designating a logical address in a mapped state is received, the designated logical address stays in the mapped state and the utilization does not change.

Furthermore, when an unmap (trim) command is received from the host 2, a state of a logical address designated by the unmap (trim) command and the utilization change as follows.

(2-1) When an unmap (trim) command designating a logical address in an unmapped state is received, the designated logical address stays in the unmapped state and the utilization does not change.

(2-2) When an unmap (trim) command designating a logical address in a mapped state is received, the designated logical address changes to an unmapped state and the utilization decreases.

Note that, when a format command is received from the host 2, a state of logical address and utilization change as described in (2-1) or (2-2) depending on whether each of the logical addresses is in the unmapped state or in the mapped state. Specifically, the utilization after format command execution becomes zero.

FIG. 21 shows an example of transition of write performance corresponding to switching of write modes of user data based on the total number of logical addresses mapped in a physical address space (i.e., utilization). In the first embodiment, providing a full storage capacity (i.e., a user capacity) is guaranteed, and, at the same time, a high performance can be provided. That is, when the utilization is low, the controller 4 of the SSD 3 improves the write performance and the read performance by writing user data in a write mode in which performance is prioritized over storage capacity; hereinafter, simply denoted by 'performance-prioritized'. Here, it is assumed that TLC mode 16 is set as the write mode in an initial state (T0).

As shown in FIG. 21, when a utilization 71 becomes equal to or higher than a threshold value 71A while user data is written in TLC mode 16 (T1), the mode switch module 121 switches the write mode from TLC mode 16 to QLC mode 17. By switching the write mode to QLC mode 17, the write performance 73 decreases but the SSD 3 can guarantee to provide a full storage capacity expected by the host 2 (that is, storage capacity is prioritized over performance. Hereinafter, it is denoted by 'capacity-prioritized'.). By contrast, for example, in a case where increase of the utilization 71 is ignored and user data are all written in SLC mode 15 to maximize the performance, user data cannot be written in the NAND flash memory 5 even when a write command is received (that is, a free block cannot be generated no matter how much garbage collection operation is performed). In the present embodiment, as described above, a write mode is switched to increase the number of bits of data written per one memory cell (hereinafter, denoted by the number of bits per cell) when the utilization 71 increases, and such a problem can be prevented.

Furthermore, when the utilization 71 decreases in response to execution of an unmap command or the like and becomes lower than the threshold value 71A (T2), the mode switch module 121 switches the write mode from QLC mode 17 to TLC mode 16. By switching the write mode to TLC mode 16, the write performance 73 increases (performance-prioritized). Note that a time required to read user data written in TLC mode 16 is shorter than a time required to read user data written in QLC mode 17, and thus, by switching the write mode from QLC mode 17 to TLC mode 16, not only the write performance but also the read performance can be improved.

Furthermore, when the utilization 71 becomes equal to or higher than the threshold value 71A while user data is written in TLC mode 16 (T3), the mode switch module 121 switches the write mode from TLC mode 16 to QLC mode 17 (capacity-prioritized).

As described above, the mode switch module 121 adaptively controls the write mode depending on the utilization 71. As a result, providing a full storage capacity (i.e., a user capacity) is guaranteed, and, at the same time, a high performance can be provided when the storage capacity actually used is low.

Figure 22:
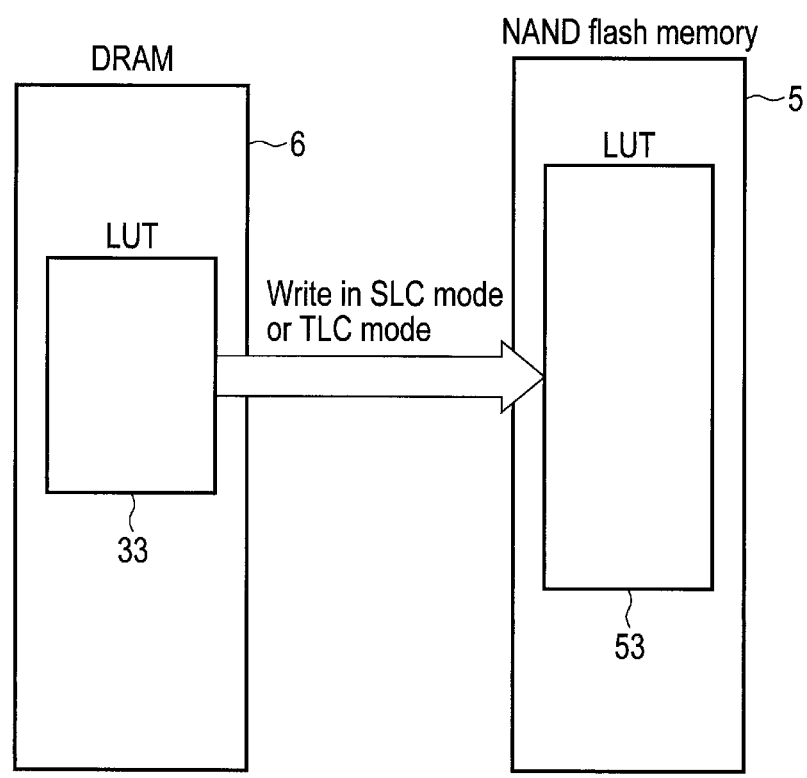
FIG. 22 shows an example in which LUT (address conversion data) is written in the NAND flash memory by the memory system of the first embodiment.

In addition to user data, LUT data may be written into the NAND flash memory 5. The mode switch module 121 may be configured to switch a write mode for writing LUT data. As shown in FIG. 22, when data of each entry of LUT 33 (address conversion data) cached in the DRAM 6 is to be written back in LUT 53 on the NAND flash memory 5, the mode switch module 121 dynamically switches the write mode to write the LUT data between SLC mode 15 and TLC mode 16. Note that QLC mode 17 may be included in the write modes to write LUT.

By switching the write modes for writing the LUT 53, providing a full storage capacity (i.e., a user capacity) is guaranteed, and, at the same time, a high performance can be provided when the storage capacity actually used is low. The reason will be explained below.

The LUT 53 has the following two assumptions.

(1) Size of LUT 53 changes based on utilization. Specifically, an amount of address conversion data corresponding to a logical address range having continuous unmapped LBAs is smaller than an amount of address conversion data corresponding to a logical address range having the same number of mapped LBAs.

(2) The fixed number of LUT blocks to which the LUT 53 is written are allocated. The fixed number of LUT blocks is equal to or larger than a number of LUT blocks required to accommodate the LUT of the SSD with 100% utilization by using TLC mode 16, and smaller than that by using SLC mode 15.

The mode switch module 121 switches the write modes of LUT based on the utilization. In a state where the utilization is high, LUT is written in TLC mode 16 to prioritize storage capacity over performance. Writing in TLC mode 16 is slow and the write performance is low compared to writing into SLC block. Furthermore, when an LUT cache miss occurs, data is read from the LUT blocks. Since the reading from the TLC LUT blocks is slow compared to reading from SLC block, a performance (read performance and write performance) degradation by the LUT cache miss is significant.

On the other hand, in a state where the utilization is low, LUT is written in SLC mode 15 to prioritize the performance. Since writing in SLC mode 15 is fast compared to writing into TLC block, the write performance is high. Furthermore, when an LUT cache miss occurs, data is read from the LUT blocks. Since the reading from the SLC LUT blocks is fast compared to reading from TLC block, a performance (read performance and write performance) degradation by the LUT cache miss is not so significant.

As described above, in LUT writing, write modes are adaptively controlled corresponding to the utilization. As a result, by switching the write modes of LUT 53, providing a full storage capacity (i.e., a user capacity) is guaranteed, and, at the same time, a high performance can be provided when the storage capacity actually used is low.

FIG. 23 shows an example of transition of write performance when a write mode for writing user data (hereinafter, denoted as a user data write mode) and a write mode for writing LUT data (hereinafter, denoted as an LUT write mode) are switched based on the total number of logical address mapped in a physical address space (utilization). In this example, TLC mode 16 is set as a user data write mode and SLC mode 15 is set as an LUT write mode in the initial state (T0).

As shown in FIG. 23, when a utilization 75 becomes equal to or higher than a threshold value 75A while the user data is written in TLC mode 16 and the LUT is written in SLC mode 15 (T1), the mode switch module 121 switches the LUT write mode from SLC mode 15 to TLC mode 16. By switching the LUT write mode to TLC mode 16, write performance 78 becomes relatively low, and penalty in an LUT cache miss increases. Thus, while the read/write performance decreases, the entire LUT can be stored in limited LUT blocks (capacity-prioritized). The write amount of LUT to the NAND flash memory 5 is smaller than the write amount of user data. Thus, the mode switch module 121 switches the LUT write mode to a mode prioritized with capacity, before switching the user data write mode, to minimize a degradation in the write performance 78. Thus, a write mode is selected so that capacity and performance are balanced.

Then, when the utilization 75 becomes equal to or higher than a threshold value 75B while the user data is written in TLC mode 16 and the LUT is written in TLC mode 16 (T2), the mode switch module 121 switches the user data write mode from TLC mode 16 to QLC mode 17. By switching the user data write mode to QLC mode 17, write performance 78 becomes low. Note that a time required to read user data written in QLC mode 17 is longer than a time required to read user data written in TLC mode 17, and thus, by switching the write mode from TLC mode 16 to QLC mode 17, not only the write performance of user data but also the read performance of user data becomes low. That is, while the read/write performance 78 decreases, the SSD 3 can guarantee to provide a full storage capacity expected by the host 2 (capacity-prioritized).

Then, when the utilization 75 decreases in response to execution of an unmap command or the like and becomes lower than the threshold value 75B (T3), the mode switch module 121 switches the user data write mode from QLC mode 17 to TLC mode 16. By switching the user data write mode to TLC mode 16, the write performance 78 increases. Thus, when the utilization 75 decreases and becomes lower than the threshold value 75B, that is, when data amount to be maintained by the NAND flash memory 5 decreases, the read/write performance 78 can be increased (performance-prioritized). A time required to read the user data written in TLC mode 16 is shorter than a time required to read the user data written in QLC mode 17, and thus, by switching the write mode from QLC mode 17 to TLC mode 16, not only the write performance of user data but also read performance of user data can be improved.

Then, if utilization decreases in response to execution of unmap command or the like and becomes lower than the threshold value 75A (T4), the mode switch module 121 switches the LUT write mode from TLC mode 16 to SLC mode 15. By switching the LUT write mode to SLC mode 15, the write performance 78 increases more, and penalty in an LUT cache miss decreases. Thus, the read/write performance is improved. Thus, when the utilization 75 decreases and becomes lower than the threshold value 75A, that is, when a data amount to be maintained by the NAND flash memory 5 further decreases, the read/write performance 78 can further be increased (performance-prioritized).

As described above, the mode switch module 121 adaptively controls the user data write mode and the LUT write mode in accordance with the utilization 75. As a result, providing a full storage capacity (i.e., a user capacity) is guaranteed, and, at the same time, a high performance can be provided when the storage capacity actually used is low.

Note that, as a method for writing user data in SLC mode 15, a method using an SLC buffer is available. The SLC buffer is composed of several blocks for SLC mode in the NAND flash memory. When the write mode is SLC mode 15, user data may be written into the SLC buffer in SLC mode 15, and then, the user data in the SLC buffer may be written in TLC/QLC block (block other than the SLC buffer) in TLC/QLC modes 16 and 17 by, for example, garbage collection. On the other hand, when the write mode is TLC/QLC modes 16 and 17, user data is directly written into QLC block (hereinafter, referred to as direct writing), without going through the SLC buffer.

By using the SLC buffer, the write performance in a short period (until all blocks of the SLC buffer become full of user data) can be improved. That is, a high peak performance can be achieved for any workload. A workload (i.e., an access pattern) means a sequence of access commands chronologically sorted in a logical address space.

Furthermore, by using the SLC buffer, in a narrow range workload, (1) a write amplification factor (WAF) is lowered and write performance is improved, and (2) read performance is improved. A narrow range workload means an access pattern in which logical addresses of access commands chronologically close to each other are within a narrow logical address space.

The mode switch module 121 may always select SLC mode 15 as a write mode of user data corresponding to a write command from the host 2. The mode switch module 121 may select SLC mode 15 for host writing in Case (1): direct writing to TLC/QLC blocks cannot be performed due to limitations in the implementation, Case (2): direct writing causes a high risk in reliability, or Case (3): the maximum number of P/E cycles accepted by QLC/TLC blocks is very low and the maximum number of P/E cycles accepted by SLC blocks is very high. The following advantages can be achieved by selecting SLC mode 15 in each of the cases (1) to (3).

Case (1): The SSD 3 in which both SLC writing and TLC/QLC writing are utilized can be realized, while direct TLC/QLC writing cannot be performed.

Case (2): Since direct writing is avoided, the high reliability of the SSD 3 can be guaranteed.

Case (3): A high endurance of the SSD 3 can be guaranteed even without caring about an endurance of SLC blocks, and thus, control can be simplified.

Here, the reliability risk by direct writing will be explained.

Possibility of failing in program in QLC mode 17 (or in TLC mode 16) may be high as compared to program in SLC mode 15, and a retry program may be required. A retry program requires the original data attempted to be written in the failed program. In that case, in a case where host writing is performed via the SLC buffer, backup data which can be used as the original data is retained in the SLC buffer. On the other hand, in a case where the controller 4 releases, before completion of program, the area in the write buffer in which the write data is stored, that is, before finding out whether the program is succeeded or failed, it is difficult to perform the retry program. Furthermore, the same applies in a case where the SSD 3 does not implement a write buffer evacuation process (power-loss data protection (PLP) process) by a backup battery executed upon a power supply interruption.

Now, data write operation to the NAND flash memory 5 by the write control module 123 will be explained with reference to FIGS. 24 to 26. In this example, the write control module 123 receives a write command requesting user data writing from the host 2 and writes the user data in the NAND flash memory 5.

In the example of FIG. 24, only one type of write mode (here, TLC mode 16) is used as a write mode to write user data in the NAND flash memory 5.

The write control module 123 accumulates the user data received from the host 2 corresponding to a write command in a write buffer 31 on the DRAM 6 as shown in FIG. 24. The write control module 123 allocates an area of the write buffer 31 to store the user data, and when an area cannot be allocated, does not accept a write command from the host 2.

Then, when the user data of write unit size of the NAND flash memory 5 is accumulated in the write buffer 31, the write control module 123 transfers the user data of write unit size to the NAND flash memory chip 501, specifically, to a data latch 503 of the NAND flash memory chip 501. In a case where the write mode is TLC mode 16, the write unit size is, for example, 96 KB. The write control module 123 then releases, after the transfer, an area in the write buffer 31 in which the transferred user data have been accumulated.

Then, the write control module 123 instructs a program (program in TLC mode 16) to the NAND flash memory chip 501. That is, the write control module 123 sends a program command to the NAND flash memory chip 501. In response to receiving the program command, the NAND flash memory chip 501 programs the data stored in the data latch 503 in TLC mode, into a destination block 566 in the memory cell array 502. The memory cell array 502 includes blocks 551 to 558. The blocks can be classified into active blocks and free blocks. Each active block stores valid data, and more data cannot be appended to it. Each free block does not store valid data, and new data can be written to it after erasing data on it. One block is selected from one or more free blocks and is subjected to an erase process, and the block is allocated as a write destination block 556. The write destination block 556 can store new valid data.

Then, in the example of FIG. 25, two types of write modes (here, SLC mode 15 and TLC mode 16) are used as write modes to write data in the NAND flash memory 5.

The write control module 123 accumulates the user data received from the host 2 corresponding to a write command in a write buffer 31 on the DRAM 6 as shown with the example in FIG. 24.

Then, when the user data of write unit size of the NAND flash memory 5 on the basis of a write mode set by the mode switch module 121 is accumulated in the write buffer 31, the write control module 123 transfers the user data of write unit to the NAND flash memory chip 501 (specifically, data latch 503 of the NAND flash memory chip 501). In a case where the write mode is TLC mode 16, the write unit size is, for example, 96 KB (KiB) for three pages. Furthermore, if the write mode is SLC mode 15, the write unit size is, for example, 32 KB for one page. The write control module 123 releases, after the transfer, an area in the write buffer 31 in which the transferred user data has been stored.

Then, the write control module 123 instructs the NAND flash memory chip 501 to program data in a particular physical location (for example, designated with a block address and a page address) in a write mode set by the mode switch module 121. When the write mode is set to SLC mode 15, the write controller instructs to program data in SLC mode 15. Thus, the data is programmed in SLC mode 15 in an SLC destination block 565 in the memory cell array 502.

Furthermore, when a write mode is set to TLC mode 16, the write control module 123 instructs to program data in a particular physical location (for example, designated with a block address and a page address) in TLC mode 16. Thus, the data is programmed in TLC mode 16 in a TLC destination block 566 in the memory cell array 502.

In a case where both the SLC destination block 565 and the TLC destination block 566 are allowed to be open (i.e., concurrently written) in the NAND flash memory 5 (specifically, memory cell array 502) at a time, the mode switch module 121 switch a write mode for each data of write unit by selecting one of the destination blocks 565, 566. On the other hand, in a case where only one of the SLC destination block 565 and the TLC destination block 566 exists (i.e., is allocated) in the NAND flash memory 5, the mode switch module 121 switches the write mode at a time when a new destination block is allocated.

FIG. 26 shows an example in which a write buffer 31 includes an SLC write buffer 311 and a TLC write buffer 312 in the controller 4 where both an SLC destination block 575 and a TLC destination block 576 are open (i.e., allocated) at a time to switch write modes per user data stored in the write buffer 31 (for example, per user data of cluster unit). In the example of FIG. 26, two types of write modes (here, SLC mode 15 and TLC mode 16) are used as write modes to write user data in the NAND flash memory 5, and the write buffer 31 is provided individually for each of the write modes.

The write control module 123 accumulates user data received from the host 2 corresponding to a write command in either the SLC write buffer 311 or the TLC write buffer 312 by assigning the user data to the buffer 311 or 312 based on a specific rule described later. Alternatively, the write control module 123 accumulates, for example, the user data in the buffer 311 or 312 corresponding to the current write mode selected by the mode switch module 121.

The specific rule may include the followings.

Rule (1): Based on an access frequency of an LBA designated by a write command, user data is assigned to the SLC write buffer 311 if the access frequency is high (for example, equal to or higher than a threshold value) and user data is assigned to the TLC write buffer 312 if the access frequency is low (for example, lower than the threshold value). Note that user data with low access frequency may not be assigned to the TLC write buffer 312 but to one of the buffers 311 and 312 corresponding to a current write mode selected by the mode switch module 121 (that is, a write mode selected based on utilization).

Rule (2): When an LBA designated by a write command is included in an LBA range with which a write mode is associated, user data is written into the NAND flash memory in the associated write mode. Specifically, if SLC mode 15 is associated with the LBA range as the write mode, user data is assigned to the SLC write buffer 311. On the other hand, if TLC mode 16 is associated with the LBA range as the write mode, the user data is assigned to the TLC write buffer 312. When an LBA designated by a write command is not included in an LBA range with which a write mode is associated, user data may be written into the NAND flash memory in a write mode determined based on the utilization. An LBA range with which a write mode is associated is designated by the host 2. A write mode may be associated with an LBA range by directly or indirectly designating the write mode by the host 2.

Rule (3): When a name space ID designated by a write command is a name space ID with which a write mode is associated, user data is written into the NAND flash memory in the associated write mode. Specifically, if SLC mode 15 is associated with the name space ID as the write mode, user data is assigned to the SLC write buffer 311. On the other hand, if TLC mode 16 is associated with the name space ID as the write mode, user data is assigned to the TLC write buffer 312. When a name space ID is not a name space ID with which a write mode is associated, user data may be written into the NAND flash memory in a write mode determined based on the utilization. A name space ID with which a write mode is associated is designated by the host 2. A write mode may be associated with a name space ID by directly or indirectly designating the write mode by the host 2.

Rule (4): When a stream ID in a multi-stream function designated by a write command is a stream ID with which a write mode is associated, user data is written into the NAND flash memory in the associated mode. Specifically, if SLC mode 15 is associated with the stream ID as the write mode, user data is assigned to the SLC write buffer 311. On the other hand, if TLC mode 16 is associated with the stream ID as the write mode, user data is assigned to the TLC write buffer 312. When a stream ID in a multi-stream function is not a stream ID with which a write mode is associated, user data may be written into the NAND flash memory in a write mode determined based on the utilization. A stream ID with which a write mode is associated is designated by the host 2. A write mode may be associated with a stream ID by directly or indirectly designating the write mode by the host 2.

In a multi-stream writing manner, each write command is labeled with a stream ID, to imply that write data with a same ID are expected to be invalidated at the same timing and that write data with different IDs are expected to be invalidated at the different timings.

The host 2 sets, acquires, and deletes each rule by transferring a set command, an acquisition command, and a delete command to the SSD 3, respectively. A command corresponding to the rule (1) includes, for example, an LBA range (that is specified by a start LBA, and an end LBA or a size) and an access frequency (for example, high/middle/low). A command corresponding to the rule (2) includes, for example, an LBA range (that is specified by a start LBA, and an end LBA or a size) and a write mode (for example SLC/MLC/TLC/QLC). A command corresponding to the rule (3) includes, for example, a name space ID and a write mode (for example, SLC/MLC/TLC/QLC). A command corresponding to the rule (4) includes, for example, a stream ID and a write mode (for example, SLC/MLC/TLC/QLC).

Based on the above-mentioned commands transferred from the host 2, the mode switch module 121 adds an entry corresponding to a new rule in a table in which rules are described and deletes an entry corresponding to a certain rule from the table.

Specifically, the mode switch module 121 adds a new entry in the LBA range-access frequency table 361 or updates an entry therein based on a set command of the rule (1). Then, the mode switch module 121 updates the block—cold data ratio table 363 when the LUT 33 is updated or the LBA range—access frequency table 361 is updated. The mode switch module 121 increases/decreases valid data amount with high access frequency and valid data amount with low access frequency in a corresponding entry in the block—cold data ratio table 363 for each LBA included in the updated (or added) LBA range, and updates the cold data ratio. Furthermore, the mode switch module 121 may delete corresponding entries from the LBA range—access frequency table 361 and from the block—cold data ratio table 363 in accordance with a delete command of the rule (1).

The mode switch module 121 adds a new entry in the LBA range—write mode table 371 in accordance with a set command of the rule (2) and deletes a corresponding entry from the LEA range—write mode table 371 in accordance with a delete command of the rule (2). Each entry of the LBA range—write mode table 371 includes LBA range (that is specified by a start LBA, and an end LBA or a size) and a write mode (for example, SLC/MLC/TLC/QLC).

The mode switch module 121 adds a new entry in the name space ID—write mode table 372 in accordance with a set command of the rule (3) and deletes a corresponding entry from the name space ID—write mode table 372 in accordance with a delete command of the rule (3). Each entry of the name space ID—write mode table 372 includes a name space ID and a write mode (for example, SLC/MLC/TLC/QLC).

The mode switch module 121 adds a new entry in the stream ID—write mode table 373 in accordance with a set command of the rule (4) and deletes a corresponding entry from the stream ID—write mode table 373 in accordance with a delete command of the rule (4). Each entry of the stream ID—write mode table 373 includes a steam ID and a write mode (for example, SLC/MLC/TLC/QLC).

Note that the access frequency of LBA of the rule (1) may be given from the host 2 using the above-mentioned command, or may be obtained by the access frequency statistics processing module 126 in the SSD 3 based on reading, writing and the like with respect to each LBA.

As to the rule (4), the SSD 3 may support a multi-stream function in order to decrease a WAF by adding hint information related to a life of data to a write command. A life of data indicates a time (or a period to the time) at which the data is invalidated. In a case where the multi-stream function is supported, the host 2 appends a first stream ID to write commands to write data having a first level of expected life and appends a second stream ID which is different from the first stream ID to write commands to write data having a second level of expected life which is different from the first level of expected life.

Then, in a case where the host 2 designates that user data corresponding to the write command with the first stream ID is written in SLC mode 15 and user data corresponding to the write command with the second stream ID is written in TLC mode 16, the write control module 123 assigns user data corresponding to a received write command to which the first stream ID is appended to the SLC write buffer 311 and assigns user data corresponding to a received write command to which the second stream ID is appended to the TLC write buffer 312.

Note that rules explained above use two types of write modes, SLC mode 15 and TLC mode 16; however, even in a case where a larger number of types of write modes are used or write modes of a different combination, similar rules may be set with write buffers corresponding to write modes used therein. Furthermore, assigning user data to write buffers based on the above rules and assigning user data to write buffers in accordance with a current write mode set based on the utilization may be used in combination. As to the rules (2) to (4), the host 2 designates a write mode (SLC mode 15, TLC mode 16, or QLC mode 17) for an LBA range, a name space ID, or a stream ID. Not only designation of the write mode or in addition to designation of the write mode, the host 2 may designate a read/write performance (e.g., high/low, or the like) expected by the host 2 for the LBA range, the name space ID, or the stream ID. That is, the write mode may be designated directly, or designated indirectly by designating the read/write performance that is a factor to determine a write mode.

When user data of write unit size of the NAND flash memory 5 is accumulated in either the write buffer 311 or 312 through the user data assigning as described above, the write control module 123 transfers the user data of write unit size to the NAND flash memory chip 501 (specifically, the data latch 503 of the NAND flash memory chip 501). In a case where user data in the TLC write buffer 312 is written into the NAND flash memory chip 501, the write unit size is, for example, 96 KB for three pages. In a case where user data in the SLC write buffer 311 is written into the NAND flash memory chip 501, the write unit size is 32 KB for one page. The write control module 123 releases an area in which transferred user data have been accumulated in the write buffer 311, 312.

Then, the write control module 123 instructs a program to the NAND flash memory chip 501. If data is transferred from the SLC write buffer 311 to the NAND flash memory chip 501, the write control module 123 instructs a program in SLC mode 15 to an SLC destination block 575 in the memory cell array 502. Thus, the data is programmed in SLC mode 15 in the SLC destination block 575 in the memory cell array 502. Furthermore, if data is transferred from the TLC write buffer 312, the write control module 123 instructs a program in TLC mode 16 to the TLC destination block 576 in the memory cell array 502. Thus, the data is programmed in TLC mode 16 in the TLC destination block 576 in the memory cell array 502. Note that a write process for data of write unit in one NAND flash memory chip 501 is executed one at a time, and a plurality of write processes is performed one after another.

As described above, write modes may be switched per user data (for example, per user data of cluster unit) accumulated in a write buffer 31.

The GC control module 124 may perform writing to the NAND flash memory 5 using a GC buffer 32 similarly to the above-described write operation by the write control module 123. The GC control module 124 selects a garbage collection source block (GC source block) from active blocks each storing valid data, and writes valid data in the GC source block into a garbage collection destination block (GC destination block) allocated as a destination block from the free blocks.

FIG. 27 shows a case where the GC buffer 32 is managed for each write mode. The GC buffer 32 includes, for example, a TLC GC buffer 322 and a QLC GC buffer 323. In that case, the GC control module 124 may set a write mode (type of destination block) per valid data of cluster unit, for example.

As shown in FIG. 27, the GC control module 124 selects a block with less valid data 582 from active blocks as a GC source block 58. The GC control module 124 assigns valid data to the GC buffer 322 or 323 based on the access frequency of an LBA of each valid data, for example. The GC control module 124 extracts, from the valid data 582, data with high access frequency 583 in the TLC GC buffer 322 and data with low access frequency 584 in the QLC GC buffer 323. Note that an access frequency of an LBA is acquired by the access frequency statistics processing module 126 based on reading, writing and the like for each LBA.

The GC control module 124 writes data of write unit accumulated in each of the GC buffers 322 and 323, in the NAND flash memory 5 similarly to the write operation by the write control module 123. Specifically, when data of write unit size of the NAND flash memory 5 is accumulated in either the GC buffer 322 or the GC buffer 323, the GC control module 124 transfers the data of write unit to the NAND flash memory chip 501 (specifically, the data latch 503 of the NAND flash memory chip 501). If data is written from the TLC GC buffer 322 to the NAND flash memory chip 501, the write unit size is, for example, 96 KB. If data is written from the QLC write buffer 323 to the NAND flash memory chip 501, the write unit size is 128 KB, for example. The GC control module 124 releases an area in which the transferred user data has been stored in the GC buffer 322 or 323.

Then, the GC control module 124 instructs a program to the NAND flash memory chip 501. If data is transferred from the TLC GC buffer 322, the GC control module 124 instructs a program in TLC mode 16. Thus, the data is programmed in TLC mode 16 in a GC destination block for TLC writing (hereinafter, referred to as TLC destination block). Furthermore, if data is transferred from the QLC GC buffer 323, the GC control module 124 instructs a program in QLC mode 17. Thus, the data is programmed in QLC mode 17 in a GC destination block for QLC writing (hereinafter, referred to as QLC destination block).

Thus, during garbage collection operation, write modes (types of destination blocks) may be adaptively switched per valid data of cluster unit.

Note that, in FIG. 27, valid data is assigned to the GC buffers 322 and 323 based on the access frequency of LBA of valid data according to the rule (1); alternatively, valid data may be assigned to the GC buffers 322 and 323 according to one of the rules (2) to (4). For example, according to the rule (2), the GC control module 124 assigns valid data to the GC buffers 322 and 323 whether an LBA of the valid data is within an LBA range with which the write mode is associated. If, for example, the LBA of the valid data is within the LBA range designated by the host 2, based on the write mode designated by the host 2 for the LBA range, the GC control module 124 accumulates the valid data in the GC buffer 322 or 323 corresponding to the write mode.

Other than the assigning valid data to GC buffers based on the access frequency of LBA of valid data (rule (1)), one or more of the rules (2) to (4) may be combined any way for the assigning valid data to GC buffers.

FIG. 28 exemplifies a case where one GC buffer 32 is used and a QLC destination block is allocated as a GC destination block. In that case, the GC control module 124 selects, as a GC source block 59, a block with less valid data 592 and with a high ratio of data corresponding to LBA with low access frequency data 594 of valid data. The GC control module 124 acquires the GC source block 59 using the block—cold data ratio table 363, for example. When a GC destination block is QLC destination block, by selecting the GC source block 59 with a high ratio of data amount corresponding to LBA with low access frequency, for example, performance degradation for the host 2 can be minimized, which might be caused due to slow read/write accesses from/to QLC blocks.

Specifically, based on an access frequency of LBA of valid data included in each block of active blocks, for example, the access frequency statistics processing module 126 detects data with high access frequency 593 and data with low access frequency 594, and calculates a ratio of data with low access frequency 594. Using the calculated ratio, the GC control module 124 selects the GC source block 59 from the active blocks. Then, the GC control module 124 accumulates the valid data 592 in the GC buffer 32.

The GC control module 124 writes data of write unit accumulated in the GC buffer 32, in the NAND flash memory 5 as in the write operation of the write control module 123. Specifically, when data of write unit size of the NAND flash memory 5 (for example, 128 KB) is accumulated in the GC buffer 32, the GC control module 124 transfers the data of write unit to the NAND flash memory chip 501 (specifically, the data latch 503 of the NAND flash memory 501). Then, the GC control module 124 releases an area of the GC buffer 32 in which the transferred data has been stored.

Then, the GC control module 124 instructs a program to the NAND flash memory chip 501 in QLC mode 17. Thus, the data is programmed in QLC mode 17 in the GC destination block (QLC destination block).

Thus, even only one GC buffer 32 is used, data corresponding to the mode of the current GC destination block are collected and written thereto. Note that in a case where a same GC source block is visited multiple times by the GC control module, each of valid data with high access frequency and valid data with low access frequency mixed in the same GC source block is extracted and written into the GC destination block with the corresponding mode. For example, in the first phase, only valid data with high access frequency in the GC source block are extracted, accumulated into the GC buffer 32, and then written into the GC destination block with SLC mode. In the second phase, only valid data with low access frequency in the GC source block are extracted, accumulated into the GC buffer 32, and then written into the GC destination block with QLC mode.

Figure 29:
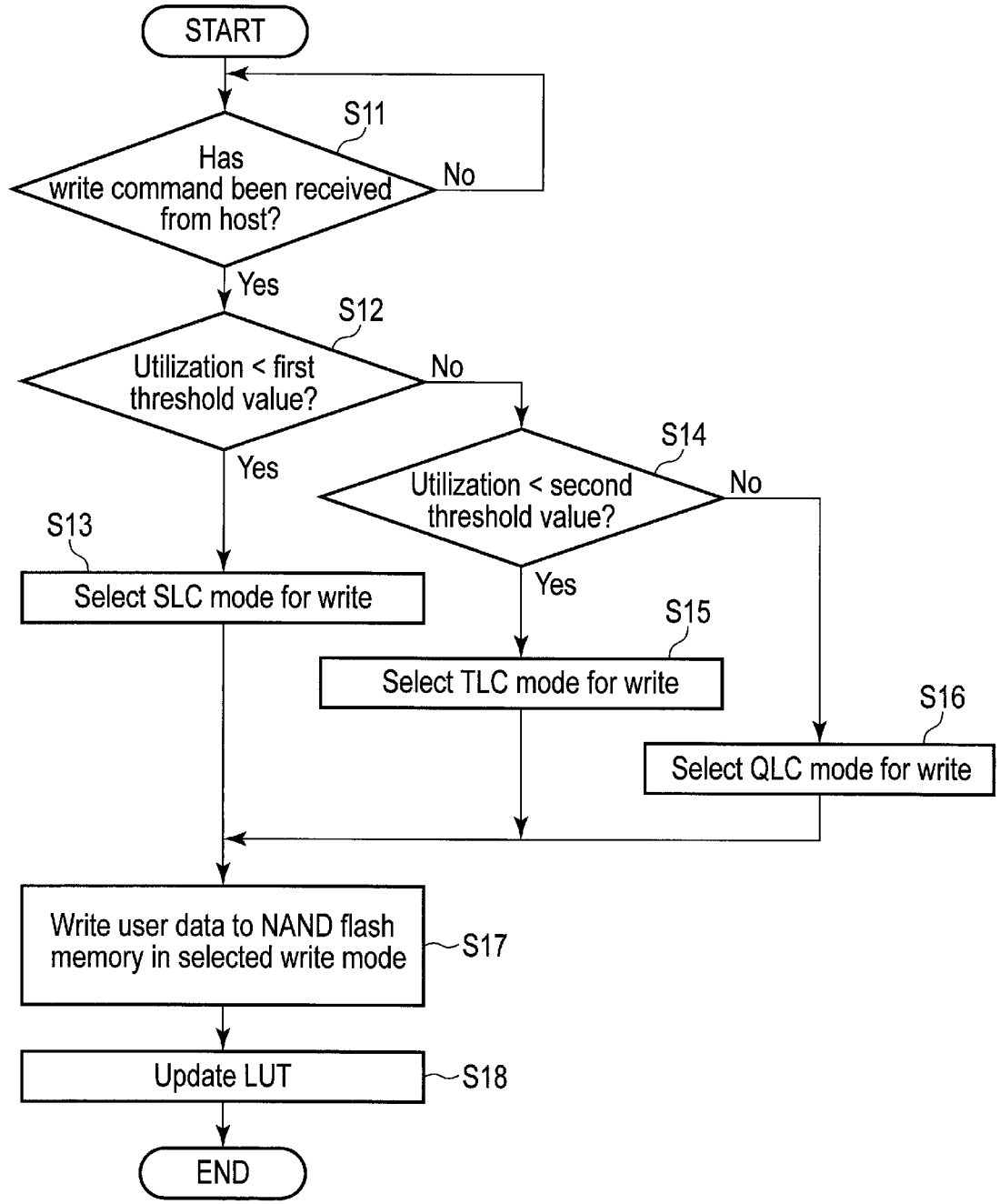
FIG. 29 is a flowchart of an example of the procedure of a user data write process executed by the memory system of the first embodiment.

FIG. 29 shows a flowchart of the procedure of a user data write process executed by the controller 4. In this example, a write mode to write user data in the NAND flash memory 5 is selected from SLC mode 15, TLC mode 16, and QLC mode 17.

First, the controller 4 determines whether a write command has been received from the host 2 (step S11). The write command is a command to request writing of user data to the SSD 3. If a write command has not been received (No in step S11), whether a write command is received from the host 2 is determined again in step S11.

If a write command has been received from the host 2 (Yes in step S11), the controller 4 determines whether the utilization is higher than a first threshold value (step S12). If the utilization is lower than the first threshold value (Yes in step S12), the controller 4 sets the write mode to SLC mode 15 (step S13).

If the utilization is equal to or higher than the first threshold value (No in step S12), the controller 4 determines whether the utilization is lower than the second threshold value (step S14). Note that the second threshold value is higher than the first threshold value. If the utilization is lower than the second threshold value (Yes in step S14), the controller 4 sets the write mode to TLC mode 16 (step S15).

If the utilization is equal to or higher than the second threshold value (No in step S14), the controller 4 sets the write mode to QLC mode 17 (step S16).

After step S13, S15, or S16, that is, after the write mode is set to SLC mode 15, TLC mode 16, or QLC mode 17, the controller 4 writes the user data in the NAND flash memory 5 in the selected write mode (step S17). Then, the controller 4 updates an LUT 33 in accordance with the writing (step S18). Specifically, as described with reference to FIG. 26, the controller 4 accumulates user data in any of the write buffers 311, 312, and 313 corresponding to the selected write mode. When the amount of user data accumulated in the write buffer 311, 312, or 313 reaches the write unit size, the controller 4 writes user data of the write unit to the NAND flash memory 5 in the selected write mode. On the other hand, when the amount of stored user data does not reach the write unit size, the process goes back to step S11. Note that, in a case where the controller 4 is instructed to flush by the host 2, user data accumulated in the write buffers 311, 312, and 313 is written in the NAND flash memory 5, and the LUT 33 is updated.

As described above, user data may be stored in the NAND flash memory 5 in a write mode selected based on a utilization.

FIG. 30 shows a flowchart of the procedure of an LUT write process executed by the controller 4. In this example, a write mode to write an LUT in the NAND flash memory 5 is set to either SLC mode 15 or QLC mode 17.

First, the controller 4 determines whether it is an LUT write timing (step S21). An LUT write timing is any timing including, for example, a time when dirty data amount of LUT reaches a write unit size, a time when a flush is instructed by the host 2, and a time to turn off the SSD 3. If it is not an LUT write timing (No in step S21), the process goes back to step S21 and whether it is an LUT write timing is determined again.

If it is an LUT write timing (Yes in step S21), the controller 4 determines whether the utilization is lower than a third threshold value (step S22). If the utilization is lower than the third threshold value (Yes in step S22), the controller 4 sets the write mode to SLC mode 15 (step S23). On the other hand, if the utilization is equal to or higher than the third threshold value (No in step S22), the controller 4 sets the write mode to QLC mode 17 (step S24).

Then, the controller 4 writes the LUT in the NAND flash memory 5 in the selected write mode (step S25).

As described above, the LUT may be stored in the NAND flash memory 5 in a write mode selected based on utilization.

Figure 31:
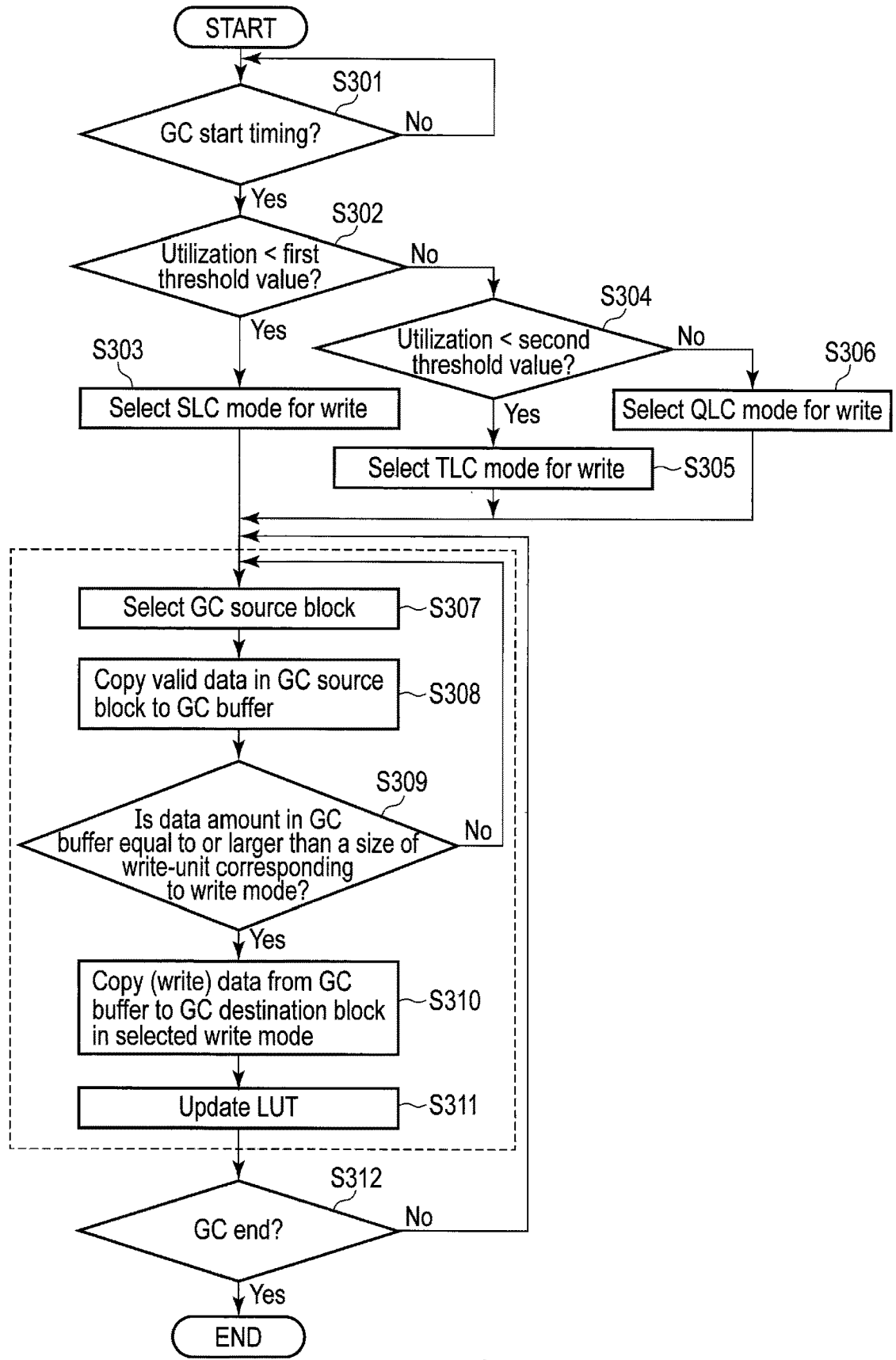
FIG. 31 is a flowchart of an example of the procedure of a garbage collection process executed by the memory system of the first embodiment.

FIG. 31 shows a flowchart of the procedure of a garbage collection process executed by the controller 4. In this example, a write mode to write data in the NAND flash memory 5 is selected from SLC mode 15, TLC mode 16, and QLC mode 17. Furthermore, in this example, as a GC destination block, three types of blocks of SLC block, TLC block, and QLC block are open at a time.

First, the controller 4 determines whether it is a start timing of a garbage collection operation (step S301). The controller 4 determines that it is a start timing of a garbage collection operation if, for example, the number of free blocks is smaller than a threshold value. If it is not a start timing of a garbage collection operation (No in step S301), the process goes back to step S301 and whether it is a start timing of a garbage collection operation is determined again.

If it is a start timing of a garbage collection operation (Yes in step S301), the controller 4 determines whether the utilization is lower than a first threshold value (step S302).

If the utilization is lower than the first threshold value (Yes in step S302), the controller 4 sets the write mode to SLC mode 15 (step S303).

If the utilization is equal to or higher than the first threshold value (No in step S302), the controller 4 determines whether the utilization is lower than a second threshold value (step S304). Note that the second threshold value is larger than the first threshold value. If the utilization is lower than the second threshold value (Yes in step S304), the controller 4 sets the write mode to TLC mode 16 (step S305). If the utilization is equal to or higher than the second threshold value (No in step S304), the controller 4 sets the write mode to QLC mode 17 (step S306).

After step S303, S305, or S306, that is, after the write mode is set to SLC mode 15, TLC mode 16, or QLC mode 17, the controller 4 selects a GC source block (step S307). A GC source block is, for example, a block with less valid data. The controller 4 copies (reads) the valid data in the selected GC source block, into the GC buffer 32 (step S308).

Then, the controller 4 determines whether data of write unit size in terms of pages corresponding to a currently selected write mode is accumulated in the GC buffer 32 (step S309). Specifically, the controller 4 determines, if the current write mode is SLC mode 15, whether data of one page (32 KB) is accumulated in the GC buffer 32. Similarly, the controller 4 determines, if the current write mode is TLC mode 16, whether data of three pages (96 KB) is accumulated in the GC buffer 32, and determines, if the current write mode is QLC mode 17, whether data of four pages (128 KB) is accumulated in the GC buffer 32.

The controller 4 writes, if the data of write unit size in terms of pages corresponding to the current write mode is accumulated in the GC buffer 32, data from the GC buffer 32 to the GC destination block in the current write mode (step S310). Then, the controller 4 updates an LUT corresponding to the data writing (step S311). On the other hand, if the data of write unit size corresponding to the current write mode is not accumulated (No in step S309), the process goes back to step S307.

Then, the controller 4 determines whether the garbage collection operation ends (step S312). The controller 4 determines that the garbage collection operation ends if there is sufficient number of free blocks. If the garbage collection operation is determined to end (Yes in step S312), the process ends. If the garbage collection operation is determined to continue (No in step S312), the process goes back to step S307 and a GC source block is further selected.

As described above, in a garbage collection operation, data may be stored in the NAND flash memory 5 in a write mode selected based on utilization.

Note that the controller 4 may write valid data in GC source block to a GC destination block in an original mode in which the valid data has been written. In that case, the controller 4 accumulates the valid data of the GC source block in any of the GC buffers 321, 322, and 323 corresponding to the original mode. Then, when the GC buffer 321, 322, or 323 accumulates data of write unit size, the controller 4 writes the data into a GC destination block (SLC GC destination block, TLC GC destination block, or QLC GC destination block) in the original mode. Thus, the valid data in the GC source block may be stored in the GC destination block while the write mode used in the GC source block is maintained.

Note that steps S307 to S311 shown in a frame of dotted line in FIG. 31 may be replaced with steps in a flowchart of FIG. 32.

FIG. 32 shows a flowchart of the procedure of a garbage collection process including an operation of selecting a write mode based on an access frequency of an LBA of valid data. Note that the access frequency of the LBA of the valid data may be determined for, for example, cluster unit. In this example, a process of writing data corresponding to an LBA with high access frequency into the NAND flash memory 5 in SLC mode 15 is added to the garbage collection process of the flowchart of FIG. 31.

First, the controller 4 selects a GC source block (step S351). The controller 4 selects valid data from the selected GC source block (step S352). Then, the controller 4 determines whether the access frequency of the LBA of the selected valid data is higher than a fourth threshold value (step S353).

If the access frequency is higher than the fourth threshold value (Yes in step S353), the controller 4 copies (reads) the valid data in the SLC GC buffer 321 (step S354). The controller 4 determines whether 32 KB data of write unit size (e.g., one page) is accumulated in the SLC GC buffer 321 (step S355). If data of one page is accumulated in the SLC GC buffer (Yes in step S355), the controller 4 writes the data accumulated in the SLC GC buffer 321 into a GC destination block (SLC destination block) in SLC mode 15 (step S356), and updates an LUT (step S357). If data of one page is not accumulated in the SLC GC buffer 321 (No in step S355), the process goes back to step S351.

If the access frequency is equal to or lower than the fourth threshold value (No in step S353), the process branches in accordance with a currently selected write mode (step S358). If the current write mode is SLC mode 15 (SLC in step S358), the process proceeds to step S354, and the valid data is written in the NAND flash memory 5 in SLC mode 15.

If the current write mode is TLC mode 16 (TLC in step S358), the controller 4 copies (reads) the valid data in the TLC GC buffer 322 (step S359). The controller 4 determines whether 96 KB data of write unit size (e.g., three pages) is accumulated in the TLC GC buffer 322 (step S360). If data of three pages is accumulated in the TLC GC buffer 322 (Yes in step S360), the controller 4 writes the data accumulated in the TLC GC buffer 322 into a GC destination block (TLC destination block) in TLC mode 16 (step S361), and updates an LUT (step S362). If data of three pages is not accumulated in the TLC GC buffer 322 (No in step S360), the process goes back to step S351.

Furthermore, if the current write mode is QLC mode 17 (QLC in step S358), the controller 4 copies (reads) the valid data in the QLC GC buffer 323 (step S363). The controller 4 determines whether 128 KB data of write unit size (e.g., four pages) is accumulated in the QLC GC buffer 323 (step S364). If data of four pages is accumulated in the QLC GC buffer 323 (Yes in step S364), the controller 4 writes the data accumulated in the QLC GC buffer 323 into a GC destination block (QLC destination block) in QLC mode 17 (step S365), and updates an LUT (step S366). If data of four pages is not accumulated in the QLC GC buffer 323 (No in step S364), the process goes back to step S351.

After the selected valid data is copied (read) to the GC buffer 32 or written into a GC destination block, the controller 4 determines whether the GC source block further includes another valid data (step S367). If the GC source block further includes another valid data (Yes in step S367), the process goes back to step S352, and a process related to said another valid data proceeds. If the GC source block does not include any more valid data (No in step S367), the process proceeds to step S312 of the flowchart of FIG. 31.

As described above, the controller 4 may write, in a garbage collection operation, data corresponding to an LBA with a high access frequency in the NAND flash memory in SLC mode 15.

Note that the controller 4 may write data in a particular physical block or data associated with a particular LBA in the NAND flash memory 5 in a write mode for higher performance, that is different from an original write mode used for storing that data, in a process other than the garbage collection process. For example, if it is detected that a physical block (QLC block) has a high access frequency, the controller 4 performs a process of writing data in the physical block into an SLC block. Specific steps for this process is realized with the process shown in FIG. 32 replacing the GC source block with a physical block with a high access frequency.

Furthermore, for example, if it is detected that an LBA (for example, LBA of data written in QLC mode 17) has a high access frequency, the controller 4 writes data (data of cluster unit) stored in a physical address corresponding to the LBA into an SLC block. The controller 4 assigns (accumulates) the data of cluster unit to the SLC GC buffer 321 to write the data to the SLC block.

FIG. 33 shows a flowchart of the procedure of write process that includes an operation in which data of a logical address range with which a write mode is associated is written into the NAND flash memory 5 in the write mode. A logical address range with which a write mode is associated is designated by the host 2. A write mode may be associated with a logical address range by directly or indirectly designating the write mode by the host 2. The host 2 may notify, at any timing, the controller 4 of a logical address (or a logical address range) so that write data with the logical address (or within the logical address range) is to be written in a specific write mode. The host 2 may instruct directly or indirectly the specific write mode for the logical address (or the logical address range). The host 2 uses the notification to request the controller 4 to write data of a logical address range of a high access frequency in SLC mode 15 or TLC mode 16 to achieve high performance in reading and writing, and to write data of a logical address range of a low access frequency in QLC mode 17 to achieve high data density. The number of the logical address ranges included in the LBA range—write mode table 371 of the SSD 3 is zero or more. Note that the host 2 may designate a write mode (SLC mode 15, TLC mode 16, or QLC mode 17) for a logical address range. Not only designation of the write mode or in addition to designation of the write mode, the host 2 may designate a read/write performance (e.g., high/low, or the like) expected by the host 2 for the logical address range, a name space ID, or a stream ID. In this example, the write mode is selected from SLC mode 15, TLC mode 16, and QLC mode 17 per data of cluster unit, and three types of blocks of SLC block, TLC block, and QLC block are open as destination blocks at a time.

Specifically, first, the controller 4 determines whether a write command has been received from the host 2 (step S401). If a write command has not been received (No in step S401), the process goes back to step S401 and whether a write command has been received from the host 2 is determined again.

If a write command has been received from the host 2 (Yes in step S401), the controller 4 determines whether a logical address designated by the write command is included in a logical address range associated with a write mode by the host 2 (step S402). If the logical address designated by the write command is not included in the logical address range associated with a write mode by the host 2 (No in step S402), the controller 4 performs a write process based on the total number of logical addresses that are mapped to the physical addresses (i.e., utilization) (step S416). The write process corresponds to steps S12 to S18 in the flowchart of FIG. 29.

If the logical address designated by the write command is included in the logical address range associated with a write mode by the host 2 (Yes in step S402), the process branches in accordance with a write mode designated by the host 2 for the logical address range (step S403).

If the write mode designated by the host 2 is SLC mode 15 (SLC in step S403), the controller 4 accumulates the user data received from the host 2 into the SLC write buffer 311 (step S404). The controller 4 determines whether 32 KB data of write unit size (i.e., one page) is accumulated in the SLC write buffer 311 (step S405). If data of one page is accumulated in the SLC write buffer 311 (Yes in step S405), the controller 4 writes the data accumulated in the SLC write buffer 311 into a destination block (SLC destination block) in SLC mode 15 (step S406), and updates an LUT (step S407). If data of one page is not accumulated in the SLC write buffer 311 (No in step S405), steps S406 and S407 are skipped.

If the write mode designated by the host 2 is TLC mode 16 (TLC in step S403), the controller 4 accumulates the user data received from the host 2 into the TLC write buffer 312 (step S408). The controller 4 determines whether 96 KB data of write unit size (i.e., three pages) is accumulated in the TLC write buffer 312 (step S409). If data of three pages is accumulated in the TLC write buffer 312 (Yes in step S406), the controller 4 writes the data accumulated in the TLC write buffer 312 into a destination block (TLC destination block) in TLC mode 16 (step S410), and updates an LUT (step S411). If data of three pages is not accumulated in the TLC write buffer 312 (No in step S409), steps S410 and S411 are skipped.

If the write mode designated by the host 2 is QLC mode 17 (QLC in step S403), the controller 4 accumulates the user data received from the host 2 into the QLC write buffer 313 (step S412). The controller 4 determines whether 128 KB data of write unit size (four pages) is accumulated in the QLC write buffer 313 (step S413). If data of four pages is accumulated in the QLC write buffer 313 (Yes in step S413), the controller 4 writes data accumulated in the QLC write buffer 313 into a destination block (QLC destination block) in QLC mode 17 (step S414), and updates an LUT (step S415). If data of four pages is not accumulated in the QLC write buffer 313 (No in step S413), steps S414 and S415 are skipped.

As described above, data in a logical address range designated by the host 2 may be written in the NAND flash memory 5 in a write mode designated by the host 2. Furthermore, data in a logical address range designated by the host 2 may be written in the NAND flash memory 5 in a write mode designated by the host 2 as with the above process during the garbage collection operation.

Second Embodiment

In the first embodiment, a write mode of data written in the NAND flash memory 5 is switched based on the total number of logical addresses mapped in the physical address space (utilization). In contrast, in the second embodiment, a write mode of data written in the NAND flash memory 5 is switched based on a degree of wear-out of the whole NAND flash memory 5.

An SSD 3 of the second embodiment and the SSD 3 of the first embodiment are structurally same, and only steps of a process executed by the mode switch module 121 are different. Hereinafter, only the points different from the first embodiment will be explained.

The mode switch module 121 switches the write mode of data to be written in the NAND flash memory 5 based on the degree of wear-out of the whole NAND flash memory 5. As an index of the whole degree of wear-out, for example a statistical value based on the numbers of P/E cycles of each block included in the NAND flash memory 5. The statistical value is, by referring to the block—number of P/E cycles table 352 of FIG. 4, calculated by statistical process of the number of P/E cycles of each of all the blocks of the NAND flash memory 5, and may be stored in the DRAM 6 as a degree of wear-out 351.

Figure 34:
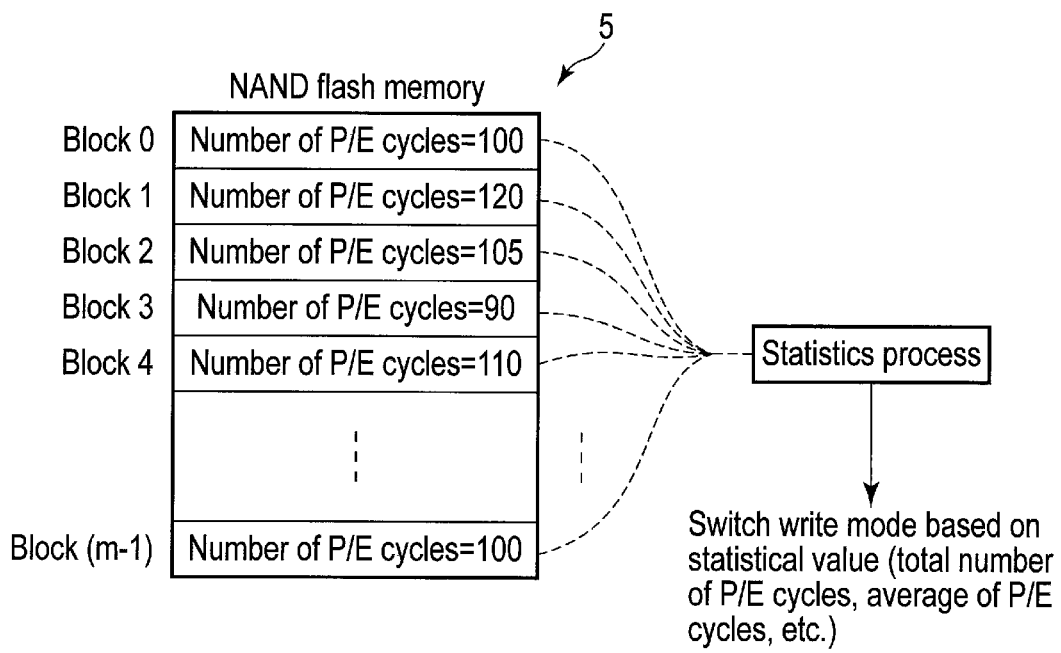
FIG. 34 shows an example of switching write modes based on a statistical value of the numbers of P/E cycles in a memory system of a second embodiment.

As shown in FIG. 34, the mode switch module 121 acquires, for example, the number of P/E cycles of each of all the blocks of the NAND flash memory 5 and calculates the statistical value by a statistical process of the number of P/E cycles. The mode switch module 121 may acquire the number of P/E cycles of each of all the blocks in the NAND flash memory 5 from the block—number of P/E cycles table 352. Furthermore, the statistical value may be, for example, the total number of P/E cycles executed by the NAND flash memory 5, that is, the total number of P/E cycles of one or more blocks in the NAND flash memory 5, or may be an average value of the numbers of P/E cycles of all the blocks in the NAND flash memory 5. The total number of P/E cycles of one or more blocks in the NAND flash memory 5 indicates, for example, the sum of the numbers of P/E cycles of one or more blocks (e.g., all the blocks) in the NAND flash memory 5. Here, all the blocks in the NAND flash memory 5 may be blocks excluding those storing only management data. Note that, in a case where the SLC mode only block group 18 and the TLC/QLC shared block group 19 do not share or exchange their own blocks with the other, a statistical value of all the blocks in the SLC mode only block group 18 and a statistical value of all the blocks in the TLC/QLC shared block group 19 are calculated separately. Furthermore, the statistical value may be the maximum number or the minimum number of the numbers of P/E cycles of each of all the blocks in the NAND flash memory 5.

The mode switch module 121 dynamically switches write modes based on a calculated statistical value of the numbers of P/E cycles.

An example in which the write modes are switched between TLC mode 16 and QLC mode 17 based on a statistical value of the numbers of P/E cycles will be explained with reference to FIG. 35. The maximum number of P/E cycles accepted for a block in a nonvolatile memory is limited. Thus, in the SSD 3, a plan line 81 indicative of a statistical value of the ideal numbers of P/E cycles with respect to a time from the start of use is set to the end, based on a required endurance of the SSD 3 (for example, five years). The mode switch module 121 controls the write mode to keep the statistical value 82 of the actual numbers of P/E cycles within a margin of the plan line 81, for example.

Figure 35:
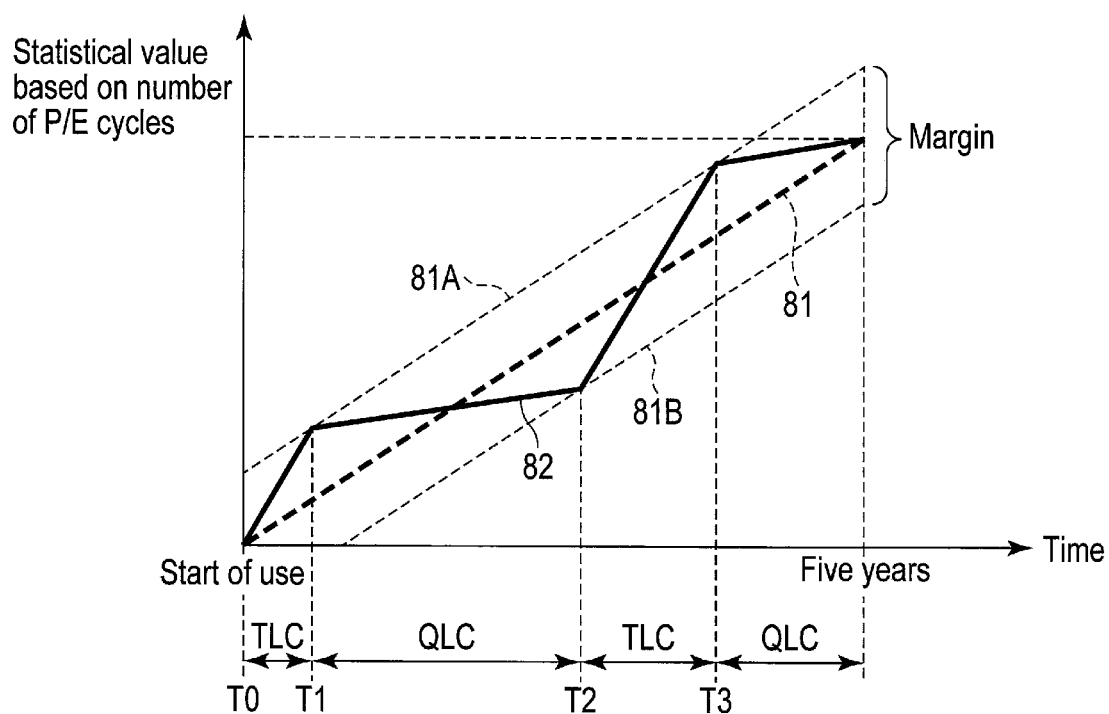
FIG. 35 shows transition of a statistical value of the numbers of P/E cycles based on switching write modes by the memory system of the second embodiment.

As shown in FIG. 35, for example, TLC mode 16 is set as a write mode in a start time (T0). If the statistical value 82 of the numbers of P/E cycles reaches the upper limit 81A of the margin of the plan line 81 during data writing in TLC mode 16 (T1), the mode switch module 121 switches the write mode form TLC mode 16 to QLC mode 17. Thus, a read/write performance decreases but increase of the number of P/E cycles can be suppressed (i.e., endurance is prioritized over performance).

That is, if the write mode is TLC mode 16, data amount written per block is ¾ of that of a case where the write mode is QLC mode 17. When the write mode is switched to QLC mode 17, data amount written per block increases 25% of the block size in QLC mode 17. Thus, write data amount in QLC mode 17 is 4/3 fold of write data amount of TLC mode 16, and thus, if the sum of the host write amount and the GC write amount remains the same before and after switching the write modes, a number of P/E cycles for the write amount becomes ¾. As a result, the increase of the number of P/E cycles can be suppressed. Furthermore, with respect to the same utilization, if an amount (physical capacity) that the NAND flash memory 5 can memorize increases, the valid data amount of GC source blocks decreases similarly to increase of an overprovisioning ratio (an OP ratio in short). Thus, frequency of garbage collection decreases and WAF decreases. As a result, an increase of the number of P/E cycles can be suppressed. Note that a difference between a user capacity and a physical size (implemented size) may be referred to as an overprovisioning capacity (an OP capacity in short), and a ratio of the overprovisioning capacity to the user capacity may be referred to as the overprovisioning ratio. In general, when the overprovisioning ratio is high, the efficiency of generating free blocks in garbage collection increases and WAF decreases.

When the statistical value 82 of the numbers of P/E cycles reaches a lower limit 81B of the margin of the plan line 81 during data writing in QLC mode 17 (T2), the mode switch module 121 switches the write mode form the QLC mode 17 to the TLC mode 16. Thus, although an increase rate of the number of P/E cycles rises, the read/write performance can be high (i.e., performance is prioritized over endurance). The increase rate is represented by the number of P/E cycles per unit time.

Similarly, when the statistical value 82 of the numbers of P/E cycles reaches the upper limit 81A of the margin of the plan line 81 during data writing in TLC mode 16 (T3), the mode switch module 121 switches the write mode from TLC mode 16 to QLC mode 17.

By switching the write modes, the statistical value of the numbers of P/E cycles is controlled to be within the margin of the plan line 18, and the SSD 3 can be used till the end of its expected life.

Note that a stress degree of one cycle of P/E differs in SLC mode 15, TLC mode 16, and QLC mode 17 and increases when the number of bits per cell is large. Thus, the mode switch module 121 may calculate a degree of wear-out of each block in the NAND flash memory 5 in consideration of not only the number of P/E cycles but also a stress amount depending on a write mode and an influence of temperature. The mode switch module 122 may calculate the statistical value by subjecting a statistical process to the degrees of wear-out of all the blocks in the NAND flash memory 5. Then, the mode switch module 122 may control the write mode based on the statistical value. For example, a stress caused by a single P/E cycle becomes greater in a low temperature environment as compared to a high temperature environment. The block—number of P/E cycles table 352 may manage the degree of wear-out of each block instead of the number of P/E cycles or in addition to the number of P/E cycles.

Here, referring to an example in which write modes are switched between SLC mode 15 and QLC mode 17, a reason why using QLC mode 17 increases total byte written (TBW) which is an index indicative of an acceptable cumulative data amount written from the host 2 to the SSD 3 during a life of the SSD 3.

(1) As described above, in a method of using an SLC buffer, if the write mode is SLC mode 15, user data is written in the SLC buffer in SLC mode 15, and then, user data in the SLC buffer may be written into a QLC block (block other than SLC block) in QLC mode 17 through garbage collection or the like. On the other hand, if the write mode is QLC mode 17, user data is directly written in a QLC block without going through the SLC buffer (direct writing). Comparing the former and the latter, the latter has lower WAF (in a case where the numbers of P/E cycles in SLC mode and in QLC mode are summed) since writing to the SLC buffer does not occur in a wide range access pattern in excess of an SLC buffer capacity.

(2) Since a capacity per block is larger in QLC than in SLC when writing of the same amount data is performed, frequency of erasing is lower in QLC (specifically, ¼ to SLC case).

(3) As described above, in general, when an overprovisioning ratio becomes high, an efficiency of free block generation in garbage collection increases, and WAF decreases. Since a physical capacity can increase by using QLC mode, WAF decreases.

For a host writing of the same user data amount, a larger number of P/E cycles of the NAND flash memory 5 is required when WAF is larger. If the tolerable maximum number of P/E cycles for the NAND flash memory 5 is constant, when WAF decreases, more amount of user data by write commands from the host 2 (that is, TBW) can be accepted until the life of the SSD 3 ends.

Note that write mode switching based on the number of P/E cycles explained with reference to FIG. 35 may be used in combination with write mode switching based on the utilization explained with reference to FIGS. 16 to 18, and 21. In that case, even if the utilization is within a range allowed to use TLC mode 16, the mode switch module 121 switches the write mode from TLC mode 16 to QLC mode 17 when the number of P/E cycles reaches the upper limit 81A of the above margin.

FIG. 36 shows a flowchart of the procedure of user data write process executed by the controller 4. In this example, either TLC mode 16 or QLC mode 17 is set to a write mode to write user data in the NAND flash memory 5.

First, the controller 4 determines whether a write command has been received from the host 2 (step S51). If a write command has not been received (No in step S51), whether a write command has been received from the host 2 is determined again in step S51.

If a write command has been received from the host 2 (Yes in step S51), the process branches in accordance with a current write mode (step S52). If the current write mode is TLC mode 16 (TLC in step S52), the controller 4 determines whether the statistical value of the numbers of P/E cycles in the NAND flash memory 5 is equal to or larger than a fifth threshold value (step S53). As the statistical value of the numbers of P/E cycles, the total number of P/E cycles executed in the NAND flash memory 5, that is, the sum of the numbers of P/E cycles of all the blocks in the NAND flash memory 5, or an average value, maximum value, or minimum value of the numbers of P/E cycles of all the blocks in the NAND flash memory 5 may be used. The fifth threshold value varies (for example, increases) depending on a time that has elapsed from the start of the use of the SSD 3, for example. If the statistical value of the numbers of P/E cycles is equal to or larger than the fifth threshold value (Yes in step S53), the controller 4 sets the write mode to QLC mode 17 (step S54). On the other hand, if the statistical value of the numbers of P/E cycles is smaller than the fifth threshold value (No in step S53), step S54 is skipped and the write mode is maintained in TLC mode 16.

If the current write mode is QLC mode 17 (QLC in step S52), the controller 4 determines whether the statistical value of the numbers of P/E cycles in the NAND flash memory 5 is equal to or larger than a sixth threshold value (step S55). Note that the sixth threshold value is smaller than the fifth threshold value, and varies (for example, increases) depending on a time that has elapsed from the start of the use of the SSD 3, for example. If the statistical value of the numbers of P/E cycles is smaller than the sixth threshold value (Yes in step S55), the controller 4 sets the write mode to TLC mode 16 (step S56). On the other hand, if the statistical value of the numbers of P/E cycles is equal to or larger than the sixth threshold value (No in step S55), step S56 is skipped and the write mode is maintained in QLC mode 17.

After the write mode is set to or maintained in TLC mode 16 or QLC mode 17, the controller 4 writes user data in the NAND flash memory 5 in the selected write mode (step S57). Then, the controller 4 updates the LUT 33 based on the writing (step S58).

As described above, user data may be stored in the NAND flash memory 5 in the write mode selected based on the statistical value of the numbers of P/E cycles.

FIG. 37 shows a flowchart of the procedure of an LUT write process executed by the controller 4. In this example, a write mode to write an LUT in the NAND flash memory 5 is set to either SLC mode 15 or QLC mode 17.

First, the controller 4 determines whether it is an LUT write timing (step S61). If it is not an LUT write timing (No in step S61), the process goes back to step S61 and whether it is an LUT write timing is determined again.

If it is an LUT write timing (Yes in step S61), the process branches in accordance with a current write mode (step S62). If the current write mode is SLC mode 15 (SLC in step S62), the controller 4 determines whether the statistical value of the numbers of P/E cycles in the NAND flash memory 5 is equal to or larger than a seventh threshold value (step S63). If the statistical value of the numbers of P/E cycles is equal to or larger than the seventh threshold value (Yes in step S63), the controller 4 sets the write mode to QLC mode 17 (step S64). On the other hand, if the statistical value of the numbers of P/E cycles is smaller than the seventh threshold value (No in step S63), step S64 is skipped and the write mode is maintained in SLC mode 15.

If the current write mode is QLC mode 17 (QLC in step S62), the controller 4 determines whether the statistical value of the numbers of P/E cycles in the NAND flash memory 5 is equal to or larger than an eighth threshold value (step S65). Note that the eighth threshold value is smaller than the seventh threshold value, and varies (for example, increases) depending on a time that has elapsed from the start of the use of the SSD 3, for example. If the statistical value of the numbers of P/E cycles is smaller than the eighth threshold value (Yes in step S65), the controller 4 sets the write mode to SLC mode 15 (step S66). On the other hand, if the statistical value of the numbers of P/E cycles is equal to or larger than the eighth threshold value (No in step S65), step S66 is skipped and the write mode is maintained in QLC mode 17.

After the write mode is set to or maintained in SLC mode 15 or QLC mode 17, the controller 4 writes user data into the NAND flash memory 5 in the selected write mode (step S67).

As described above, user data may be stored in the NAND flash memory 5 in the write mode selected based on the statistical value of the numbers of P/E cycles.

Note that, if the blocks included in the NAND flash memory 5 are divided into an SLC mode only block group 18 and a TLC/QLC shared block group 19, the statistical value of the numbers of P/E cycles is derived per each group. Furthermore, the statistical value of the maximum number of P/E cycles is defined per group. Thus, each threshold value shown in the flowcharts of FIGS. 36 and 37 is defined per group.

In that case, the controller 4 determines, for example, a write mode per group based on the current statistical value of the numbers of P/E cycles and the threshold value. Then, if write modes determined for two groups are different from each other, the controller 4 selects a mode by which increase of the number of P/E cycles is further suppressed (for example, between SLC mode 15 and QLC mode 17, QLC mode 17 is selected), and set it to the write mode.

Note that, if the blocks included in the NAND flash memory 5 are divided into the SLC mode only block group 18 and the TLC/QLC shared block group 19, and in consideration of endurance assurance, the write mode for host writing is switched between SLC mode and TLC/QLC direct writing mode, writing in SLC mode mainly wears the blocks of the SLC block group 18 and writing in TLC/QLC direct writing mode mainly wears the blocks of the TLC/QLC shared block group 19. In that case, in order to guarantee the life of the SSD 3, a mode to wear a block group having longer life remaining is selected in consideration of the remaining life of each of the block groups 18 and 19. Furthermore, if the remaining life of each of the block groups 18 and 19 is substantially the same, the performance is prioritized, that is, SLC mode is selected for a narrow range work load and TLC/QLC direct writing mode is selected for wide range work load. The narrow range workload is, as described above, an access pattern in which logical addresses of access commands chronologically close to each other are within a narrow logical address space. The wide range workload is an access pattern in which logical addresses of access commands spread over a wide logical address space.

Furthermore, if the blocks included in the NAND flash memory 5 are divided into the SLC mode only block group 18 and the TLC/QLC shared block group 19, the blocks of the SLC mode only block group 18 may maintain a life of several tens k cycles when used in SLC mode 15 writing. In a case where the blocks are shared in SLC mode 15 and QLC mode 17, the blocks become unusable when the number of P/E cycles reaches the tolerable maximum number thereof in QLC mode 17 (for example, several k cycles or the like).

In the blocks belonging to the SLC mode only block group 18, data which are frequently rewritten are provided on an assumption that P/E cycles are occurred with high frequency. On the other hand, in the blocks belonging to the QLC mode only block group, data which are rarely rewritten (or updated) (e.g., a kind of cold data) are provided on an assumption that P/E cycles are occurred with low frequency. The SSD 3 ends its life either when the SLC mode only block group 18 reaches its permissible maximum number of P/E cycles or when the QLC mode only block group reaches its permissible maximum number of P/E cycles. Thus, by balancing use of the blocks belonging to the SLC mode only block group 18 and the blocks belonging to the QLC mode only block group, the life of the entirety of the SSD 3 can be elongated.

On the other hand, by using the SLC buffer as far as the enough endurance of the SSD is assured, a high peak performance can be achieved for any workload, and a read/write performance for a narrow range workload can be enhanced.

Third Embodiment

In the first and second embodiments, the write modes of data writing to the NAND flash memory 5 are switched. In a third embodiment, an entry (address conversion data) of an LUT cached on the DRAM 6 is controlled based on a write mode used when corresponding user data is written in the NAND flash memory 5 or based on a write mode used when the entry is written in the NAND flash memory 5.

An SSD 3 of the third embodiment and the SSD 3 of the first embodiment are structurally same, and comparing the third embodiment to the first and second embodiments, a process executed by the cache control module 125 is different therebetween. Hereinafter, points different from the first and second embodiments will be explained.

The NAND flash memory 5 stores an address conversion table (LUT) 53 including entries. Each of the entries indicates mapping of a logical address (e.g., LBA) and a physical address. The cache control module 125 controls an entry of the LUT 33 read from the NAND flash memory 5 and cached in the DRAM 6. The cache control module 125 caches an entry of the LUT corresponding to an LBA to which reading or writing is requested by the host 2 from the NAND flash memory 5 to DRAM 6.

An area of the DRAM 6 where data of the LUT can be cached is limited. Thus, if the DRAM 6 does not include any free area where a new entry of the LUT is to be cached, the cache control module 125 selects an eviction target entry from entries cached on the DRAM 6 according to a specific rule. Note that, the cache control module 125 may select an eviction target entry even if the DRAM 6 includes a free area. For example, the cache control module 125 may select an eviction target entry, if there is, in the DRAM 6, a size of free area to cache a new entry of the LUT that is smaller than a threshold size.

As a specific rule, a least recently used (LRU) method may be used, for example. In the present embodiment, an eviction target entry is selected from the entries cached on the DRAM 6 based on the write mode in which user data corresponding to each entry is written in the NAND flash memory 5 or based on the write mode in which address conversion data corresponding to each entry is written in the NAND flash memory 5. A specific example of selection of eviction target entry will be described later.

If the selected eviction target entry includes dirty data, the cache control module 125 writes address conversion data included in the entry, in the NAND flash memory 5 and releases a cache area of the entry. The dirty data is data updated after being cached on the DRAM 6 and the updated content is not reflected on the NAND flash memory 5. A write mode used to write address conversion data included in an entry may be, for example, a write mode in which address conversion data corresponding to the entry is last written in the NAND flash memory 5. Or, by applying the configuration of the first embodiment or the second embodiment, a write mode may be set based on a utilization, a statistical value of the numbers of P/E cycles, or the like.

Note that, if the data included in the selected entry is not dirty data, the cache control module 125 releases the cache area of the entry without performing any process such as write process.

Then, the cache control module 125 caches new LUT entry in one of free areas that include the released cache area.

As described above, based on the write mode in which user data corresponding to each entry is written in the NAND flash memory 5 or based on the write mode in which address conversion data corresponding to each entry is written in the NAND flash memory 5, an LUT entry to be evicted from the DRAM 6 may be controlled. Note that the LUT 33 may be cached in an SRAM provided with the controller 4 instead of the DRAM 6. In that case, the cache control module 125 may control entries cached in the SRAM from the NAND flash memory 5.

An example of a cache operation of a new LUT entry on the DRAM 6 will be explained with reference to FIGS. 38 and 39. In this example, a first policy is applied, in which an entry corresponding to user data of a write mode with larger number of bits per cell (for example, QLC mode 17) of entries of the LUT 33 cached in the DRAM 6 is preferentially evicted based on a write mode of user data on the NAND flash memory 5 indicated by the address conversion data of each entry of the LUT 33 cached in the DRAM 6.

When a read command requesting a read of LBA "40" is received from the host 2, the cache control module 125 determines whether the LUT 33 cached in the DRAM 6 includes an entry corresponding to LBA "40". In the example of FIG. 38, the DRAM 6 includes three cache areas to cache three LUT entries. In the three cache areas, an entry 331 including physical address "400" as address conversion data of LBA "10", an entry 332 including physical address "200" as address conversion data of LBA "20", and an entry 333 including physical address "50" as address conversion data of LBA "30" are cached. Hereinafter, an expression of "physical address "X" as address conversion data" will be expressed as "address conversion data ("X")".

Since an entry corresponding to LBA "40" is not included in the entries 331, 332 and 333 of the cached LUT 33, the cache control module 125 performs a process to allocate a new cache area for the entry of LBA "40".

Specifically, the cache control module 125 refers to a management table 45 and selects an eviction target entry from the entries of LUT 33 cached in the DRAM 6. The eviction target entry corresponds to user data written in a write mode with larger number of bits per cell. The management table 45 indicates an LBA and a write mode of corresponding user data. The management table 45 is updated based on writing (i.e., host writing and GC writing) and unmapping of corresponding user data. Furthermore, the management table 45 is stored in the NAND flash memory 5, and is cached on the DRAM 6 when needed.

Figure 38:
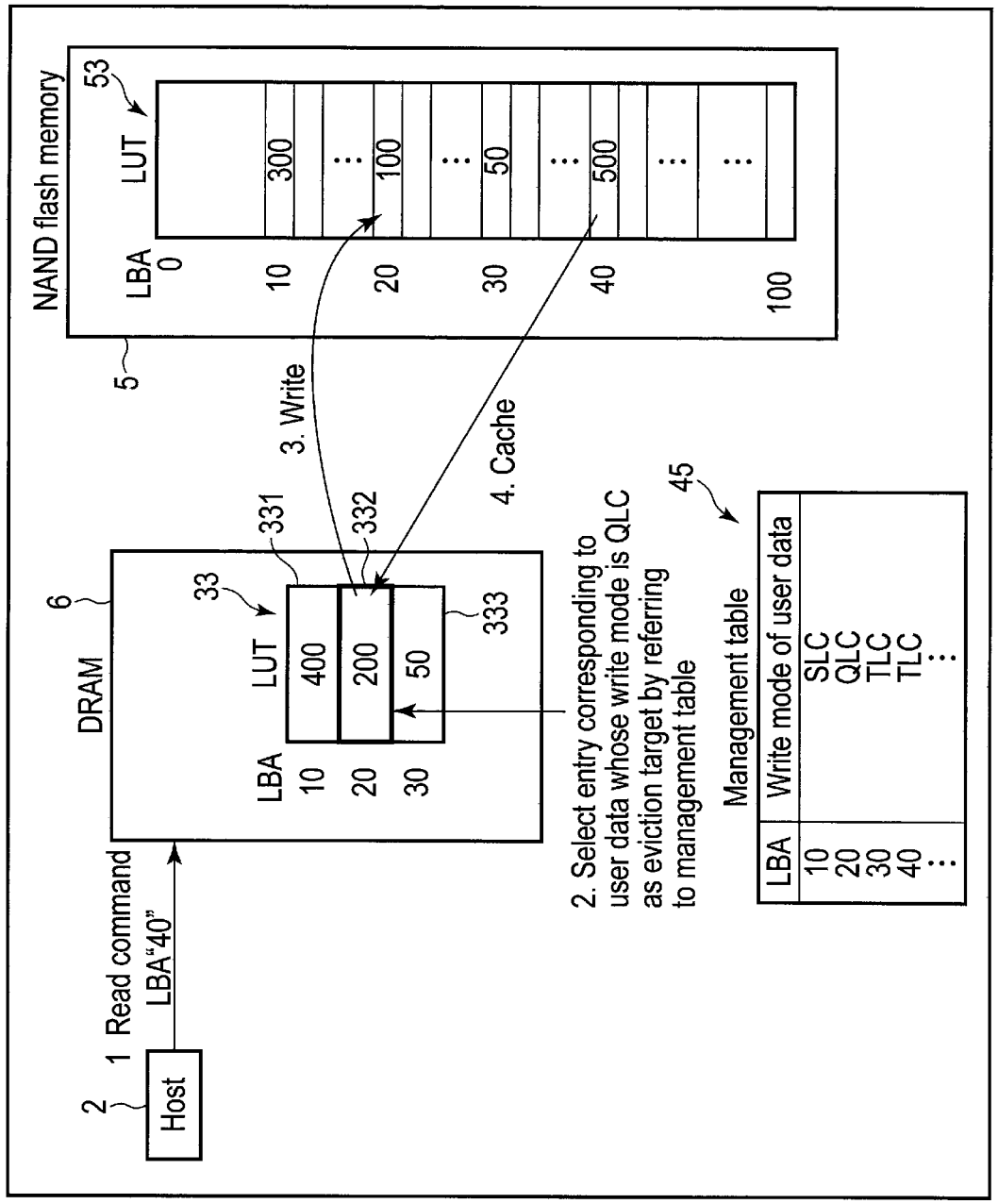
FIG. 38 shows a first example of an operation controlling LUT (address conversion data) cached in DRAM by a memory system of a third embodiment.

In the example of FIG. 38, the cache control module 125 selects the entry 332 of LBA "20" from the entries of LUT 33 cached in the DRAM 6. The entry 332 of LBA "20" corresponds to user data written in QLC mode 17. If the address conversion data ("200") included in the entry 332 is dirty, the cache control module 125 writes the address conversion data to the NAND flash memory 5.

Then, the cache control module 125 releases the cache area of the entry 332, reads address conversion data ("500") included in the entry of LBA "40" from the LUT 53 stored in the NAND flash memory 5, and caches the read data in one of the free areas, that include the released area.

Figure 39:
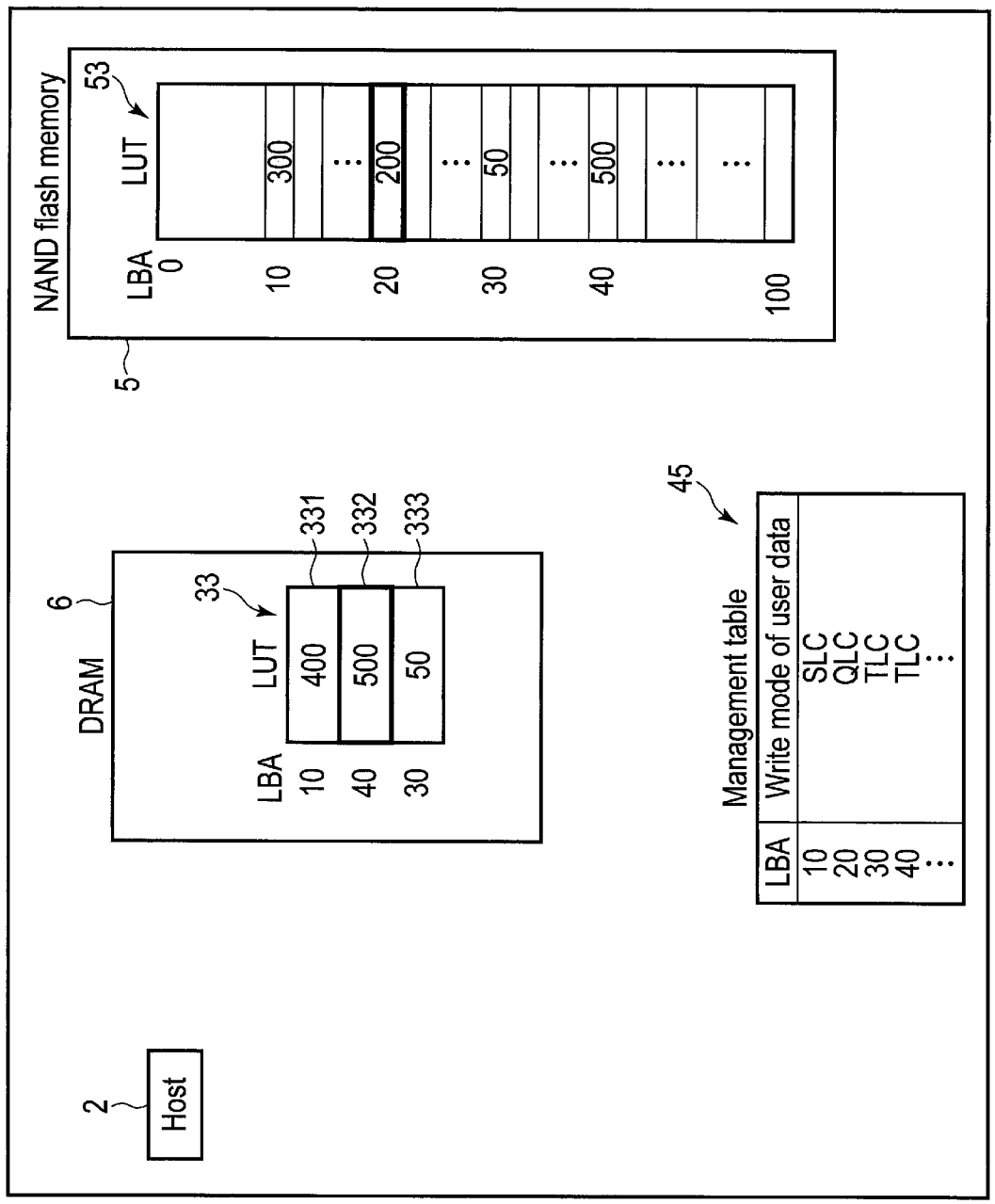
FIG. 39 shows LUT on DRAM and LUT on NAND flash memory after the operation of FIG. 38.

Thus, as shown in FIG. 39, address conversion data ("500") included in the entry of LUT corresponding to LBA "40" is newly cached on the DRAM 6. Thus, based on the cached entry of LUT corresponding to LBA "40", the read control module 122 acquires a physical address corresponding to a logical address (e.g., LBA) and read data corresponding to a read command from the NAND flash memory 5.

FIG. 40 shows a flowchart of the procedure of an LUT cache control process according to the first policy executed by the controller 4.

First, the controller 4 determines whether the DRAM 6 has a free area for caching a new LUT entry (step S71). If the DRAM 6 has a free area (Yes in step S71), the controller 4 stores the new LUT entry in the DRAM 6 (step S78).

On the other hand, if the DRAM 6 does not have a free area for caching a new LUT entry (No in step S71), the controller 4 determines whether the DRAM 6 includes an LUT entry corresponding to user data whose write mode is QLC mode 17 (step S72). If the DRAM 6 includes an LUT entry corresponding to user data whose write mode is QLC mode 17 (Yes in step S72), the controller 4 selects the LUT entry as an eviction target (step S73). Furthermore, if the DRAM 6 does not include any LUT entry corresponding to user data whose write mode is QLC mode 17 (No in step S72), the controller 4 selects an LUT entry corresponding to user data whose write mode is TLC mode 16 (or SLC mode 15) as an eviction target (step S74).

Then, the controller 4 determines whether data (address conversion data) of the entry selected as an eviction target is dirty data (step S75). If data of the selected entry is dirty data (Yes in step S75), the controller 4 writes (i.e., writes back) the data into the NAND flash memory 5 (step S76). Furthermore, if data of the selected entry is not dirty data (No in step S75), step S76 is skipped.

Then, the controller 4 releases a cache area of the entry selected as an eviction target (step S77), caches a new LUT entry in the DRAM 6 (step S78).

As described above, of the entries of LUT 33 cached in the DRAM 6, an entry corresponding user data whose write mode of is QLC mode 17 may be preferentially evicted from the DRAM 6.

An LBA of user data written in QLC mode 17 is supposed that a performance requested thereto is not high, and thus, a required performance is still satisfied even if LUT (address conversion data) of the LBA is evicted from the cache. On the other hand, an LBA of user data written in SLC mode 15 is supposed that a performance required thereto is high, and thus, a high performance is maintained by keeping LUT entries (address conversion data) of the LBA of user data written in SLC mode 15 in the cache (i.e., not evicting the LUT from the cache) as long as possible. Thus, the required performance can be achieved.

Another example of a cache operation of a new LUT entry on the DRAM 6 will be explained with reference to FIGS. 41 and 42. In this example, a second policy is applied, in which an entry corresponding to user data of a write mode with smaller number of bits per cell (for example, SLC mode 15) of entries of the LUT 33 cached in the DRAM 6 is preferentially evicted based on a write mode of user data on the NAND flash memory 5 indicated by the management table 45.

If a read command requesting a read of LBA "40" has been received from the host 2, the cache control module 125 determines whether an entry corresponding to LBA "40" is included in the LUT 33 cached in the DRAM 6. Since an entry corresponding to LEA "40" is not included in the entries 331, 332 and 333 of the cached LUT 33, the cache control module 125 performs a process to allocate a new cache area for the entry of LBA "40".

Specifically, the cache control module 125 refers to a management table 45 and selects an eviction target entry from the entries of the LUT 33 cached in the DRAM 6. The eviction target entry corresponds to user data written in a write mode with smaller number of bits per cell.

Figure 41:
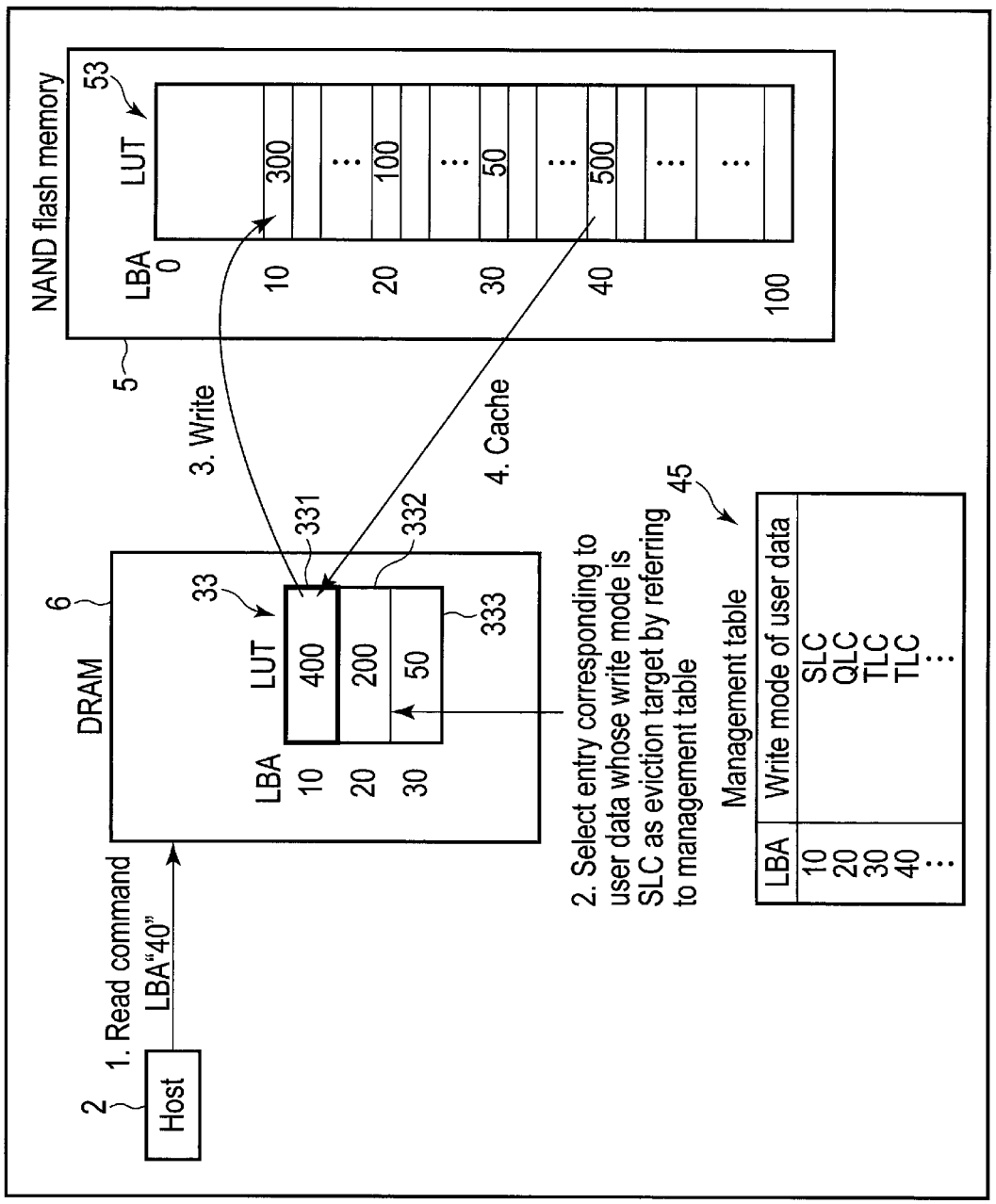
FIG. 41 shows a second example of an operation controlling LUT (address conversion data) cached in DRAM by the memory system of the third embodiment.

In the example of FIG. 41, the cache control module 125 selects the entry 331 of LBA "10" from the entries of LUT 33 cached in DRAM 6. The entry 331 of LBA "10" corresponds to user data written in SLC mode 15. If the data ("400") included in the entry 331 is dirty data, the cache control module 125 writes the LUT data into the NAND flash memory 5.

Then, the cache control module 125 releases the cache area of the entry 331, reads address conversion data ("500") included in the entry of LBA "40" from the LUT 53 stored in the NAND flash memory 5, and caches the read data in one of the free areas, that include the released area.

Figure 42:
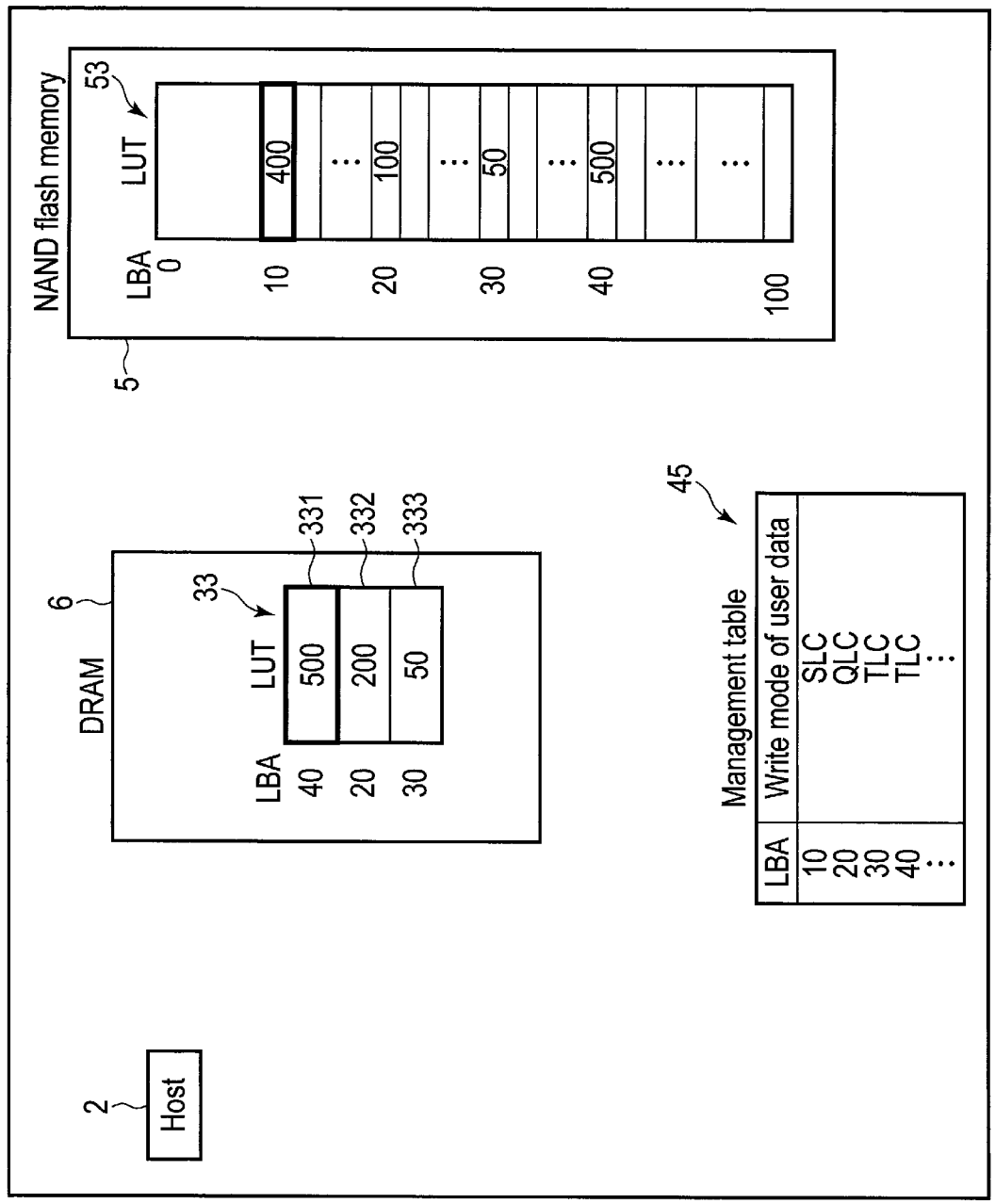
FIG. 42 shows LUT on DRAM and LUT on NAND flash memory after the operation of FIG. 41.

Thus, as shown in FIG. 42, the address conversion data ("500") included in the entry of LUT corresponding to LBA "40" is newly cached on the DRAM 6. Thus, based on the cached entry of LUT corresponding to LBA "40", the read control module 122 may acquire a physical address corresponding to a logical address (e.g., LBA) and read data corresponding to a read command from the NAND flash memory 5.

FIG. 43 shows a flowchart of the procedure of an LUT cache control process according to the second policy executed by the controller 4.

First, the controller 4 determines whether the DRAM 6 has a free area for caching a new LUT entry (step S81). If the DRAM 6 has a free area (Yes in step S81), the controller 4 stores the new LUT entry in the DRAM 6 (step S88).

On the other hand, if the DRAM 6 does not have a free area for caching a new LUT entry (No in step S81), the controller 4 determines whether the DRAM 6 includes an LUT entry corresponding user data whose write mode is SLC mode 15 (step S82). If the DRAM 6 includes an LUT entry corresponding user data whose write mode is SLC mode 15 (Yes in step S82), the controller 4 selects the LUT entry as an eviction target (step S83). Furthermore, if the DRAM 6 does not include an LUT entry corresponding user data whose write mode is SLC mode 15 (No in step S82), the controller 4 selects an LUT entry corresponding to user data whose write mode is TLC mode 16 (or QLC mode 17) as an eviction target (step S84).

Then, the controller 4 determines whether data (address conversion data) of the entry selected as an eviction target is dirty data (step S85). If data of the selected entry is dirty data (Yes in step S85), the controller 4 writes (i.e., writes back) the LUT data into the NAND flash memory 5 (step S86). Furthermore, if data of the selected entry is not dirty data (No in step S85), step S86 is skipped.

Then, the controller 4 releases a cache area of the entry selected as an eviction target (step S87), and caches a new LUT entry into the DRAM 6 (step S88).

As described above, of the entries of the LUT 33 cached in the DRAM 6, an entry corresponding user data whose write mode is SLC mode 15 may be preferentially evicted from the DRAM 6.

Since the user data written in SLC mode 15 can be read faster than user data written in QLC mode 17, even if LUT (address conversion data) is read due to an LUT cache miss, the read performance including a reading time of LUT is not significantly different from the read performance for reading the user data written in QLC mode 17. Thus, the performance can be stabilized with a limited DRAM capacity.

Another example of a cache operation of a new LUT entry on the DRAM 6 will be explained with reference to FIGS. 44 and 45. In this example, a third policy is applied, in which an entry corresponding to user data of a write mode with larger number of bits per cell (for example, QLC mode 17) of entries of the LUT 33 cached in the DRAM 6 is preferentially evicted based on a write mode on the NAND flash memory 5 in which data (address conversion data) of each entry of the LUT 33 cached in the DRAM 6 is stored.

When a read command requesting a read of LBA "40" has been received from the host 2, the cache control module 125 determines whether an entry corresponding to LBA "40" is included in the LUT 33 cached in the DRAM 6. Since an entry corresponding to LBA "40" is not included in the entries 331, 332, and 333 of the cached LUT 33, the cache control module 125 performs a process to allocate a new cache area for the entry of LBA "40".

Specifically, the cache control module 125 refers to a management table 46 and selects an eviction target entry from the entries of the LUT 33 cached in the DRAM 6. Data (address conversion data) of the eviction target entry corresponds to data (address conversion data) on the NAND flash memory 5 written in a write mode with larger number of bits per cell. The management table 46 indicates an LBA and a write mode of corresponding address conversion data. The management table 46 is updated based on writing of corresponding address conversion data.

Figure 44:
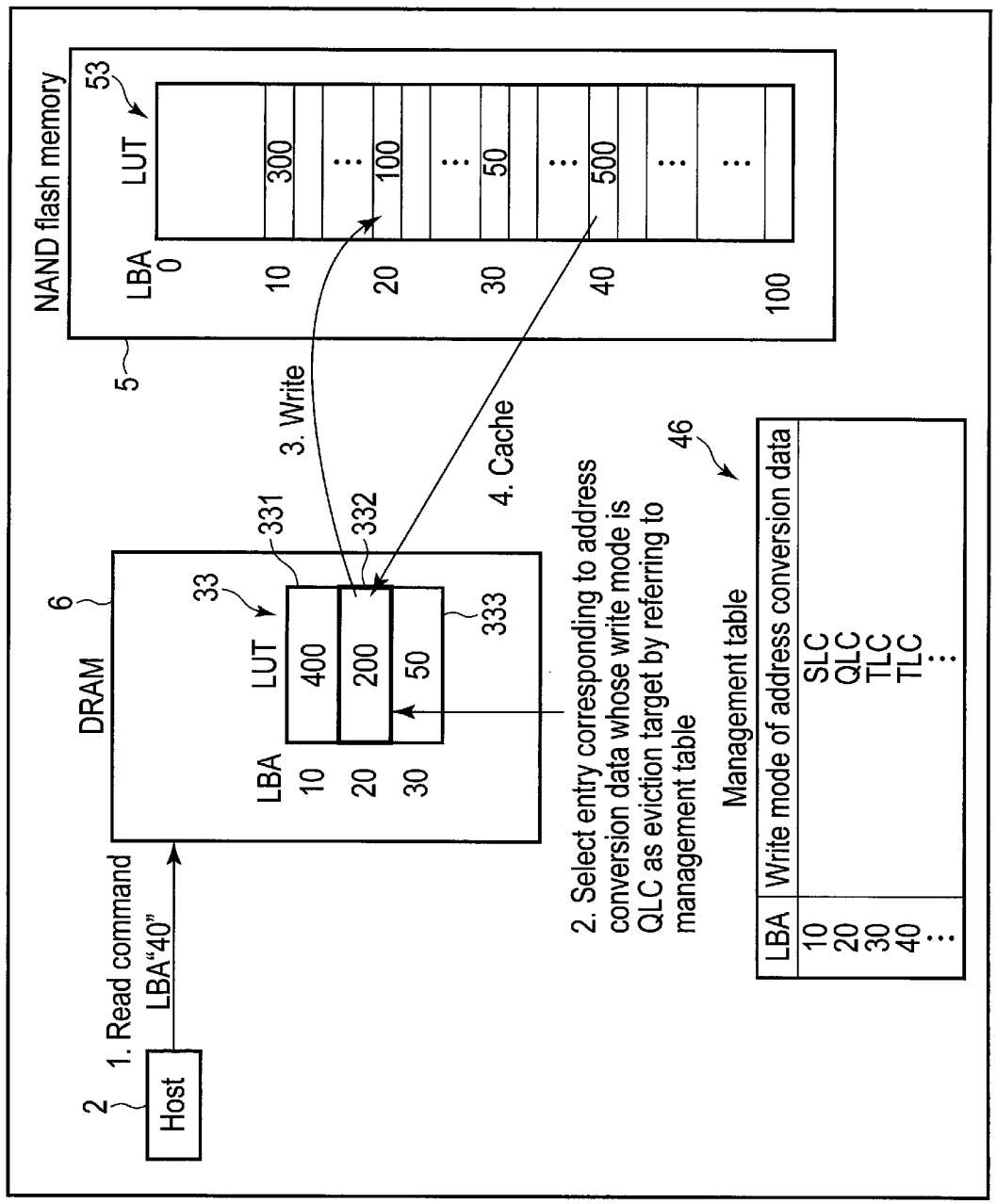
FIG. 44 shows a third example of an operation of controlling LUT cached in DRAM by the memory system of the third embodiment.

In the example of FIG. 44, the cache control module 125 selects the entry 332 of LBA "20" from the entries of the LUT 33 cached in the DRAM 6. The entry 332 of LBA "20" corresponds to address conversion data written in QLC mode 17. If the address conversion data ("200") included in the entry 332 is dirty data, the cache control module 125 writes the data to the NAND flash memory 5.

Then, the cache control module 125 releases the cache area of the entry 332, reads data ("500") included in the entry of LBA "40" from the LUT 53 stored in the NAND flash memory 5, and caches the read data in one of the free areas, that include the released area.

Thus, as shown in FIG. 45, an LUT entry ("500") corresponding to LBA "40" is newly cached on the DRAM 6. Thus, based on the LUT entry corresponding to LBA "40", the read control module 122 may acquire a physical address corresponding to a logical address (e.g., LBA) and read data corresponding to a read command from the NAND flash memory 5.

FIG. 46 shows a flowchart of the procedure of an LUT cache control process according to the third policy executed by the controller 4.

First, the controller 4 determines whether the DRAM 6 has a free area for caching a new LUT entry (step S91). If the DRAM 6 has a free area (Yes in step S91), the controller 4 stores the new LUT entry in the DRAM 6 (step S98).

On the other hand, if the DRAM 6 does not have any free area for caching a new LUT entry (No in step S91), the controller 4 determines whether the DRAM 6 includes an LUT entry corresponds address conversion data on the NAND flash memory 5 whose write mode is QLC mode 17 (step S92). If the DRAM 6 includes an LUT entry corresponds address conversion data on the NAND flash memory 5 whose write mode is QLC mode 17 (Yes in step S92), the controller 4 selects the LUT entry as an eviction target (step S93). Furthermore, if the DRAM 6 does not include any LUT entry corresponds address conversion data on the NAND flash memory 5 whose write mode is QLC mode 17 (No in step S92), the controller 4 selects an LUT entry corresponding to address conversion data on the NAND flash memory 5 whose write mode is TLC mode 16 (or SLC mode 15) as an eviction target (step S94).

Then, the controller 4 determines whether data (address conversion data) of the entry selected as an eviction target is dirty data (step S95). If data of the selected entry is dirty data (Yes in step S95), the controller 4 writes (i.e., writes back) the data in the NAND flash memory 5 (step S96). Furthermore, if data of the selected entry is not dirty data (No in step S95), step S96 is skipped.

Then, the controller 4 releases a cache area of the entry selected as an eviction target (step S97), and caches a new LUT entry in the DRAM 6 (step S98).

As described above, among the entries of the LUT 33 cached in the DRAM 6, an entry corresponding to address conversion data on the NAND flash memory 5 whose write mode is QLC mode 17 may be preferentially evicted from the DRAM 6.

As in the case of the first policy, an LBA of LUT (address conversion data) written in QLC mode 17 is supposed that a performance required thereto is not high, and thus, a required performance is still satisfied even if LUT (address conversion data) of the LBA is evicted from the cache. On the other hand, an LBA of LUT (address conversion data) written in SLC mode 15 is supposed that a performance required thereto is high, and thus, a high performance is maintained by not evicting an LBA of LUT written in SLC mode 15 from the cache. Thus, the required performance can be achieved.

Another example of a cache operation of a new LUT entry on the DRAM 6 will be explained with reference to FIGS. 47 and 48. In this example, a fourth policy is applied, in which an entry corresponding to user data of a write mode with smaller number of bits per cell (for example, SLC mode 15) of entries of the LUT 33 cached in the DRAM 6 is preferentially evicted based on a write mode on the NAND flash memory 5 in which data (address conversion data) of each entry of the LUT 33 cached in the DRAM 6 is stored.

When a read command requesting a read of LBA "40" has been received from the host 2, the cache control module 125 determines whether an entry corresponding to LBA "40" is included in the LUT 33 cached in the DRAM 6. Since an entry corresponding to LBA "40" is not included in the entries 331, 332 and 333 of the cached LUT 33, the cache control module 125 performs a process to allocate a new cache area for the entry of LEA "40".

Specifically, the cache control module 125 refers to a management table 46 and selects an eviction target entry from the entries of the LUT 33 cached in the DRAM 6. Data (address conversion data) of the eviction target entry corresponds to data (address conversion data) on the NAND flash memory 5 written in a write mode with smaller number of bits per cell.

Figure 47:
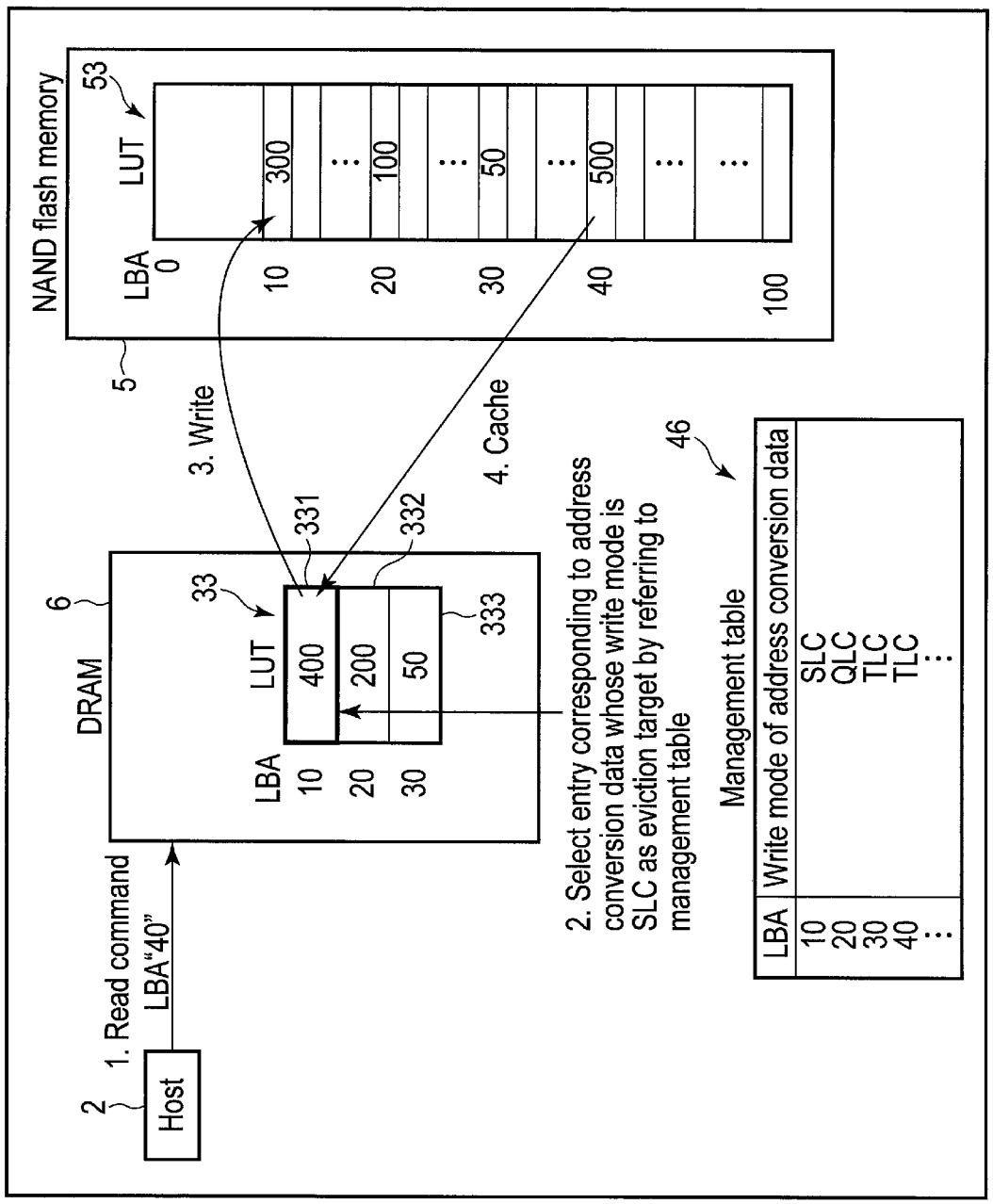
FIG. 47 a fourth example of an operation of controlling LUT cached in DRAM by the memory system of the third embodiment.

In the example of FIG. 47, the cache control module 125 selects the entry 331 of LBA "10" from the entries of LUT 33 cached in the DRAM 6. The entry 331 of LBA "10" corresponds to address conversion data written in SLC mode 15. If the data ("400") included in the entry 331 is dirty data, the cache control module 125 writes the data to the NAND flash memory 5.

Then, the cache control module 125 releases the cache area of the entry 331, reads address conversion data ("500") included in the entry of LBA "40" from the LUT 53 stored in the NAND flash memory 5, and caches the read data in one of the free areas, that include the released area.

Figure 48:
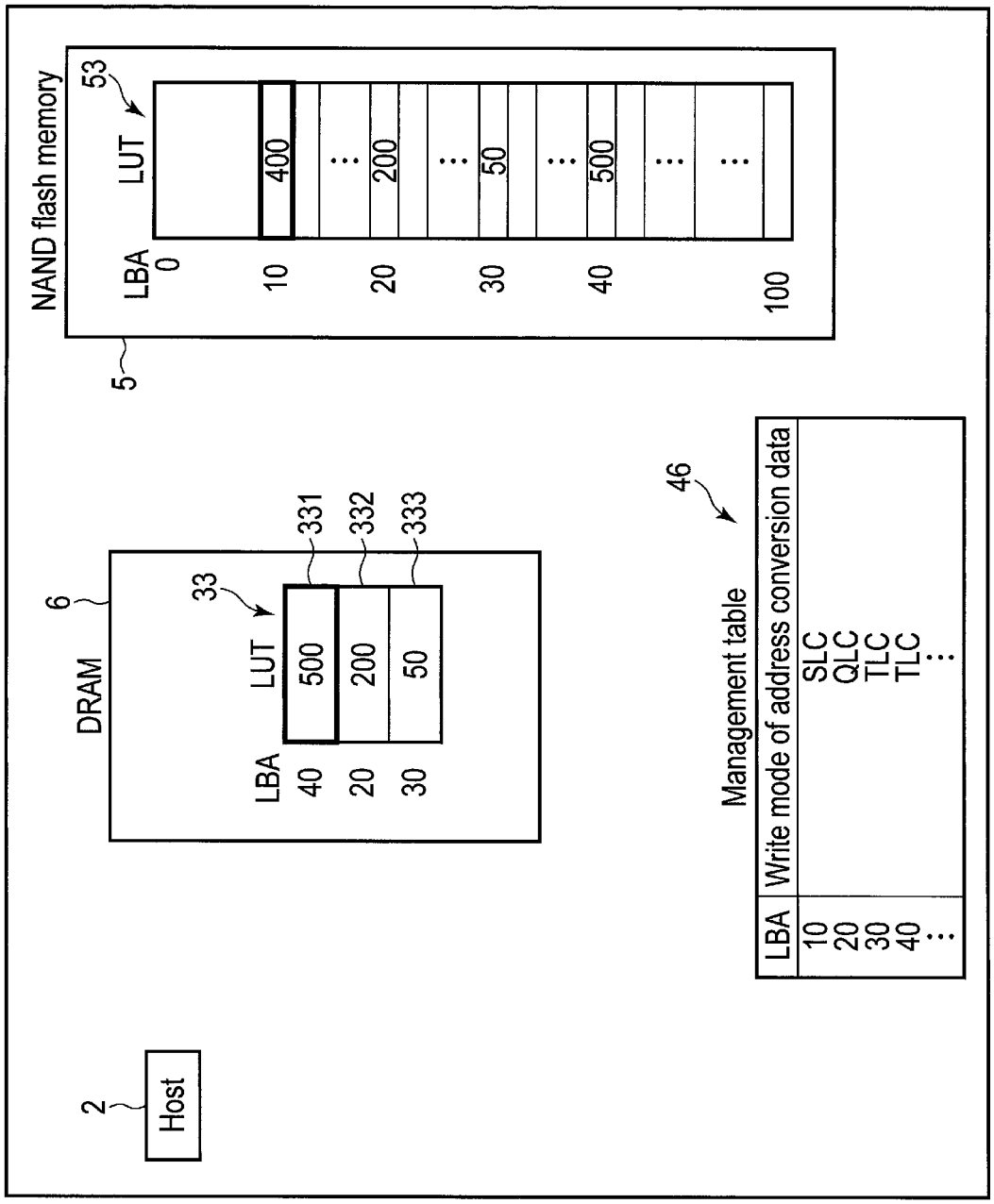
FIG. 48 shows LUT on DRAM and LUT on NAND flash memory after the operation of FIG. 47.

Thus, as shown in FIG. 48, address conversion data ("500") included in the entry of LUT corresponding to LBA "40" is newly cached on the DRAM 6. Thus, based on the cached entry of LUT corresponding to LBA "40", the read control module 122 may acquire a physical address corresponding to a logical address (e.g., LBA) and read data corresponding to a read command from the NAND flash memory 5.

FIG. 49 shows a flowchart of the procedure of an LUT cache control process according to the fourth policy executed by the controller 4.

First, the controller 4 determines whether the DRAM 6 has a free area for caching a new LUT entry (step S101). If the DRAM 6 has a free area (Yes in step S101), the controller 4 stores the new LUT entry in the DRAM 6 (step S108).

On the other hand, if the DRAM 6 does not have a free area for caching a new LUT entry (No in step S101), the controller 4 determines whether the DRAM 6 includes an LUT entry corresponding to address conversion data on the NAND flash memory 5 whose write mode is SLC mode 15 (step S102). If the DRAM 6 includes an LUT entry corresponding to address conversion data on the NAND flash memory 5 whose write mode is SLC mode 15 (Yes in step S102), the controller 4 selects the LUT entry as an eviction target (step S103). Furthermore, if the DRAM 6 does not include any LUT entry corresponding to address conversion data on the NAND flash memory 5 whose write mode is SLC mode 15 (No in step S102), the controller 4 selects an LUT entry corresponding to address conversion data on the NAND flash memory 5 whose write mode is TLC mode 16 (or QLC mode 17) as an eviction target (step S104).

Then, the controller 4 determines whether data (address conversion data) of the entry selected as an eviction target is dirty data (step S105). If data of the selected entry is dirty data (Yes in step S105), the controller 4 writes (i.e., writes back) the data in the NAND flash memory 5 (step S106). Furthermore, if data of the selected entry is not dirty data (No in step S105), step S106 is skipped.

Then, the controller 4 releases a cache area of the entry selected as an eviction target (step S107), and caches a new LUT entry in the DRAM 6 (step S108).

As described above, of the entries of the LUT 33 cached in the DRAM 6, an entry corresponding to address conversion data on the NAND flash memory 5 whose write mode is SLC mode 15 may be preferentially evicted from the DRAM 6.

When an LUT cache miss occurs, data is read from the LUT blocks. Since an LUT written in SLC mode 15 is read faster while an LUT written in QLC mode 17 is read slow, and thus, a cache miss penalty for an LUT written in SLC mode is small. The LUT written in QLC mode 17 which causes a greater cache miss penalty is maintained in cache and the LUT written in SLC mode 15 which causes a smaller cache miss penalty is evicted from the cache, and thus, the performance can be stabilized with a limited DRAM capacity.

As can be understood from the above, according to the first to third embodiments, at least one of capacity and endurance of the SSD 3, and the performance thereof is balanced. Write modes to write data in the NAND flash memory 5 are switched based on any indices regarding the NAND flash memory 5. As such indices, the total number of logical addresses mapped in a physical address space (utilization), and the degree of wear-out of the whole NAND flash memory 5 such as a statistical value of the numbers of P/E cycles may be used. Based on such indices, when the capacity or endurance is prioritized, a write mode with larger number of bits per cell (for example, QLC mode) is selected, and when the performance is prioritized, a write mode with smaller number of bits per cell (for example, SLC mode) is selected. Thus, at least one of capacity and endurance of the SSD 3 and the performance thereof is balanced.

Note that, in some embodiments of the present application, a NAND flash memory is exemplified as a nonvolatile memory. However, each embodiment may be applied to various nonvolatile memories such as a magnetoresistive random access memory (MRAM), a phase change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory having quad-level cells (QLCs) capable of being used in a single-level cell (SLC) mode; and
a controller electrically connected to the nonvolatile memory, the controller configured to:
select a write mode from an SLC mode and a QLC mode; and
write data into the nonvolatile memory in the selected write mode, wherein
the controller is configured to select the SLC mode to write data received from a host and, based on a utilization value of the memory system, the controller is configured to select the QLC mode to rewrite the data stored in the nonvolatile memory, and
the utilization value is based on a ratio of a total number of mapped logical addresses to an entire logical address space of the memory system.

2. The memory system of claim 1, wherein the number of logical addresses capable of being mapped is smaller than the number of logical addresses in the entire logical address space of the memory system.

3. The memory system of claim 1, wherein the utilization value decreases in response to execution of an unmap command.

4. The memory system of claim 1, wherein when the utilization value reaches a threshold value, the controller is configured to switch the write mode from the SLC write mode to the QLC write mode to write the data received from the host.

5. The memory system of claim 1, wherein the controller is configured to select the either the SLC or QLC write mode to rewrite the data stored in the nonvolatile memory.

6. The memory system of claim 1, wherein the controller is configured to check the utilization value periodically and adjust the write mode based upon a result of the check.

7. The memory system of claim 1, wherein the controller is configured to rewrite LUT (look up table) data stored in the nonvolatile memory by a same write mode as the write mode used to rewrite the data into the nonvolatile memory.

8. A memory system comprising:
a nonvolatile memory having quad-level cells (QLCs) capable of being used in a single-level cell (SLC) mode; and
a controller configured to write data from a host into an SLC area and, based on a utilization value, rewrite the stored data into a QLC area of the nonvolatile memory, wherein
the utilization value is determined as a ratio of logical addresses mapped to a physical address space of the nonvolatile memory.

9. The memory system of claim 8, wherein the utilization value decreases in response to execution of an unmap command.

10. The memory system of claim 8, wherein when the utilization value reaches a threshold value, the controller is configured to write the data from the host in the QLC area.

11. The memory system of claim 8, wherein the controller is configured to rewrite the data stored in the nonvolatile memory using either the SLC mode or a QLC mode.

12. The memory system of claim 8, wherein the controller is configured to check the utilization value periodically and adjust a write mode based upon a result of the check.

13. The memory system of claim 8, wherein the controller is configured to rewrite LUT (look up table) data stored in the nonvolatile memory by a same write mode as the write mode used to rewrite the data into the nonvolatile memory.

* * * * *